July 5, 1949.　　　　　N. B. COLEY　　　　　2,475,221
AIRPLANE APPROACH CONTROL SYSTEM
Filed June 24, 1948　　　　　　　　　　　　　　22 Sheets-Sheet 2
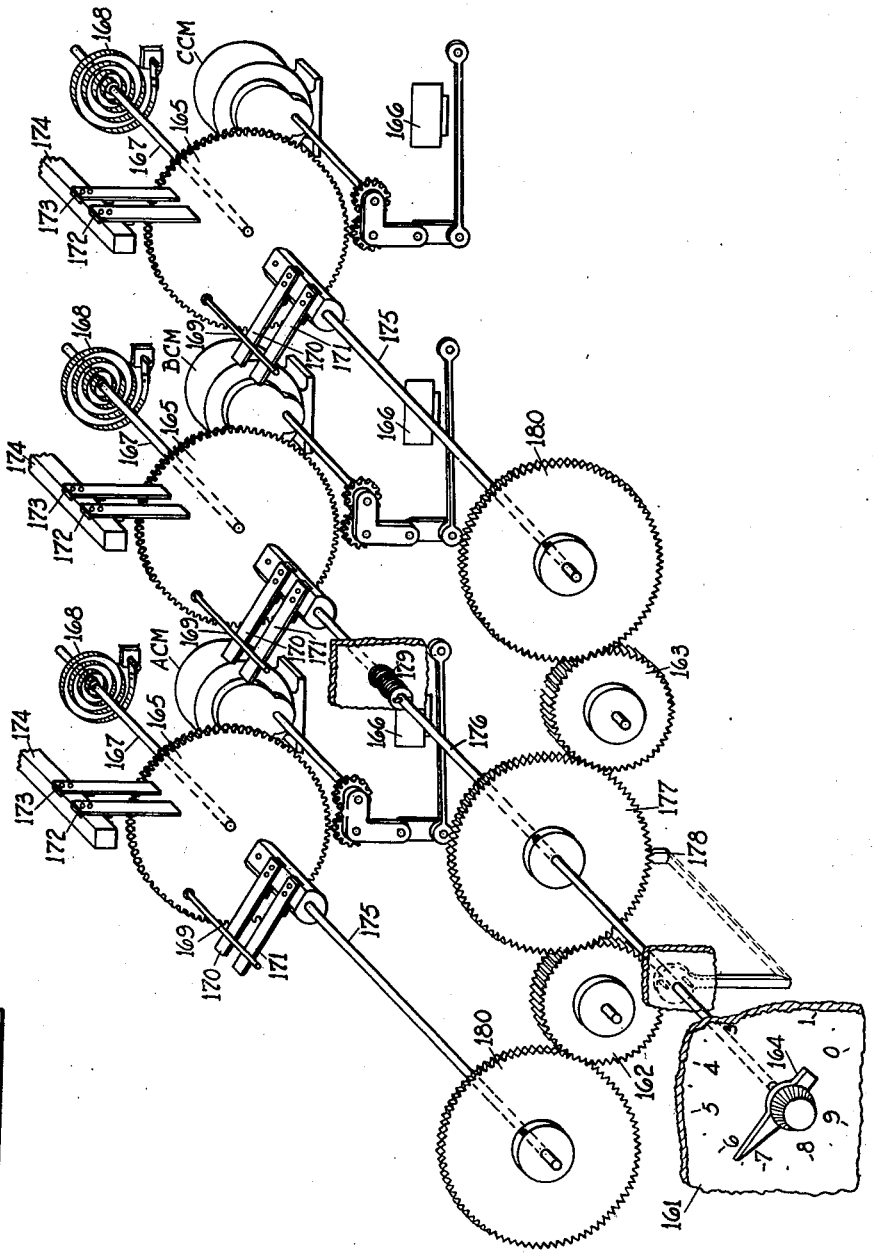
INVENTOR.
N. B. Coley.
BY Neil W. Preston,
his ATTORNEY July 5, 1949.   N. B. COLEY   2,475,221
AIRPLANE APPROACH CONTROL SYSTEM
Filed June 24, 1948   22 Sheets-Sheet 6

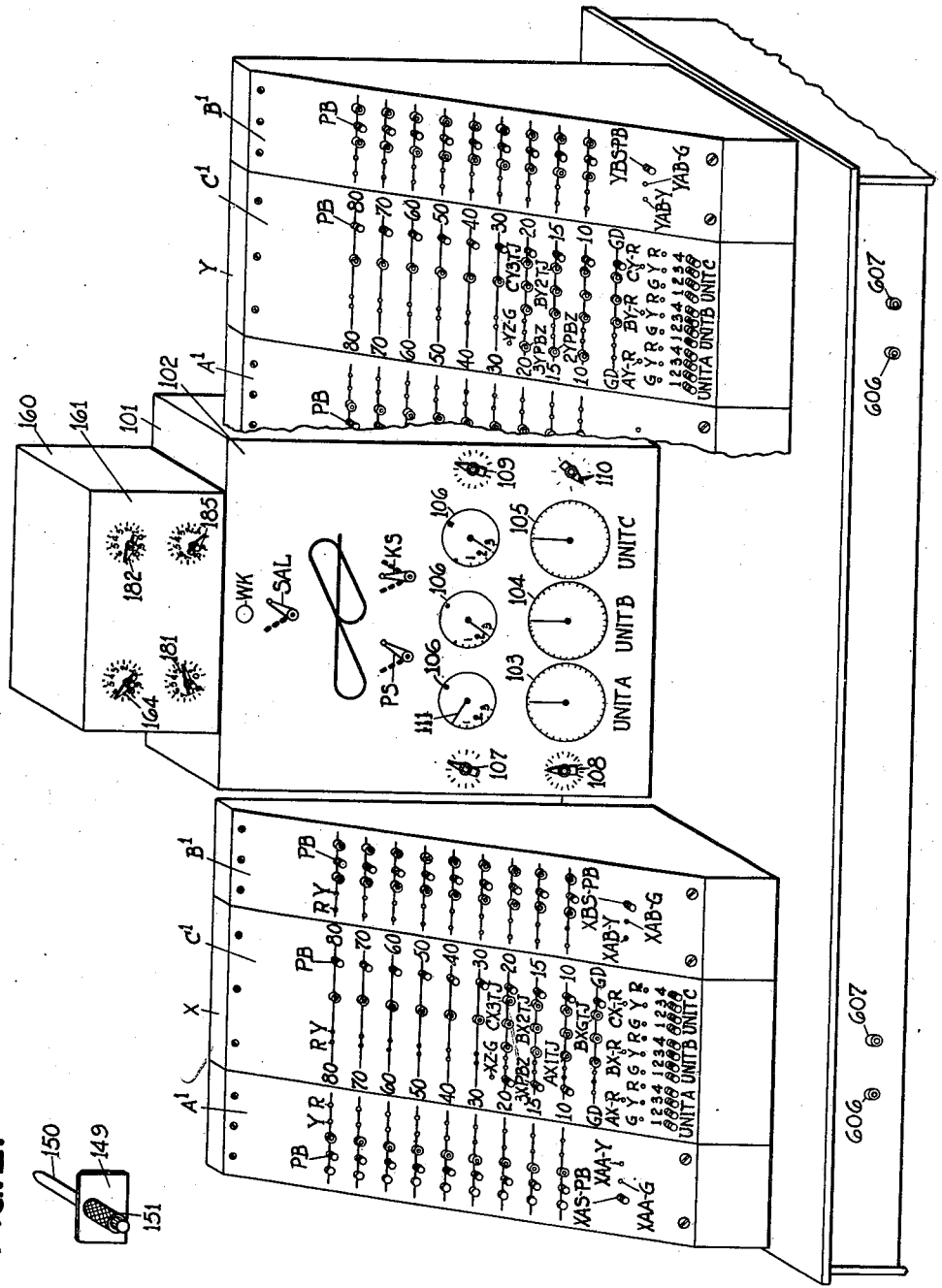

INVENTOR.
N. B. Coley,
BY Neil W. Preston
his ATTORNEY

July 5, 1949.

N. B. COLEY 2,475,221

AIRPLANE APPROACH CONTROL SYSTEM

Filed June 24, 1948

INVENTOR.
N. B. Coley,
BY Neil D. Preston,
his ATTORNEY

July 5, 1949.   N. B. COLEY   2,475,221
AIRPLANE APPROACH CONTROL SYSTEM
Filed June 24, 1948   22 Sheets-Sheet 10

INVENTOR.
N. B. Coley,
BY Neil L. Paston,
his ATTORNEY

July 5, 1949.    N. B. COLEY    2,475,221
AIRPLANE APPROACH CONTROL SYSTEM
Filed June 24, 1948    22 Sheets-Sheet 11

INVENTOR.
N. B. Coley,
BY Neil W. Preston,
his ATTORNEY

July 5, 1949. N. B. COLEY 2,475,221
AIRPLANE APPROACH CONTROL SYSTEM
Filed June 24, 1948 22 Sheets-Sheet 13

INVENTOR.
N. B. Coley,
BY Neil W. Preston,
his ATTORNEY

July 5, 1949.   N. B. COLEY   2,475,221
AIRPLANE APPROACH CONTROL SYSTEM
Filed June 24, 1948   22 Sheets-Sheet 15

INVENTOR.
N. B. Coley,
BY Neil W. Preston,
his ATTORNEY

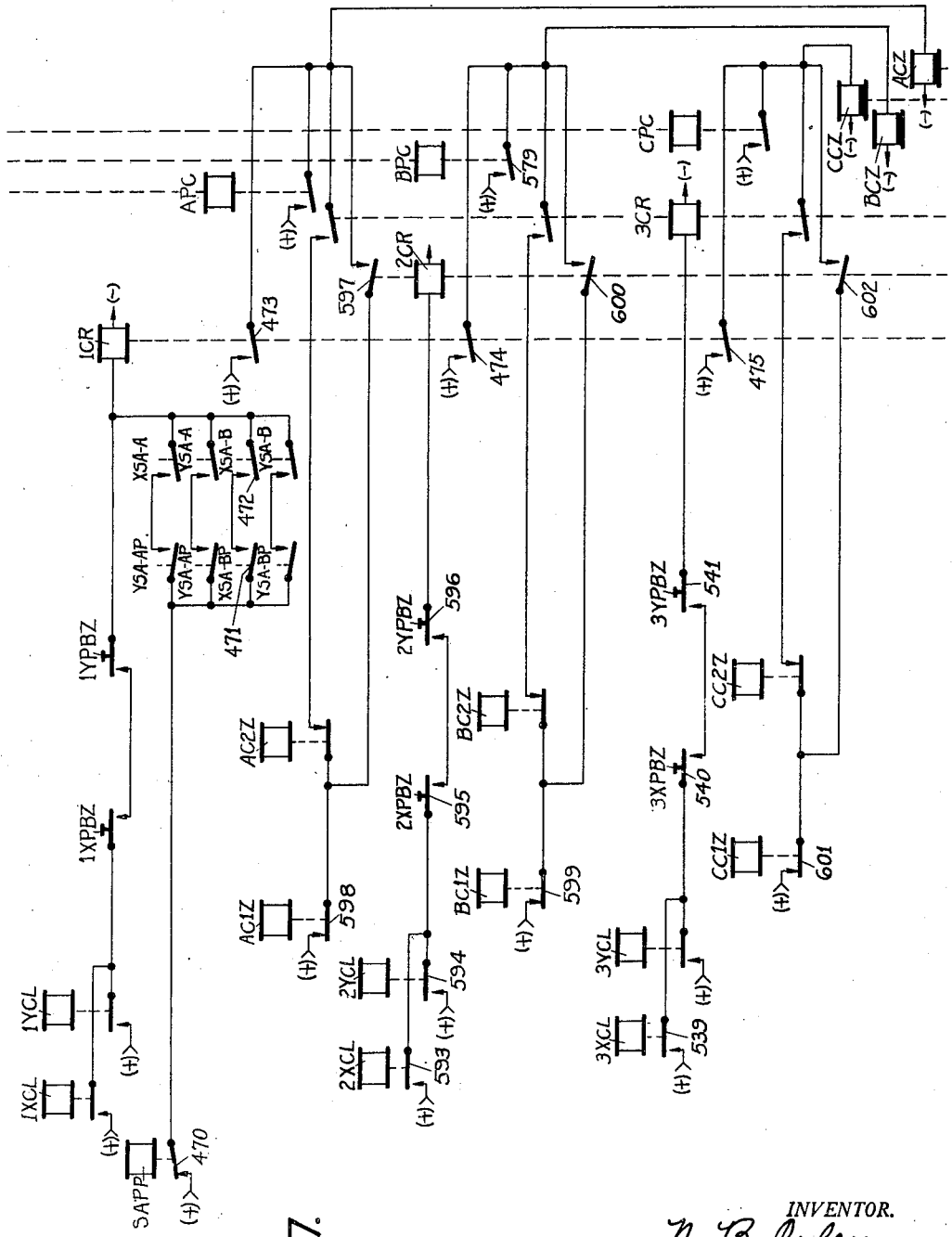

July 5, 1949. N. B. COLEY 2,475,221
AIRPLANE APPROACH CONTROL SYSTEM
Filed June 24, 1948 22 Sheets-Sheet 17
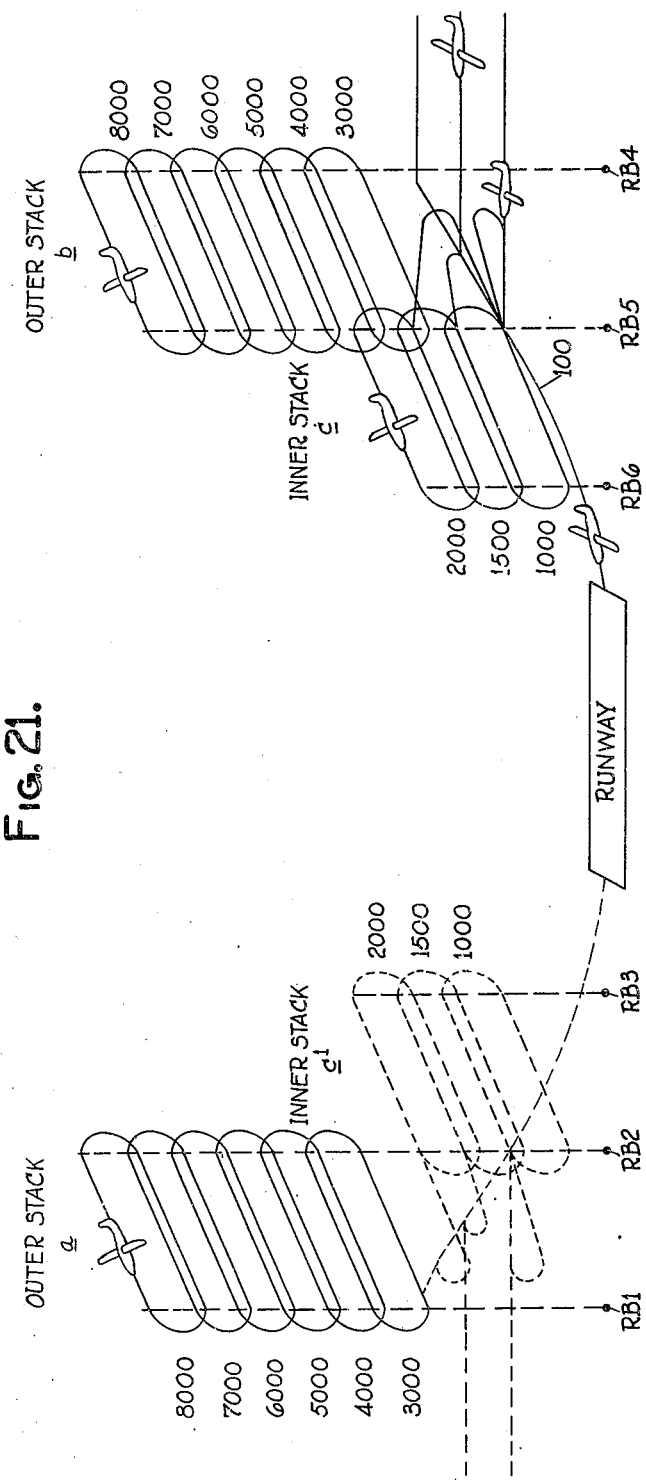
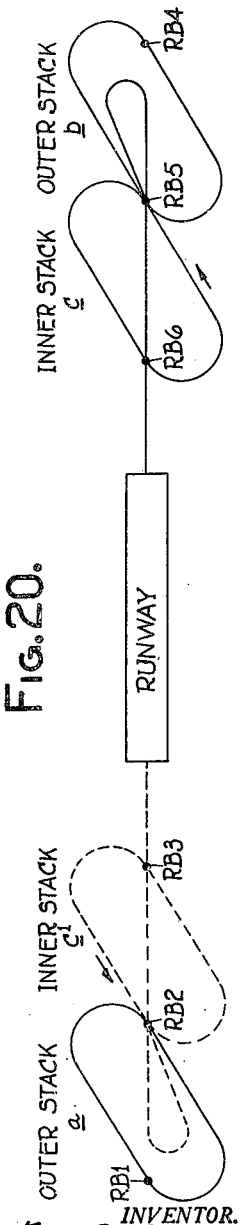
INVENTOR.
N. B. Coley
BY Neil W. Preston,
his ATTORNEY

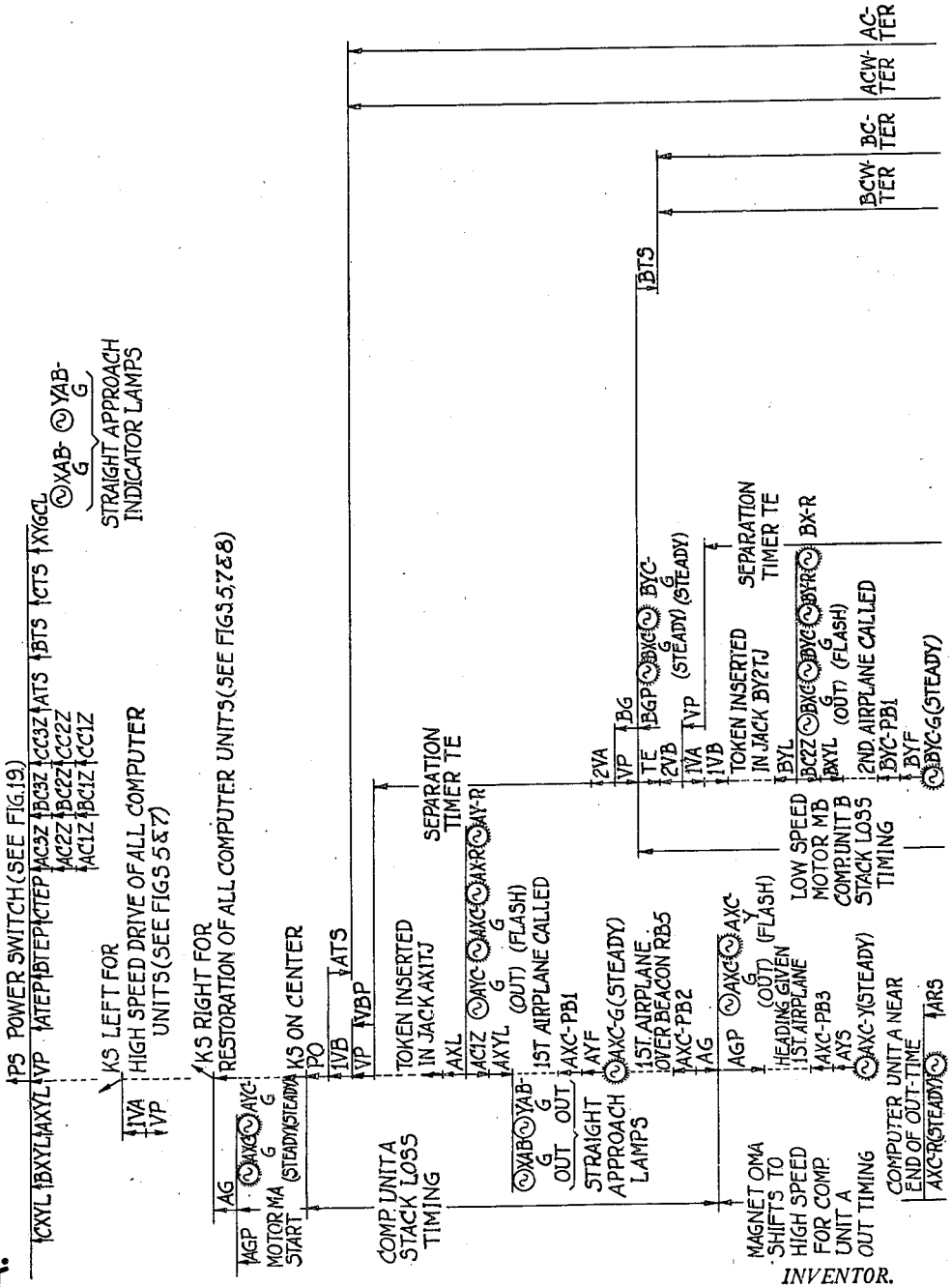

SEQUENCE CHART FOR STRAIGHT-IN APPROACHES FOLLOWING A COMPUTED PATTERN APPROACH

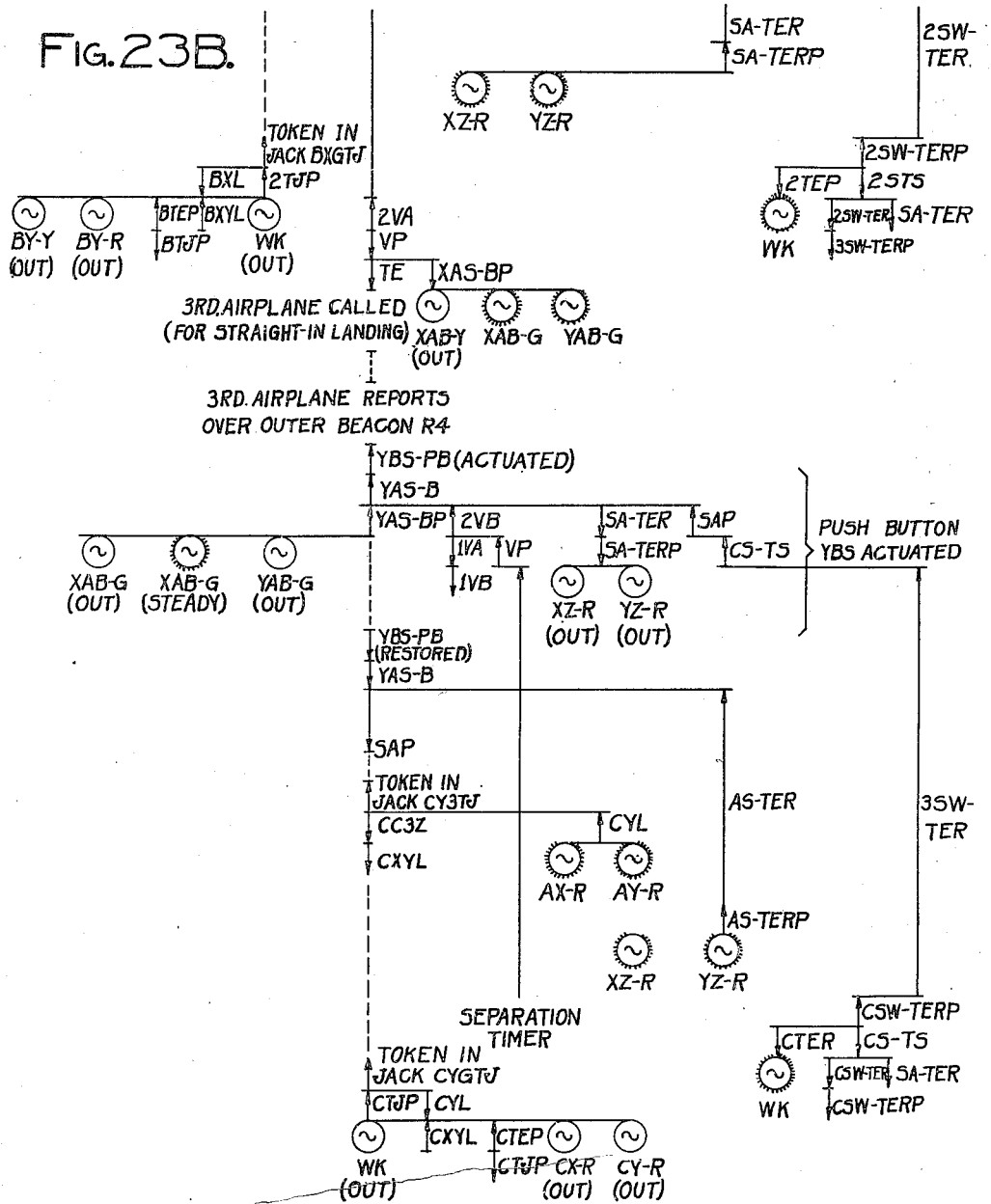

July 5, 1949.     N. B. COLEY     2,475,221
AIRPLANE APPROACH CONTROL SYSTEM
Filed June 24, 1948     22 Sheets-Sheet 22

SEQUENCE CHART FOR COMPUTED PATTERN
APPROACH FOLLOWING STRAIGHT-IN APPROACH

INVENTOR.
N. B. Coley
BY Neil W. Preston,
his ATTORNEY

UNITED STATES PATENT OFFICE 2,475,221

AIRPLANE APPROACH CONTROL SYSTEM

Nelson B. Coley, Rochester, N. Y., assignor to General Railway Signal Company, Rochester, N. Y.

Application June 24, 1948, Serial No. 34,962

21 Claims. (Cl. 177—353)

This invention relates to traffic control systems for airplanes, and it more particularly pertains to an airplane landing approach control system for sequencing and spacing airplanes in making their respective landing maneuver approaches to land on a single runway.

This invention is to be considered as providing improvements in a system of the general character disclosed in the prior application of Field et al., Ser. No. 573,876, filed January 22, 1945, for spacing the landing of airplanes; and it is to be further understood that no claim is intended to be made in this application to any subject matter disclosed in such prior application. According to such prior application, a plurality of computer units are sequentially initiated for computing respective landing approach maneuvers for respective airplanes so that each airplane gains or loses time with respect to its time separation behind an airplane in advance, such predetermined spacing being in accordance with a predetermined separation time which governs the initiation of respective computer units. Such a system and method for landing random spaced airplanes has been disclosed and claimed in its broadest aspects in the prior application of S. P. Saint, Ser. No. 569,335, filed December 22, 1944.

Although the above described method of spacing airplanes under heavy traffic conditions, particularly when visibility is poor, is highly desirable, it is also desirable under certain traffic conditions to land an airplane directly from an outer approach position without requiring the computed pattern approach maneuver. One condition under which such a direct, or straight-in, landing approach maneuver is desirable is for an emergency landing when it is desired to land an airplane as soon as possible. Another condition where it is desirable to be able to make straight-in landing approach maneuvers is where traffic is relatively light and it is not necessary to hold airplanes to await their turns for landing. Still another condition is where visibility is good for a straight-in approach while it is limited in the holding stacks at higher altitudes.

An object of the present invention is to so time and interlock indications relative to clearance to initiate landing approach maneuvers on an approach controller's control board that it is indicated on the board as to when the controller can call an airplane to initiate a straight-in landing approach maneuver in order that such airplane may in landing on the runway follow a preceding airplane that is landing by a computed pattern approach by at least a predetermined separation time. In order to time such indication, a computed pattern timer is provided for this purpose for each of the computer units, and such timer is initiated when that computer unit is initiated. At the expiration of the timed interval of the last of such computed pattern timers that has been initiated for the computed approach of an airplane, an indicator lamp on the control board is energized to indicate to a controller that a straight-in landing approach maneuver can be initiated from a particular outer marker in approach to the airport.

Similarly another object of the present invention is to so time and interlock indications on the controller's board relative to the permissible time for initiating landing approach maneuvers that it is indicated as to when the controller can call an airplane to initiate a computed pattern landing approach maneuver in order that such airplane may in landing on the runway follow a preceding airplane that is landed by a straight-in approach maneuver by a predetermined separation time. In order to time such indication a straight-in timer is provided especially for this purpose. Because of the relatively short time required to be measured by this timer for each straight-in landing approach maneuver, only a single timer is required as its timing operation can be completed for any given landing approach maneuver prior to the time when a successive straight-in landing approach maneuver is started which would also require the timer to be initiated.

Another object of the present invention is to provide a stepping organization that can be selectively used for governing the separation of either successive computed pattern landing approach maneuvers or successive straight-in landing approach maneuvers. In either case, a manually adjustable separation timer governs the rate of the stepping and thus is used to govern the separation of airplanes for either of the two different types of landing approach maneuvers. The stepper, respective computer units and separation timer are restored upon manual designation of a straight-in landing approach maneuver, and the stepper and the separation timer then become effective for governing indications effecting the desired spacing for straight-in landing approach maneuvers. Subsequent to there appearing on the board an indication that a computed pattern approach maneuver can be initiated following a straight-in landing approach maneuver, the stepper and separation timer and the respective computer units can again be rendered active for computing pattern landing approach maneuvers after first actuating resequencing means so as to insure that these respective components of the system are properly initiated to obtain full timing operations.

Another object of the present invention is to provide a warning indication when an airplane in making its landing maneuver approach is a predetermined time away from the end of the runway so that the runway may be cleared for the landing maneuver. Such warning is determined for computed landing approach maneuvers by warning timers provided for the respective computer units which are initiated by their associated units. Separate warning timers are provided for association with straight-in landing approach maneuvers because different settings are required, one straight-in warning timer being provided for each step of the stepper. Such warning timers are initiated by the manual designation of the respective straight-in landing approach maneuvers as they are initiated from an outer beacon.

Another object of the present invention having to do with computed pattern landing approach maneuvers is to provide a resequencing means for restoring one or more of the computer units under conditions where a computed landing approach maneuver that has been initiated cannot be completed. One of these conditions arises where an airplane whose computed landing approach maneuver has been initiated cannot make a landing at that time and is cleared out of the inner holding stack from which the landing approach maneuvers are made into an outer position. Under this condition it will be readily apparent that only the control of a single computer unit is involved and thus only such single computer unit is restored. On the other hand, if for some reason an airplane is required to start its landing approach maneuver over again, not only must its computer unit be restored and restarted, but all computer units that have been initiated for patterns for airplanes to be subsequently landed must also be restored and reinitiated at separation time intervals because the time required to recompute the landing pattern of the first airplane necessarily upsets the separation timing for the subsequent landing approach maneuvers that are in progress of being computed.

Other objects, purposes, and characteristic features of the present invention will be in part obvious from the accompanying drawings and in part pointed out as the description progresses.

In describing the invention in detail reference is made to the accompanying drawings in which similar reference characters designate corresponding parts throughout the several views and in which—

Fig. 1 illustrates control boards for a plurality of approach controllers together with computer and timer units that are common to all control boards;

Fig. 2 is a view in perspective of a typical token plug that is used for insertion in a controller's board for manual designation of the presence of an airplane in any given holding stack at any given altitude;

Fig. 3 is a view in perspective of the more essential parts of a typical group of timers;

Fig. 17 illustrates a resequencing organization for restoring and restarting the respective computer units and resequencing the stepper under certain conditions;

Fig. 20 is a plan view of respective flight patterns within an area in approach of a runway, particularly illustrating the location of radio markers which define the limits of the respective holding stacks;

Fig. 21 illustrates diagrammatically in perspective the flight paths that airplanes may take in making respective landing maneuvers and approaches to a runway;

Figure 22B:
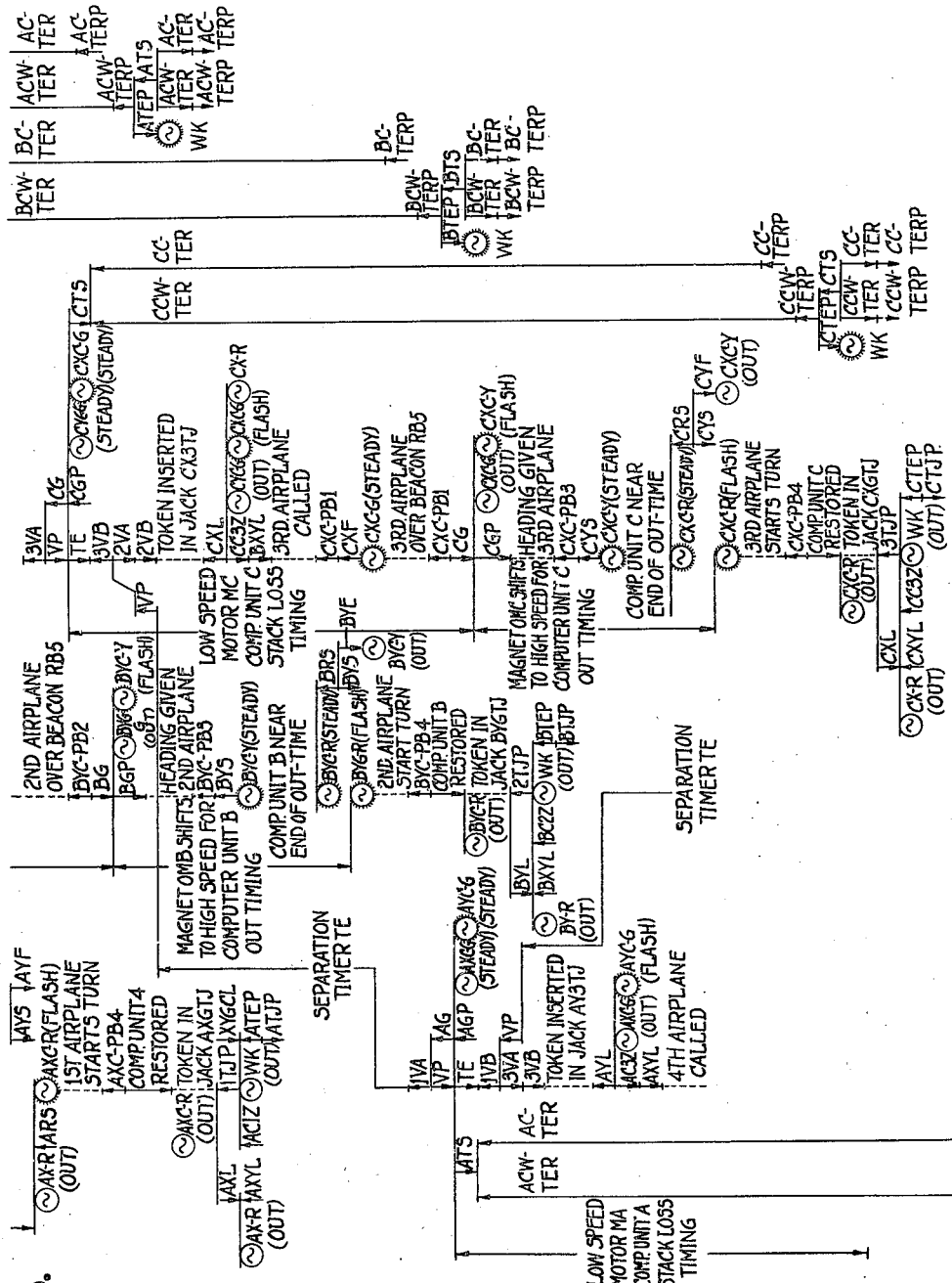
Figure 23A:
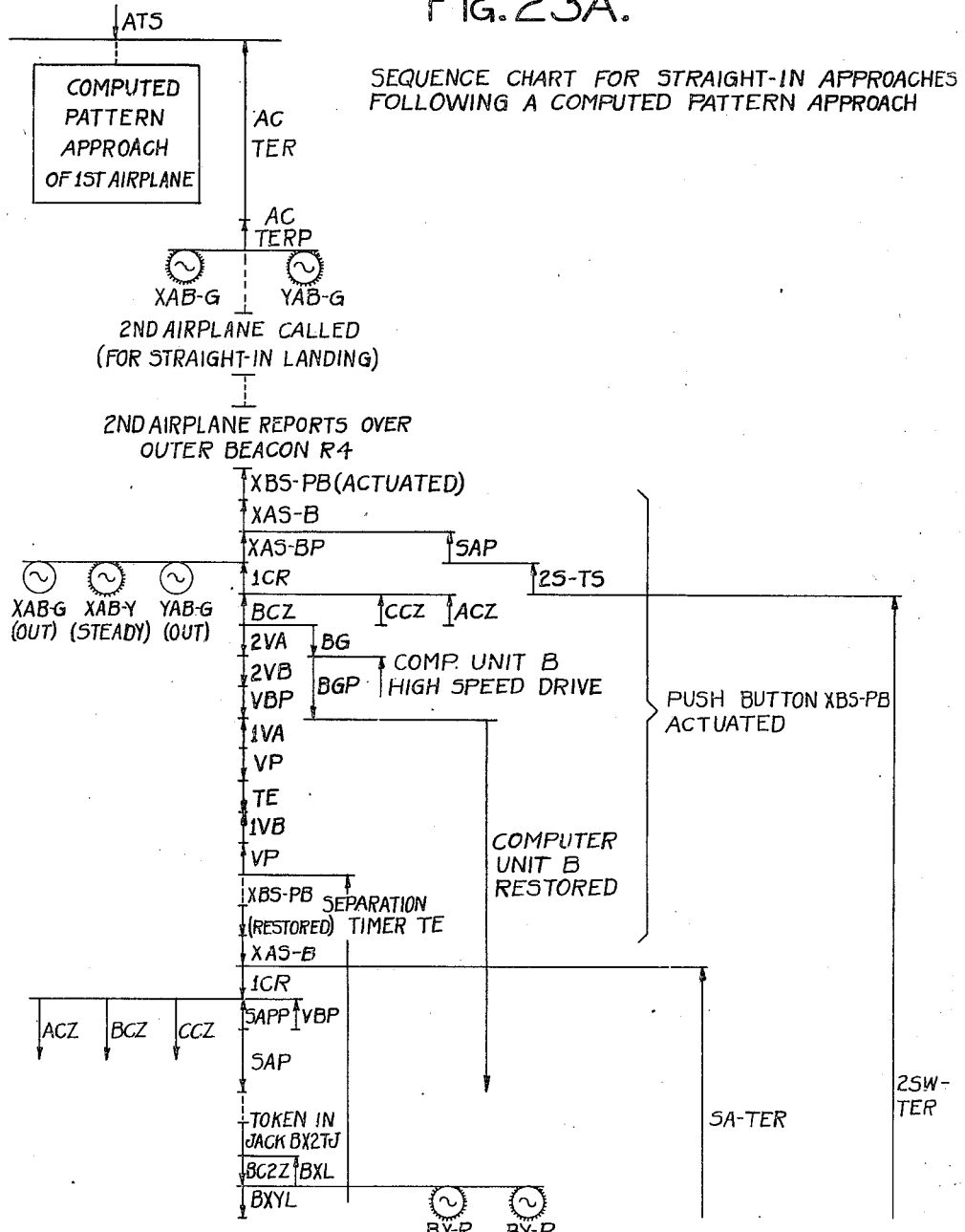
Figure 24:
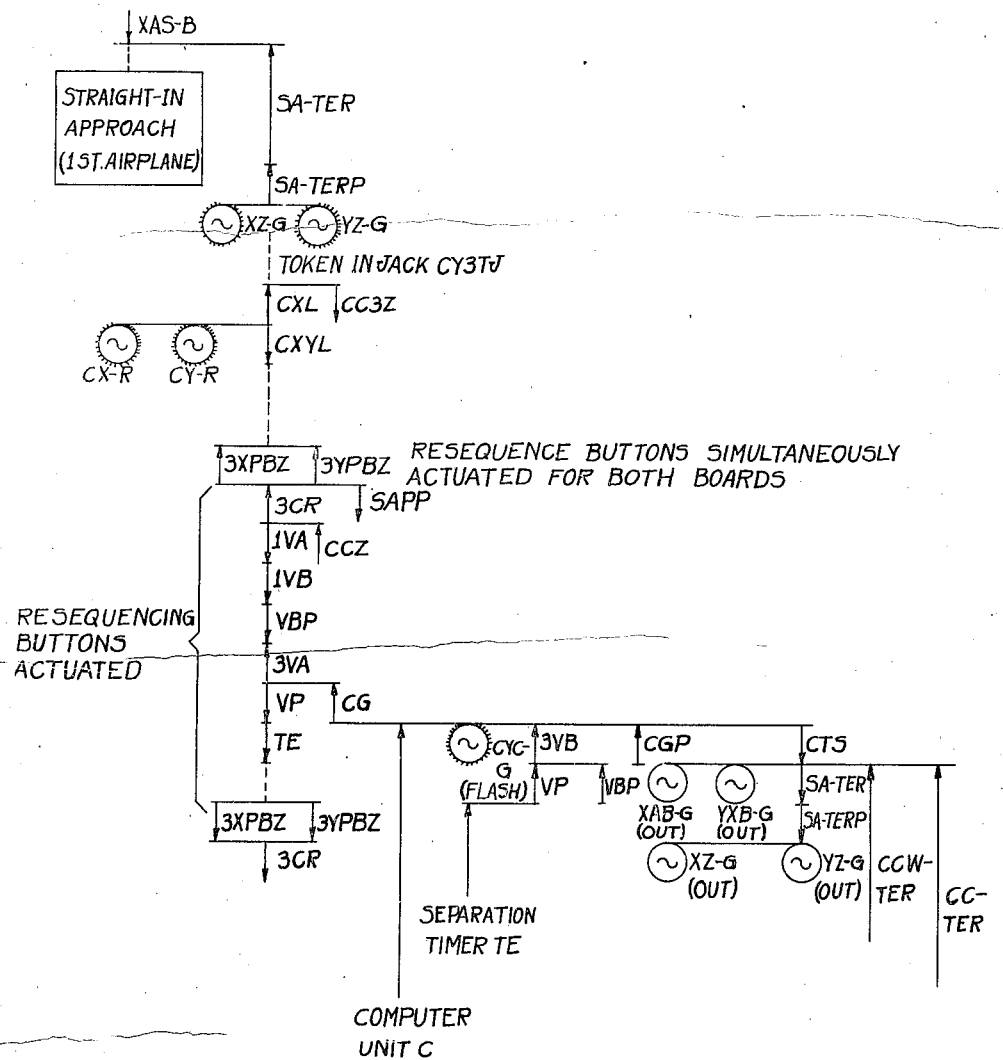

Figs. 22A and 22B when placed one above the other illustrate diagrammatically the sequencing of respective operations of the system throughout a complete cycle of operation of a plurality of computer units in computing patterns for landing approach maneuvers of respective airplanes;

Figs. 23A and 23B when placed one above the other illustrate diagrammatically the sequence of operation of the organization wherein a straight-in landing approach maneuver follows a computed pattern landing approach maneuver, and where there are successive straight-in landing approach maneuvers;

Fig. 24 illustrates diagrammatically the sequence of operation of respective parts of the organization under a typical condition where a straight-in approach maneuver is followed by a computed pattern approach; and Figs. 25A and 25B illustrate arrangements of the drawings which facilitate an understanding of the mode of operation of the system.

Figure 19:
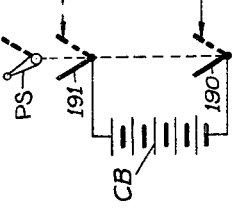
Fig. 19 illustrates the manner in which direct current energy for the respective control circuits is broken through a manual power switch.

The circuit organizations in the respective drawings have been made in a conventional schematic manner to more particularly facilitate the illustration of the system organization and mode of operation than to particularly point out the construction and arrangement of parts that would be ordinarily provided in accordance with the requirements of practice. The symbols (+) and (—) are used throughout the several illustrations to indicate connections to respective positive and negative terminals of one or more suitable sources of direct current through a manual power switch PS as illustrated in Fig. 19. Energy thus designated is to be understood as to be steadily applied to the respective circuits, only when the power switch PS is closed. The symbol (F+) is used to indicate direct current energization through a suitable interrupter or flasher contact such, for example, as through a contact of a flashing relay of the character disclosed in the patent to O. S. Field, Patent No. 2,097,786, dated November 2, 1937. The symbols (BX) and (CX) are used for designation of connections to respective instantaneous positive and negative terminals of a suitable source of alternating current.

*General organization for approach control*

With reference to Figs. 20 and 21, the general organization for the defining of specific flight patterns at and in approach of a runway is illustrated. For the purpose of providing holding means for a large number of airplanes at and in approach of an airport, outer and inner holding stacks are defined by having their longitudinal limits governed by the spacing of ground located radio compass beacons that are distinctive as by their transmitters and frequencies. It will be readily understood as the description progresses that various patterns of holding stacks may be employed and the holding stacks may vary in number, size, and location in accordance with the requirements of practice. However, for this embodiment of the present invention, the beacons RB1, RB2 and RB3 are illustrated in Figs. 20 and 21 as being spaced from each other and located in alignment with the longitudinal axis of the runway at the left-hand end thereof, and the beacons RB4, RB5, and RB6 are spaced from each other and located along the longitudinal axis of the runway at the right-hand end thereof. The beacons RB1 and RB4 are considered as the outer beacons associated with the respective left and right approaches to the runway, and it is these beacons that are used to locate a starting point for timing straight-in landing approach maneuvers.

If a straight-in landing approach is not to be made, when an airplane is approaching one of the outer stacks such as the stack $a$, the pilot sets his automatic direction finder pointers to the frequencies of the beacons RB1 and RB2 respectively and flies to one of these beacons. Upon reaching such beacon he makes a left-hand procedure turn and flies toward the other of the beacons and when reaching that beacon, upon making a left-hand procedure turn, he substantially follows the pattern of the outer stack $a$ as illustrated in Fig. 20. It is to be understood that this pattern is chosen particularly because it is a pattern that is easy to fly and relatively easy to define with a small number of distinctive markers, but it is to be understood that the pattern could take a different form if such is the requirements of practice.

For purpose of altitude separation in the holding stacks, the airplanes are assigned to respective altitudes, one airplane per altitude, and they are fed into the outer stacks generally by an airways controller, and preferably by a system organized for obtaining clearances for the respective airplanes as is fully disclosed in my co-pending application Ser. No. 34,961, filed June 24, 1948.

Similarly the outer stack $b$ at the right-hand end of the runway has its limits defined by the beacons RB4 and RB5, and airplanes can be fed into this outer stack as has been described for feeding airplanes into the outer stack $a$. With reference to Fig. 21, it will be noted that the outer stacks $a$ and $b$ have been illustrated as having a greater number of altitudes used for flight storage purposes because it is preferable that these stacks be principally used for holding purposes, while the inner stacks $c$ and $c^1$ are generally employed more particularly for landing approach procedures from the lower three separation altitudes employed.

Thus the general organization is that airplane landing approach procedures for three different airplanes can be respectively in progress simultaneously for airplanes within the respective 1,000, 1,500, and 2,000 foot altitudes of one or the other of the inner stacks $c$ or $c^1$. The stacks $c$ and $c^1$ are used alternately in accordance with whichever end of the runway is to be approached in a landing procedure as is generally determined by the direction of the wind. Thus in Figs. 20 and 21, the flight patterns for the respective altitudes in the inner stack $c^1$ are shown dotted to indicate that for the purpose of describing this embodiment of the present invention this stack is not in use as it is assumed that all landing approaches are made from the right-hand of the runway.

As each airplane reports leaving the 1,000 foot altitude to descend along the glide path 190 to the runway, the airplanes at the respective higher altitudes in the inner stack are instructed to descend thus leaving the upper 2,000 foot altitude vacant, whereby an ariplane can be fed to the inner stack $c$ at this altitude from either of the outer stacks $a$ or $b$. In this way, all airplanes for which computed pattern landing approach maneuvers are to be made are generally held in the outer stacks until one of the lower three flight altitudes of the inner stack that is in use are vacated, and they are then fed to the inner stack from which the pattern approaches are initiated.

For convenience in flying these respective outer and inner stack patterns, by making the outer and inner stacks adjoining substantially as illustrated in Figs. 20 and 21, a minimum number of beacons RB is required because the beacon RB5 can be made common to the outer and inner stacks $b$ and $c$, and the beacon RB2 can be made common to the outer and inner stacks $a$ and $c^1$. Because of this proximity of the outer and inner stacks, it is considered unsafe that an airplane should be assigned to any one flight altitude in one of these adjoining stacks that is occupied by an airplane in the other stack. Thus interlocking means is provided for preventing the obtaining of a clearance light by either of the approach controllers for an altitude in one of the adjoining stacks if the other adjoining stack is occupied at that altitude. For the purpose of simplification of the disclosure of the present invention this interlock is not specifically shown and described in this disclosure as it can be provided as is specifically shown and described in my above mentioned co-pending application. It is to be further understood that the outer stacks are not required to be adjoining the inner stacks and that the outer stacks may be sufficiently spaced from the inner stacks so as to permit simultaneous occupancy of a given altitude by these stacks if such is the requirements of practice. It is also to be understood that if the amount of air traffic at the airport does not warrant as many stacks as those illustrated for storage of airplanes the outer stacks may not be required, and the airplanes may be laddered down in whichever inner stack is employed, as required, to feed the airplanes via the computer approach patterns to the glide path 100 in approach of the runway. Under such conditions the outer beacons RB1 and RB4 could be considered as beacons involved in the location of a starting point for timers associated with straight-in landing approach maneuvers while the other beacons would be used in the same capacity herein disclosed for marking the limits of the inner stack and for use in computed pattern landing approach maneuvers.

Although the flight patterns for airplanes is illustrated in Fig. 21 for only specific altitudes, it is to be understood that the control boards X and Y are conditioned to handle flights at all flight altitude in all stacks, the conditions illustrated in Fig. 21 being merely conditions most commonly encountered.

Control boards

With reference to Fig. 1, the system comprises a plurality of control boards, one board being provided for each of a plurality of approach controllers that may be required to handle the landing of airplanes at an airport. Thus the board X is illustrated as being provided for one controller, and the board Y is illustrated as being provided for another controller.

Each of the boards X and Y comprises panels provided for the respective holding stacks at and in approach of the airport. The panels $A^1$ and $B^1$ are provided for the outer stacks $a$ and $b$ which are illustrated in Figs. 20 and 21, while the center panel $C^1$ is provided for the inner stack which is either stack $c$ or $c^1$ as shown in Figs. 20 and 21, dependent upon from which direction the runway is to be approached for landing operations as determined by wind direction.

Disposed in alignment across the respective panels are rows of indicator lights, push buttons, and token jacks provided for respective flight altitudes that are marked on the panels $C^1$ as varying from the ground position GD at the bottom of the boards to the 8,000 foot altitude 80 at the top of the boards. The push buttons PB that are provided on these panels for the respective flight altitudes are generally known as clearance buttons, and respective yellow and red lamps Y and R are associated therewith. These buttons and indicator lamps are employed in a manner which has been specifically set forth in my co-pending application Ser. No. 34,961, filed June 24, 1948, and reference is to be made to this application for disclosure as to the mode of operation and the apparatus involved in obtaining clearances and interlocking the respective X and Y boards so that clearance is obtained for only a single airplane per flight altitude for adjoining stacks.

Disposed along the lower portion of the center panels $C^1$ of the boards X and Y are three groups of push buttons, each group comprising buttons 1, 2, 3, and 4, which are provided for a particular unit of the computer. Thus the left-hand group of computer push buttons is associated with computer unit A, the center group with computer unit B, and the right-hand group with computer unit C.

Above each group of computer push buttons are disposed in horizontal alignment respective green, yellow, and red indicator lamps G, Y, and R for indicating respective stages of a landing approach maneuver being computed by the associated computer unit. Above these three indicator lamps for each computer unit is another red indicator lamp R for indicating when that computer unit or an associated vertical row of token jacks is in use for a landing approach.

Disposed on the lower portion of the panels $A^1$ and $B^1$ of board X are respective straight-in push buttons XAS—PB and XBS—PB for when actuated designating a straight-in landing approach as being initiated, and similar buttons YAS—PB and YBS—PB are provided on the board Y. Associated with each of the straight-in push buttons is a green indicator lamp that is illuminated when a straight-in landing approach can be initiated, and a yellow indicator lamp that is illuminated in response to the actuation of the associated straight-in push button. On panel $A^1$ of board X, for example, the green lamp XAA—G and the yellow lamp XAA—Y are associated with the straight-in button XAS—PB. Similarly on the panel $B^1$, the green lamp XAB—G and the yellow lamp XAB—Y are associated with the straight-in push button XBS—PB.

Computer

The computer 101 which is disposed between the boards X and Y to render it readily accessible by either of the approach controllers can be of a structure corresponding to that fully described in the above mentioned Field et al. application Ser. No. 573,876, filed January 22, 1945, and reference is to be made to such application for a more detailed disclosure. This computer comprises three units A and B and C, the number of units required being in accordance with the relationship of the desired range of separation times that can be selected, as compared to the complete landing approach maneuver time for each computed landing approach. In other words there is overlapping in the landing approaches that are being computed by the respective units A, B, and C when the landing maneuvers of three airplanes within predetermined separation times are being considered because of it being necessary under these conditions to start the computing of the landing approaches for second and third airplanes before computing of the landing approach for a first airplane has been completed. There is disposed along the lower portion of the panel 102 of the computer 101 heading indicator dials 103, 104, and 105 for the respective computer units on which the respective controllers can read headings for the airplanes to fly when they leave the holding stack and initiate flight in a pattern that has been computed in accordance with the stack loss time that has been consumed in the inner holding stack subsequent to the initiation of the associated computer units. Thus each computer unit has a heading dial on the panel of the computer which indicates the heading an airplane is to fly when it leaves the holding stack. Above this heading indicator dial is a pointer driven by a time shaft which indicates the time that has been consumed in the holding stack in timing an associated pattern-approach within the holding stack, and when the pointer reaches the point 106, the entire out-time of the airplane in flying the outer pattern has been consumed and thus that computer unit has completed its computer cycle. This is not however the indication that is used by the approach controllers when the out-time has been completed, as indicator lamps R are provided on the respective boards X and Y for this purpose, such lamps being steadily energized when their associated computer units are near the end of their respective computing cycles, and being energized with flashing energy when the associated computer cycles have been completed.

The computer has various other dials on its panel 102 for feeding corrections and various settings into the respective computer units. It is to be understood that these dials and the manner in which they feed correction into the respective computer units can be provided in any suitable manner according to the requirements of practice. It is assumed for this embodiment of the present invention that these corrections are fed into the computer 101 as is fully disclosed in the above mentioned prior Field et al. application. The pointer 107 is set in accordance with the designation of the direction of approach to the runway that is to be used for the landing of airplanes, and the setting of this pointer affects the heading indication dials of the respective computer units A, B, and C so as to provide a direct reading of the proper compass heading for each airplane when it leaves the holding stack to fly the holding loop, irrespective of what runway is being used.

The pointer 108 on the panel 102 of the computer governs the setting of the separation timer TE (see Fig. 5) which is used for determining the rate at which the respective computer units A, B, and C are sequenced. The setting of this timer is in accordance with the desired time spacing of the airplanes in making their landings.

The pointer 109 is used to insert a correction into the computer for the drift angle, and the pointer 110 is set in accordance with the effective windage so as to correct the timing of the respective computer units A, B, and C in accordance with these factors which affect the time of flight of the airplanes.

Also disposed on the panel 102 of the computer is a main power switch PS, a computer start switch KS, and a straight-in selector switch SAL. The straight-in selector switch SAL is positioned in accordance with from which end of the runway straight-in approaches are made. In practice the switch SAL may be actuated by the pointer 107 which also is actuated in accordance with the direction of approach of the runway.

At the top of the panel of the computer is a warning indicator lamp WK which indicates when there is an airplane within a predetermined flight time of the end of the runway that is being used for landing maneuvers.

Figure 5:
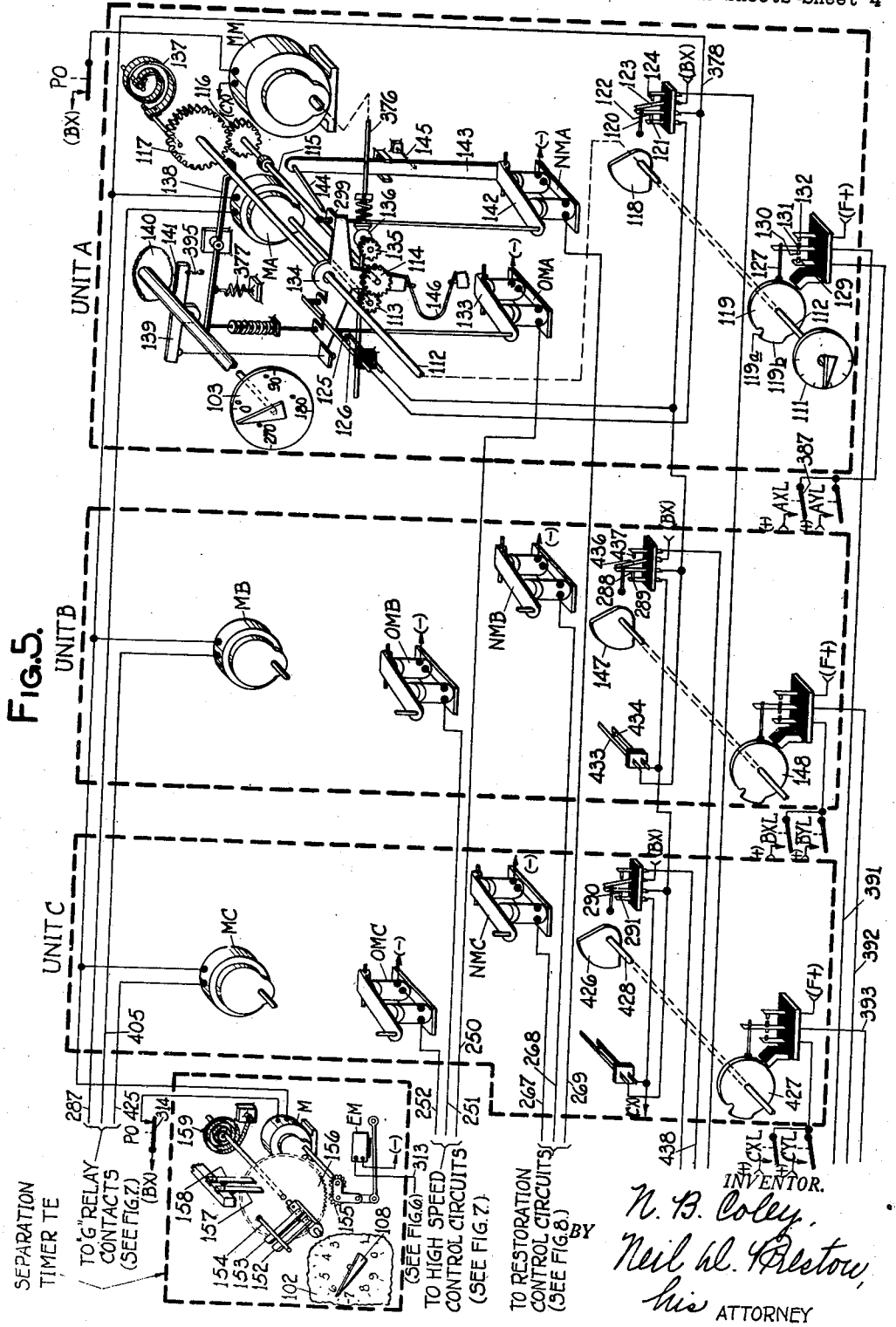
Fig. 5 is a view in perspective illustrating some of the principal parts of the computer and separation timer organization.

Inasmuch as reference can be made to the above mentioned Field et al. application for a complete description of the computer, the present disclosure has been limited principally to such parts of the respective computer units A, B, and C as affect, or are governed by, the circuit organization as employed in accordance with the present invention. With reference to Fig. 5, the respective computer units A, B, and C comprise similar component parts, the parts more actively governing the operation of a computer unit being more specifically illustrated for the typical unit A.

The time pointer 111 of unit A in Fig. 5 will be readily identified as being the pointer designated by the corresponding reference character in Fig. 1, and similarly the heading indicator dial 103 of Fig. 5 for unit A will be readily identified as the similarly designated heading dial of Fig. 1. These dials are driven by a motor MA of computer unit A for measuring the stack-loss time and determining the heading an airplane must fly in leaving the holding stack. Similar motors MB and MC are provided for similar purposes in the respective computer units B and C.

The time shaft 112 of computer unit A is driven by the motor MA through the pinion 113, gear 114, shaft 115, and gears 116 and 117, and although various corrections are inserted into the time shaft 112 as indicated by dotted portions of the shaft, it is believed only necessary for an understanding of the present invention to assume that the time shaft 112 drives the cams 118 and 119 which respectively operate suitable contacts associated therewith. The cam 118 actuates the pusher 120 to open the connection between contact points 121 and 122 at a time when the maximum stack-loss time position of the computer unit A is reached, and this pusher is effective at this time to close a connection between contact points 123 and 124 for the energization of a yellow lamp in a manner to be hereinafter more fully considered when considering the mode of operation of the system. One function of this cam and contact combination is to interrupt the circuits for the motors MA, MB, and MC and the separation timer motor M and other separation and warning timers so as to maintain the established relative timing sequence between the respective timer units at such times as when there is an abnormally long separation in successive pattern approaches.

Associated circuitwise with these contact points are the contact points 125 and 126 which become closed when an airplane is designated as having reported over the beacon RB5 (see Fig. 20), for example, in initiating flight of a computed holding loop. Thus it is by these contacts that the stopping of the motors MA, MB, MC, and M is forestalled provided that the computer unit A is put into use for computing a pattern approach within a reasonable short time after its initiation so that it does not reach its maximum stack-loss time before an airplane is designated as over beacon RB5.

The cam 119 of the computer unit A is used in governing a red indicator lamp to indicate the end of the out-time in flight of a holding loop, and thus the pusher 127 drops into the recess 119a of the cam 119 to close contact points 129 and 130 and provide steady energization of a red indicator lamp to indicate that the out-time is nearly reached. When such out-time becomes completely timed, the raised portion 119b of the cam 119 actuates the pusher 127 to the right and closes the contact points 131 and 132 to change the energization of the red out-time indicator lamp from steady to flashing.

The magnet OMA of unit A is provided for shifting the drive of the time shaft 112 from the relatively low speed drive of the motor MA to the higher speed drive of the motor MM when an airplane having its approach timed by the unit A is designated as having left the inner holding jack. The energization of the magnet OMA, by causing the attraction of the armature 133 shifts the spider 134 counter-clockwise and thereby causes the time shaft 112 to be disconnected from drive by the pinion 113 and to be driven by the motor MM through the pinion 135 and the clutch 136. It will be noted that the time shaft 112 is being locked against being restored by the spring 137 during the shifting of the spider 134 under these conditions by a suitable locking tooth 138 that engages the gear 117 on the time shaft 112 only during the momentary energization of the magnet OMA at the time of shifting of the spider 134. It will also be noted that the shifting of the spider 134 is effective to lock the heading indicator dial 103 by the application of the brake 139 to the gear 140 on the heading shaft 141.

The magnet NMA of computer unit A is provided for restoration of that computer unit A to normal, such magnet being momentarily energized upon actuation of a button for restoration of that computer unit in a manner to be hereinafter considered when considering more specifically the mode of operation of the system.

Upon energization of the restoration magnet NMA, the attraction of the armature 142 of that magnet, in addition to rotating the spider 134 clockwise about its pivot point to disengage the drive pinion 135, actuates the lever 143 about its pivot point to the extent of locking the spider 134 with the rod 144 so as to prevent full restoration of the spider 134 to its fully clockwise rotated position. Thus the spider 134 is held in a mid-position for a time interval determined by the slow release characteristics of the magnet NMA sufficient to permit the spring 137 to restore the time shaft 112 and the heading shaft 141 to their initial positions. It will be noted that the tooth 138 does not engage the gear 117 during this time because the magnet OMA is deenergized. It is therefore provided that upon restoration of the armature 142 of the magnet NMA, the spring 145 disengages the rod 144 from the spider 134 and permits the spider 134 to be snapped by the toggle spring 146, to its fully restored position for engagement with the low speed pinion 113. The clockwise rotation of the spider 134 releases the brake 139 from the gear 140 and permits the heading indicator 103 to be restored along with the restoration of the time shaft 112 and the time pointer 111.

Similarly, for computer unit B, the magnet OMB is effective to shift the drive of the time shaft of unit B from low to high speed, the contact points associated with the cams 147 and 148 are actuated as has been described for similar contact points associated with unit A, and the restoration magnet NMB is effective to restore the computer unit B upon its momentary energization. The unit C has its drive of its time shaft shifted from low speed to high speed by the magnet OMC, and a magnet NMC is provided for restoring the computer unit C in response to its momentary energization. It is to be understood that each of the units B and C is of a structure comparable to computer unit A, except that the out-time motor MM is common to all three computer units.

The manual designation of occupancy of an airplane of any flight altitude in any stack is accomplished by the insertion of a suitable token such as the typical token illustrtaed in Fig. 2 into the token jack for the corresponding flight altitude and stack. Thus a token is prepared for each airplane flight as supervision of that flight is given to an approach controller, such token bearing a card 149 on which is marked the identity of the flight and such other information as is helpful to the approach controller. The embodiment of the typical token illustrated in Fig. 2 comprises a pin having a plug portion 150 for insertion within the opening of a token jack and having a knurled portion 151 to facilitate the manual insertion and removal of the token from the respective token jacks. Although this system of token and token jack combination is employed in this embodiment of the present invention for manual designation of occupancy by airplanes of respective flight altitudes in respective stacks, it is to be understood that other suitable means for manual designation of these conditions can be used in accordance with the requirements of practice.

With reference to Fig. 5, the separation timer TE for governing the rate of sequencing of the computer units is contained within the housing of the computer 101, although it has no mechanical connections to the respective computer units. It will thus be readily apparent that the separation timer TE could as well be located in association with other apparatus in accordance with the requirements of practice. It has been pointed out that the separation timer TE according to this embodiment of the present invention has its settings determined by the actuation of the pointer 108 (see Fig. 1) on the panel 102 of the computer 101. This pointer is normally biased to a locked position with respect to rotation, and a change in setting is accomplished by depressing the pointer 108 and rotating the pointer to the desired setting while it is depressed.

The structure of the separation timer TE can be of the general character disclosed in the patent to O. S. Field, Pat. No. 2,378,293, dated June 12, 1945 except that it is desirable to modify the means for designating the time settings from the means in that Field patent so that the separation timer TE can be set by merely depressing the pointer and rotating in one direction or the other to the desired separation timer setting which is preferably marked on the panel 102 of the computer 101. The manner in which this setting can be accomplished is fully described in the above-mentioned Field et al. application Ser. No. 573,876, filed January 22, 1945. This means of setting the timer is also comparable to the means disclosed for the center of the three timers illustrated in Fig. 3 of the present disclosure, the structure of which will be hereinafter considered.

For an understanding of the structure of the separation timer TE for the purpose of the present invention, it is believed sufficient to consider that the timer TE has normally closed back contact strips 152 and 153, and a contact bar 154 which opens electrical connection between these contacts 152 and 153 upon energization of the motor M together with energization of magnet EM to engage the pinion 155 with the gear 156 which drives the contact bar 154 to close a circuit between the front contact strips 157 and 158 of the timer. Upon deenergization of the magnet EM subsequent to the timer having completed its operation, the pinion 155 is disengaged from the gear 156, and the gear 156 is restored by the spring 159 to a position wherein the back contact strips 152 and 153 are shunted by the contact bar 154. Another component of the organization is the timer cabinet 160 illustrated in Fig. 1. This timer cabinet houses several groups of timers used for various purposes to be more readily understood as the description progresses in considering the mode of operation of the system. Due to the fact that these groups of timers must be adjusted from time to time to different settings in accordance with varying conditions of windage, traffic, and the like, it is desirable that they be located as shown within convenient reach of the respective approach controllers so that their settings can be changed from time to time as required. These respective timers can be of the general structure of the separation timer TE and thus the timer structure can be, for example, as is fully disclosed in the Field Patent No. 2,378,293, dated June 12, 1945. These timers, like the separation timer TE, are adapted to be set by the depression of a pointer and rotation of that pointer while in its depressed position to the desired marking that is provided on the panel 161 of the timer cabinet 160.

Figure 4:
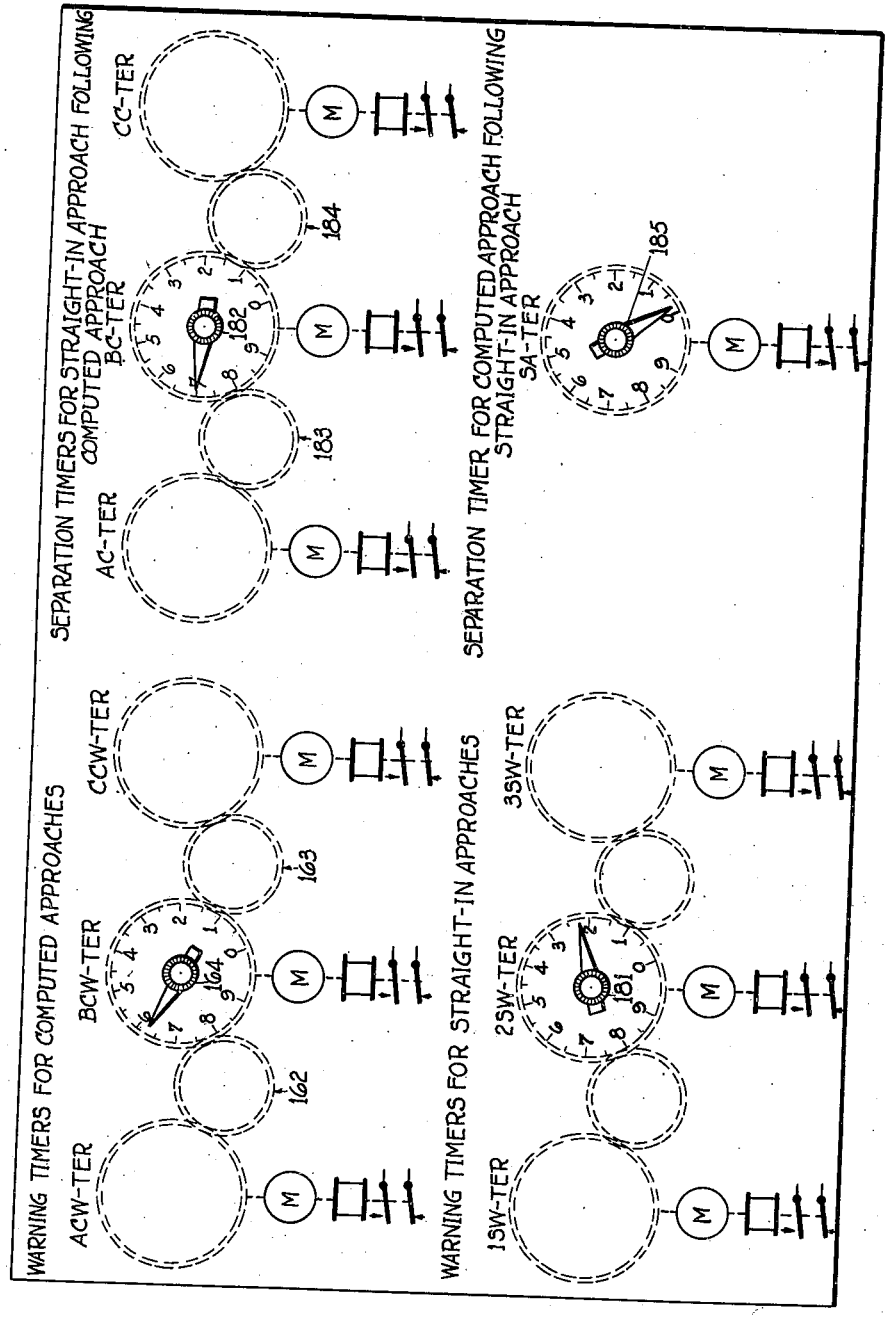
Fig. 4 is a diagram indicating somewhat schematically the grouping of the timers for adjustments of their time settings by respective pointers on the front panel of the timer cabinet.

The organization of the respective timers in groups in the timer cabinet for specific purposes is somewhat schematically illustrated in Fig. 4. It is thus illustrated that three warning timers are provided in the upper left-hand portion of the timer cabinet for association with computed pattern approaches, one timer being associated with each of the computer units A, B, and C. Thus the timer ACW—TER is provided for association with computer unit A, the timer BCW—TER is provided for association with the computer unit B and the timer CCW—TER is provided for association with the computer unit C. Each of these timers has its separate drive motor and electromagnet for engagement of its time gear as well as separate contact means including both normally closed and normally opened contacts as required. For purpose of simplification of the setting of this group of timers, it is provided by connection of the timers ACW—TER and CCW—TER to the timer unit BCW—TER by the respective idler gears 162 and 163 that a change in the setting of the timer BCW—TER by the depression and rotation of the point 164 is also effective to change the associated timers of that group in a corresponding manner. The coupling of the timers of the group is only for cooperative adjustment purposes, the timing operations of the respective timers of the group being entirely independent of each other.

With reference to Fig. 3, the more essential operating parts of this group of timers that has just been considered is illustrated wherein separate timer motors ACM, BCM, and CCM are provided for driving the respective timers of the group, each timer having a spur gear driven through pinion linkage from its associated motor only in accordance with the energization of a suitable electro-magnet 166. Each of the spur gears 165 is suitably secured on a shaft 167 that is biased in a counter-clockwise rotated position by a suitable coil spring 168 so that the deenergization of the electro-magnet 166 of that timer at any time provides for the restoration of that timer so that the contact 169 of that timer closes a circuit between the respective associated back contact strips 170 and 171. It will be noted, however, that the organization is such that if the magnet 166 of any timer is maintained energized but the associated drive motor is deenergized at a mid-position of the timer, the timer is maintained in such mid-position until such time as the motor is again energized or the electro-magnet is deenergized. This is by reason of a suitable gear reduction in the timer motor which prevents the motor from being driven backwards by the bias of the coil spring 168.

The front contact strips 172 and 173 of the respective timers are suitably secured to a fixed block 174 of insulating material, but the back contact strips 170 and 171 of these timers are secured to a strip of insulating material fixed to an adjustment shaft 175 (176 for the center timer) which is rotative in accordance with the depression and rotation of the pointer in changing the settings of the timers. Thus if the adjustment shaft 175 is rotated counter-clockwise that timer is adjusted to measure a greater time interval, and as this adjustment shaft 175 is rotated clockwise the time interval to be measured is reduced.

The adjustment shaft 176 carries a spur gear 177, the teeth of which are engaged by the dog 178 which is fixed with respect to rotation. The compression spring 179 on the adjustment shaft 176 biases the gear 177 in engagement with the fixed dog 178, but permits its disengagement upon depressing the pointer 164, thus permitting a change in the setting of the timer only upon depression and rotation of the pointer 164.

Inasmuch as it is desirable to change the settings of all timers of this group correspondingly, the adjustment shafts 175 of the left-hand and right-hand timers are secured to respective spur gears 180 through respective idler gears 162 and 163 which are made sufficiently broad to be in mesh at all times with the spur gear 177 so that normally the adjustments for all three timer units are locked by the dog 178, and all timer units are adjusted correspondingly when the pointer 164 is depressed and rotated.

Having thus described specifically the organization of the group of timers having their timing adjustments set by the pointer 164, it is to be understood that this organization is typical of the organizations of the respective groups of timers indicated in Fig. 4 as being associated with the pointers 181 and 182 respectively.

The three timers 1SW—TER, 2SW—TER, and 3SW—TER have their timer settings adjusted by the pointer 181, such timers being provided, one for each step of the stepper, as warning timers for governing an indication as to when respective airplanes making straight-in landings are within a certain time interval from the end of the runway.

The timers AC—TER, BC—TER, and CC—TER are computer separation timers that are provided for the respective computer units A, B, and C to be initiated during the operation of their respective computer units for the purpose of determining when a subsequent straight-in approach can be initiated. It will be noted in Fig. 4 that these three timers have their time settings determined by the position of the pointer 182, the timers AC—TER and CC—TER being adjusted through the medium of the idler gears 183 and 184 respectively.

The means for determining what the time setting of the pointers of the timers shall be in accordance with the effective windage, the speed of the airplane, and the distance between respective beacons and the end of the runway will be hereinafter considered when considering the mode of operation of the system under certain typical assumed operating conditions.

The lower right-hand pointer 185 on the panel 161 of the timer cabinet 160 as illustrated in Fig. 4 is for adjustment of the straight-in separation timer SA—TER which is used for the control of an indicator for determining when a computed approach can be initiated subsequent to a straight-in approach having been made. Due to there being no overlap in the timing intervals required to be timed by this timer when initiated by successive straight-in approaches, only a single timer is required for this purpose, the settings on the timer being determined similar to the settings for the other timers adjusted by the other pointers in that windage, speed of the airplane, desired separation time, and distance between beacons must be considered. The manner in which these settings are determined will be hereinafter considered when considering the mode of operation of the system.

General circuit organization

Having thus considered the structure of the respective control boards X and Y, the computer 101, and the timers in the timer cabinet 160, consideration will now be given as to the general purposes of the respective circuit organizations, specific consideration of the circuits being hereinafter given with particular reference to the consideration of typical assumed conditions of operation.

Figure 6:
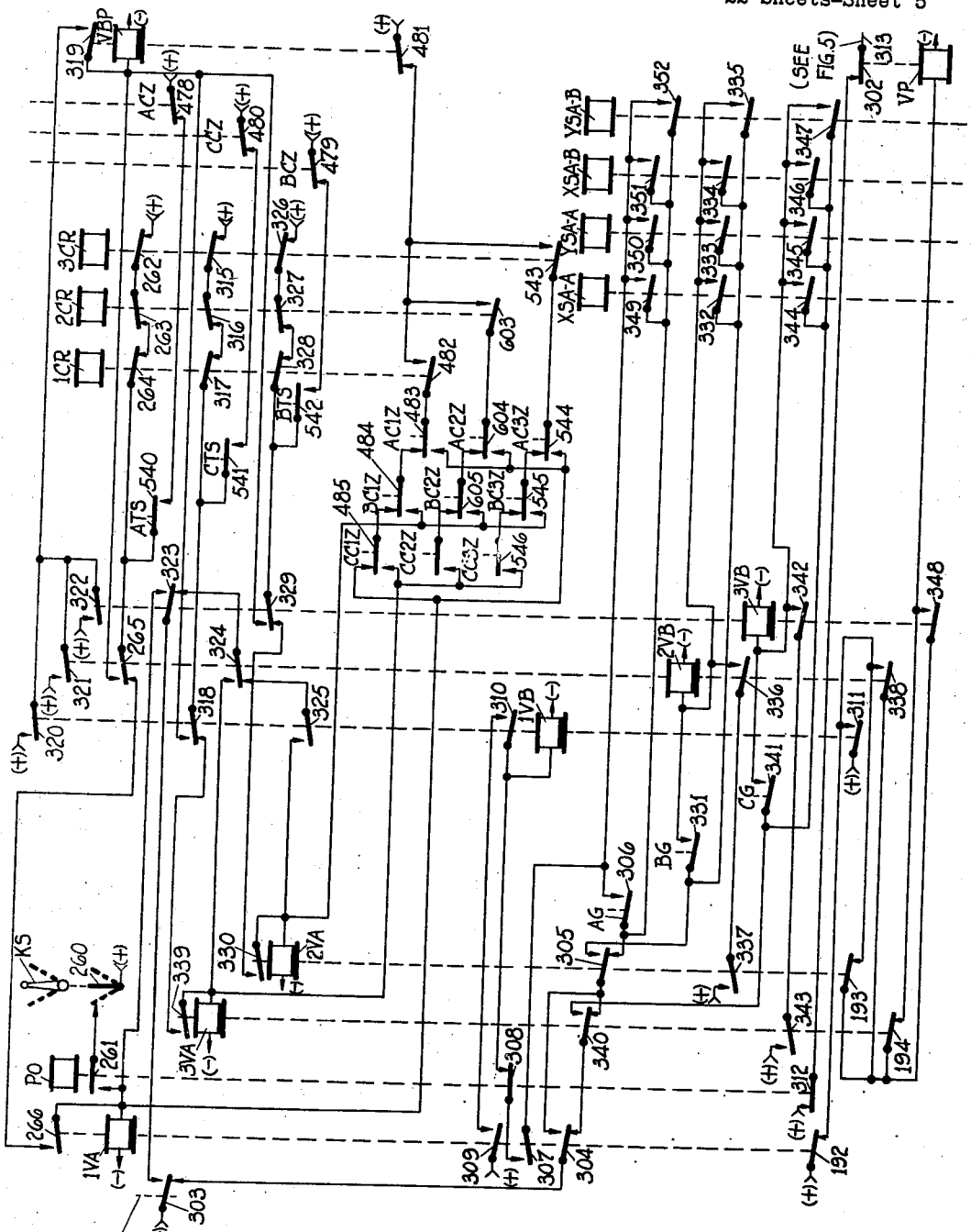
Fig. 6 illustrates a stepper organization that can be used either in separating successive computed landing approach maneuvers or straight-in landing approach maneuvers.

The stepper organization for this embodiment of the present invention is illustrated in Fig. 6 wherein a relay VA and a relay VB is provided for each of the three steps of the stepper, the relay VA for each step being picked up in response to the combination of the operation of the separation timer shown in Fig. 5, and the relay VB of the preceding step being picked up. The relays VB are picked up on the successive steps only when the separation timer TE is restored. Thus the rate of the stepping is determined by the separation timer TE.

A half step relay VP is provided for governing the operation of the separation timer TE so as to initiate that timer each time that a relay VB is picked up, and so as to restore that timer each time that a relay VA is picked up. The relay VBP which preferably has slow drop away characteristics is also associated with the stepper as a stick repeater of the relays VB so as to be dropped away under conditions where it is desirable to resequence the stepper and thereby act to reinitiate the stepper under these conditions.

Figure 7:
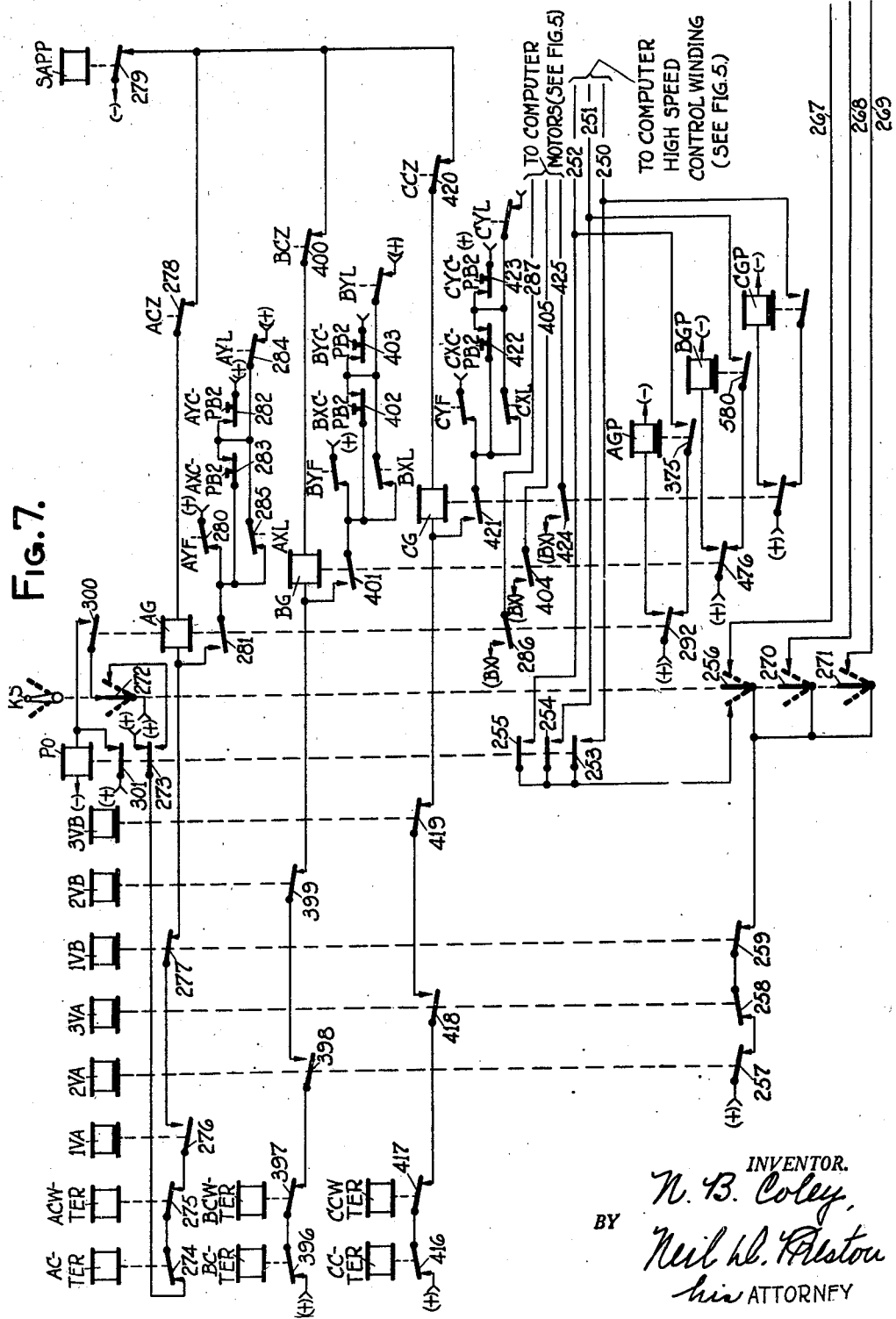
Fig. 7 illustrates a circuit organization governed by the stepper when computed landing approach maneuvers are made.

With reference to Fig. 7 a relay G and an associated slow drop away relay GP is provided for each of the computer units. A relay G is picked up in response to each step of the stepper when the system is in operation for computing pattern approaches, and it is the picking up of this relay that initiates the computer unit associated with that step. When straight-in approaches are made, these relays are inactive.

Figure 8:
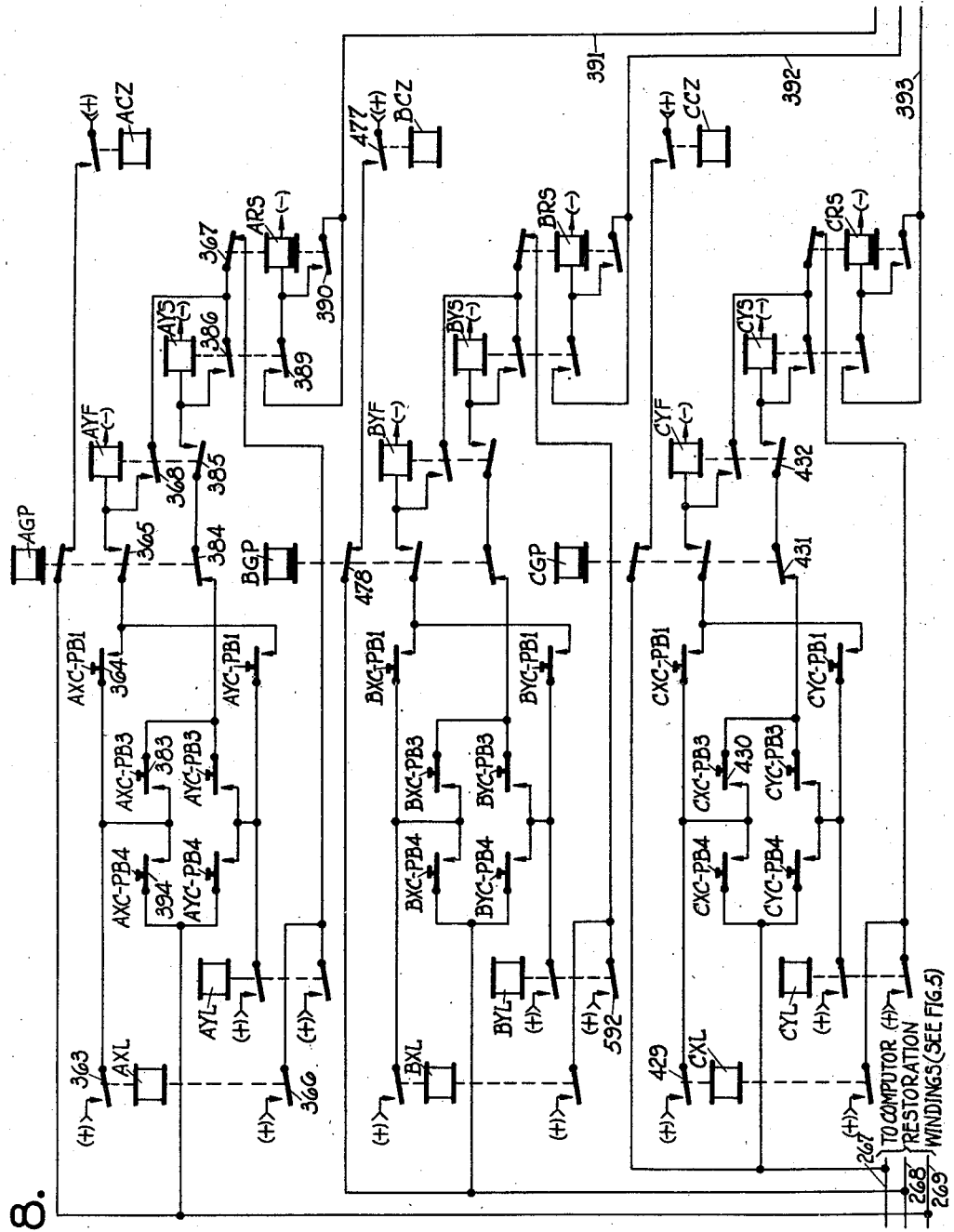
Fig. 8 illustrates a means of control for indication control relays which are used when computed pattern landing approach maneuvers are made.

With reference to Fig. 8, a group of indication control relays YF, YS, and RS and their control circuits are provided for each of the computer units A, B, and C, the relay RS of each group having slow drop away characteristics. These relays are picked up in the respective order in which they are mentioned above at various stages of computed pattern approaches in response to the actuation of control push buttons for the associated computer units.

Figure 9:
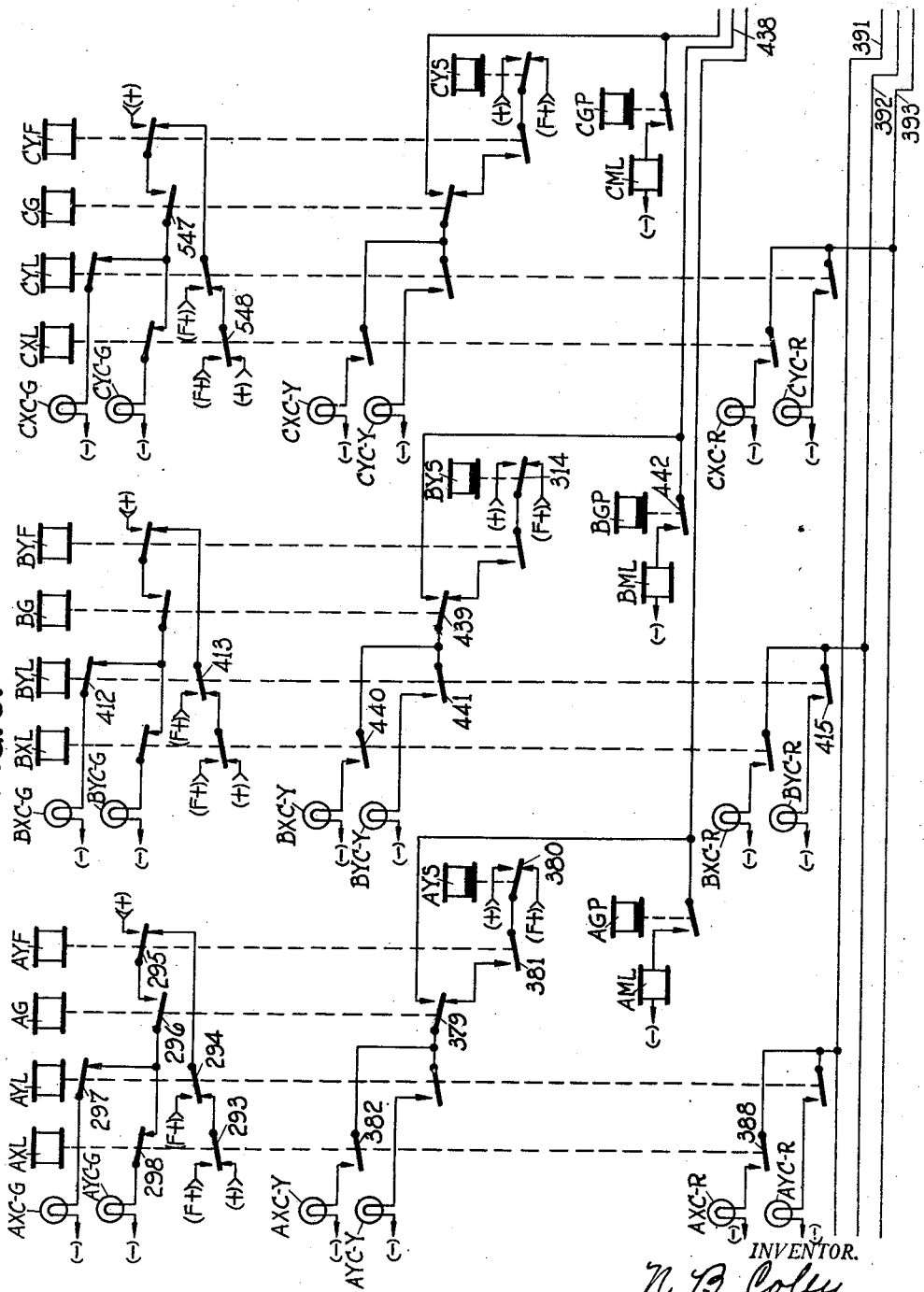
Fig. 9 illustrates an organization for the control of indicator lamps associated with respective computer units for indicating progress of respective airplanes in making their computed pattern landing approach maneuvers.

With reference to Fig. 9, respective groups of green, yellow, and red indicator lamps and their control circuits are provided for each of the boards and for the computer units, such lamps having their circuits controlled by the conditions of the indication control relays YF, YS, and RS for the associated computer unit. A relay ML is illustrated as being provided for each of the computer units, such relay being picked up in response to its associated computer unit having completed the measuring of maximum stack-loss time prior to designation that an airplane has left the stack to initiate flight of a holding loop.

Figure 10:
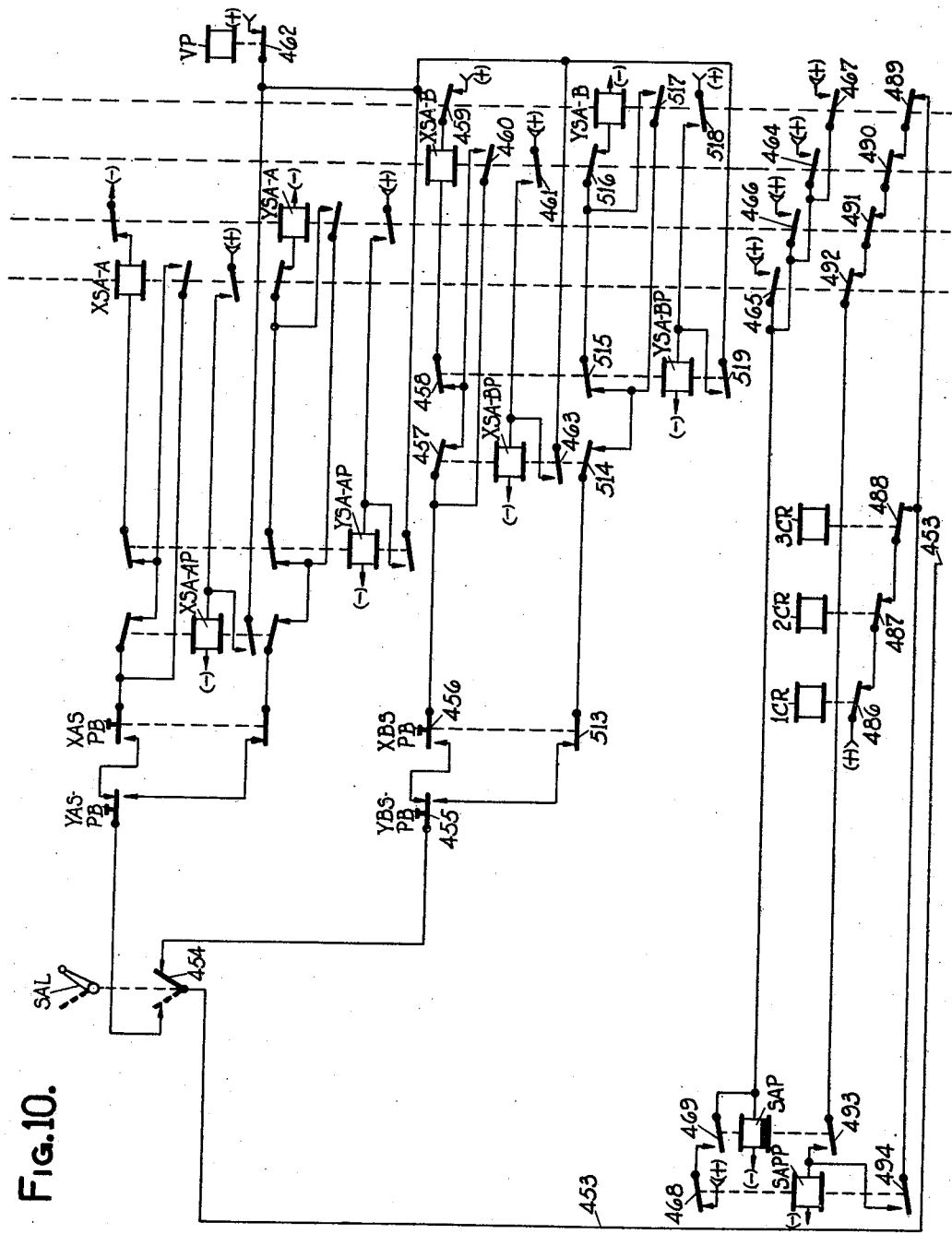
Fig. 10 illustrates an organization conditioned in response to manual designation of respective straight-in landing approach maneuvers.

Straight-in control relays XSA—A, YSA—A, XSA—B, and YSA—B as shown in Fig. 10 are provided for governing the intiation of the system for the making of straight-in landing approaches from the outer beacons associated with the respective stacks a and b (see Fig. 20). Relays XSA—A and YSA—A are associated with straight-in landing approaches in approach of the left-hand end of the runway as designated respectively on board X or board Y. The relays XSA—B and YSA—B are similarly associated with straight-in landing approaches in approach of the right-hand end of the runway. The positioning of the straight-in selector switch SAL on the panel 102 of the computer 101 (see Fig. 1) determines which of these two groups of relays is subject to control in accordance with which end of the runway is to be approached. Repeater stick relays XSA—AP, YSA—AP, XSA—BP, and YSA—BP are provided to maintain straight-in controls effective for the duration of the time interval measured by the separation timer TE. The relays XSA—A, YSA—A, XSA—B, and YSA—B, on the other hand, are only momentarily picked up in response to the actuation of the straight-in buttons XAS—PB, YAS—PB, XBS—PB, and YBS—PB respectively, these relays being effective when picked up to restore the respective computer units and to resequence the stepper.

Relays APC, BPC, and CPC (see Fig. 16); relays ICR, 2CR, and 3CR; and relays ACZ, BCZ, and CCZ are provided for use in connection with the resequencing of the stepper and the restoration of the respective computer units under various operating conditions that may be encountered in practice. The relays ACZ, BCZ, and CCZ are made slow acting for purposes to be more readily apparent as the description progresses.

Figure 16:
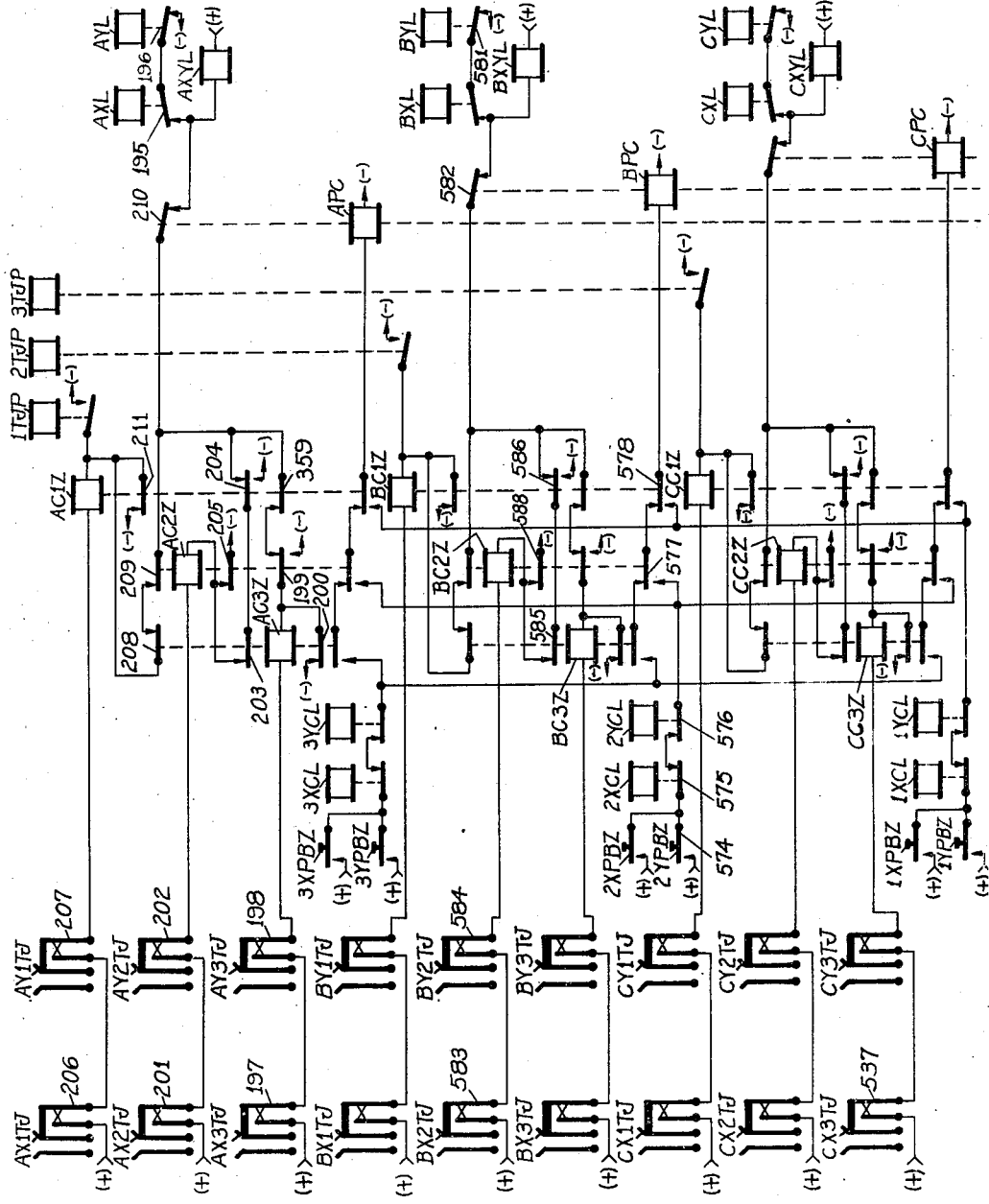
Fig. 16 illustrates an organization having to do with the resequencing of the stepper and computer organization.

With reference to Fig. 16, there is a relay CZ provided for each of the lower three flight altitudes of the inner stack, and for each computer unit. For example, the relays AC1Z, AC2Z, and AC3Z are provided for the respective 1000, 1500, and 2000 foot altitudes of the inner stack for computer A, these relays being used in a manner to be hereinafter more specifically considered in the resequencing of the stepper and the restoration of the respective computer units, such relays being normally energized, but being dropped away by the insertion of a token in the token jack for the associated altitude and the associated computer unit.

Straight-in slow drop away repeater relay SAP as shown in Fig. 10 is used in the initiation of straight-in warning and separation timers and a relay SAPP is provided for use in rendering the relays G and GP of Fig. 7 inactive during straight-in landing approaches. The actuation of resequencing buttons subsequent to a straight-in landing approach is necessary before these relays G and GP can again be rendered active in response to the stepper to initiate the respective computer units.

Each of the warning and special computer and straight-in timers has associated therewith a repeater relay which is a direct repeater of the front contacts of its associated timer, and is provided principally as a means for facilitating the structural organization of the system wherein only one front contact is required on each of the timers, and the circuits controlled by these timers are not required to be looped back and forth between the timer cabinet and the relay cabinet or rack which may be provided in a different room from the timer cabinet. It is to be understood however, that these relays are not required if it is feasible in practice to select all timer control circuits directly by the front timer contacts.

Figure 12:
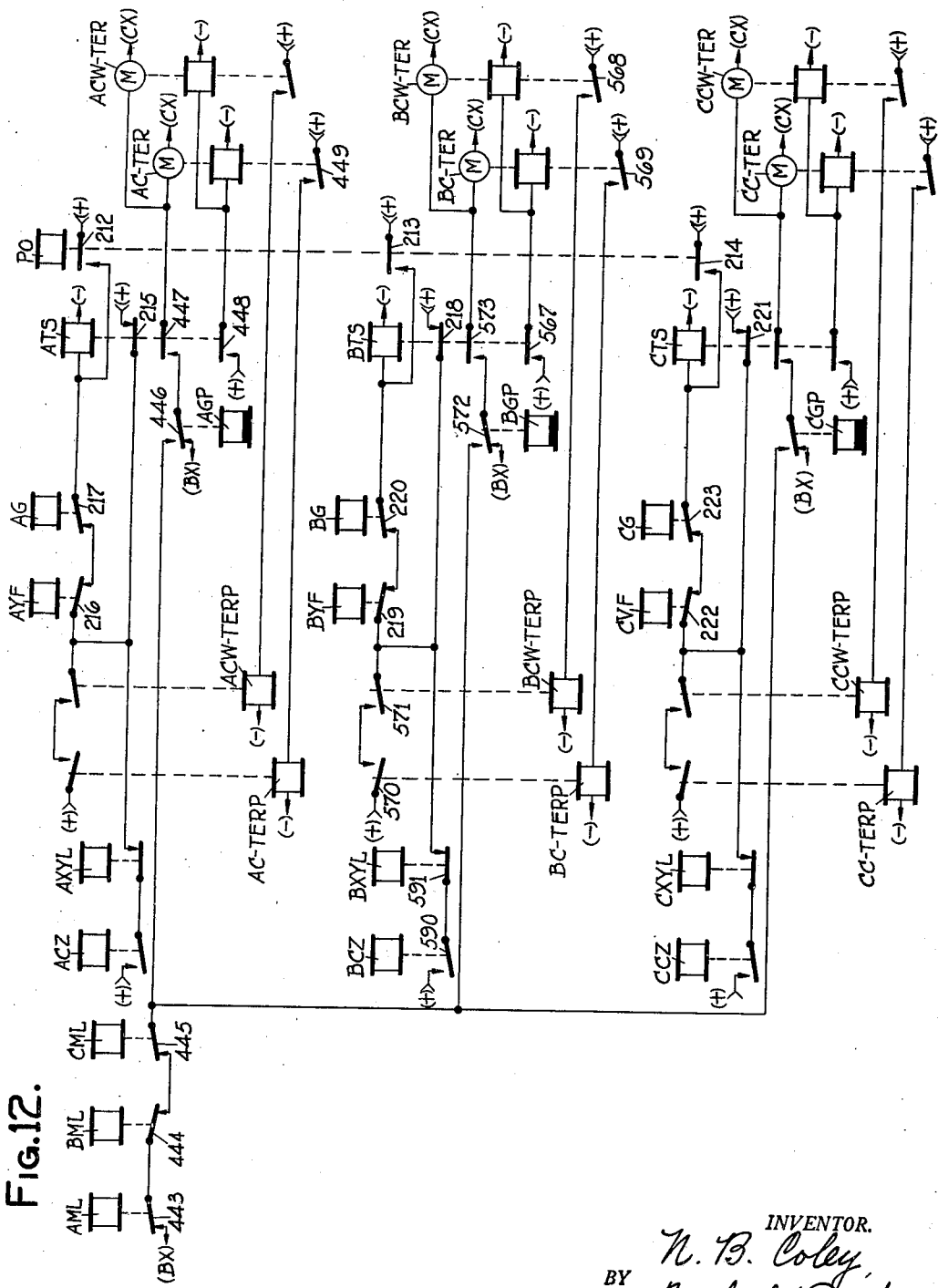
Fig. 12 illustrates a timer control organization that is governed in response to initiation of respective computed pattern landing approach maneuvers.

With reference to Fig. 12, timer repeater relays AC—TERP and ACW—TERP are provided for the timers AC—TER and ACW—TER respectively which are associated with computer unit A, and repeater relays are similarly associated with the timers provided for the respective computer units B and C.

A normally energized timer control stick relay TS is associated with the control of the timers associated with each of the computer units, the relay ATS being provided for the control of the timers AC—TER and ACW—TER for computer unit A, the relay BTS being provided for the control of timers BC—TER and BCW—TER which are associated with computer unit B, and the relay CTS being provided for the control of the timers CC—TER, and CCW—TER which are associated with the computer unit C. The deenergization of each of these relays TS for the initiation of its associated timer is rendered effective when the associated computer unit has been initiated.

Figure 11:
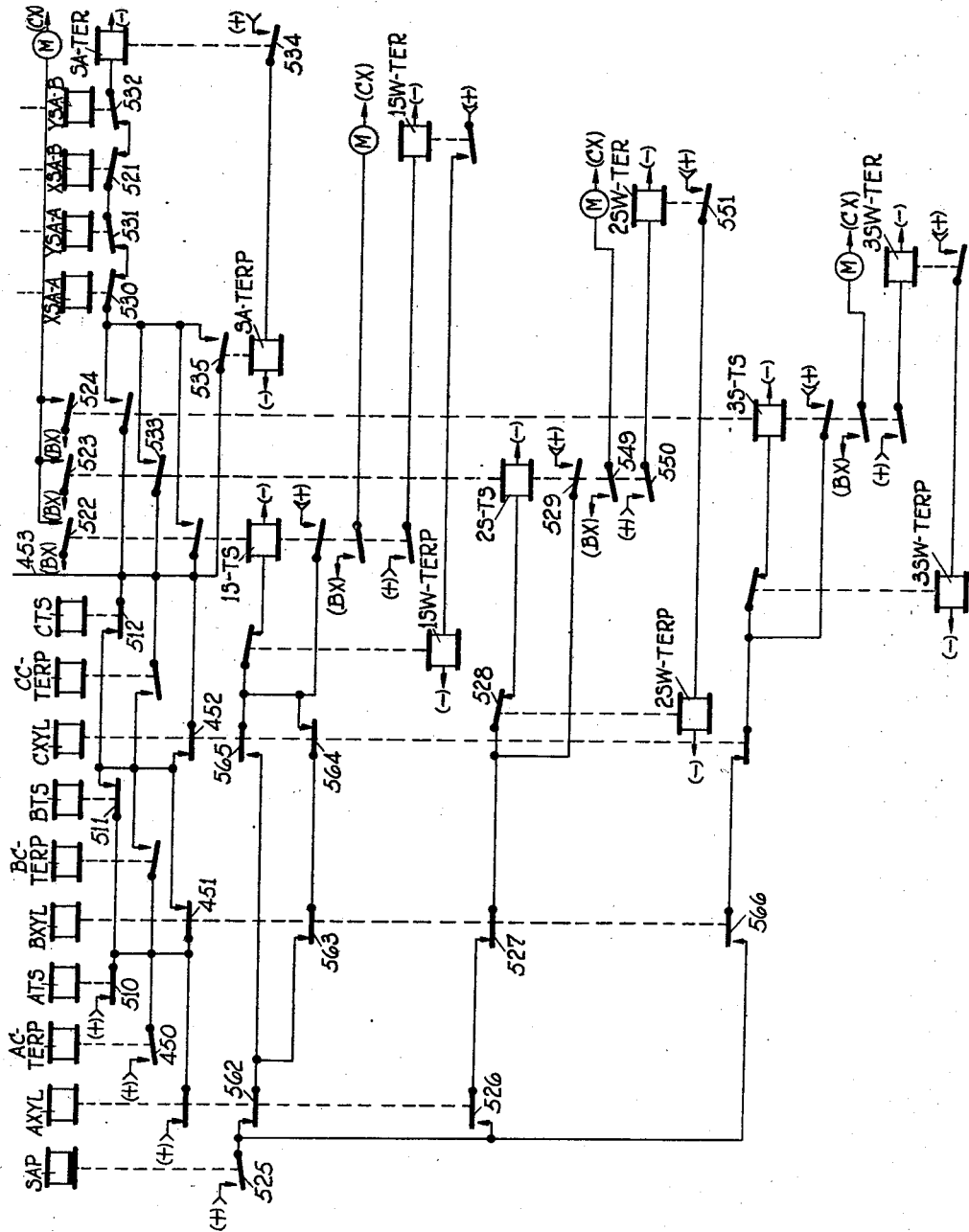
Fig. 11 illustrates a timer control organization that is governed in response to the designation of respective straight-in landing approach maneuvers.

With reference to Fig. 11, straight-in timer control relays 1S—TS, 2S—TS, and 3S—TS are employed in the control of the respective warning timers 1SW—TER, 2SW—TER, and 3SW—TER. These relays are conditioned to initiate their associated timers in accordance with the insertion of tokens in the respective vertical rows of token jacks on the center panel of boards X and Y for the lower three flight altitudes when straight-in approaches are initiated. These relays also act to control the timer SA—TER which is used to govern an indication as to when a computed pattern landing approach can be initiated following a straight-in landing approach.

Figure 14:
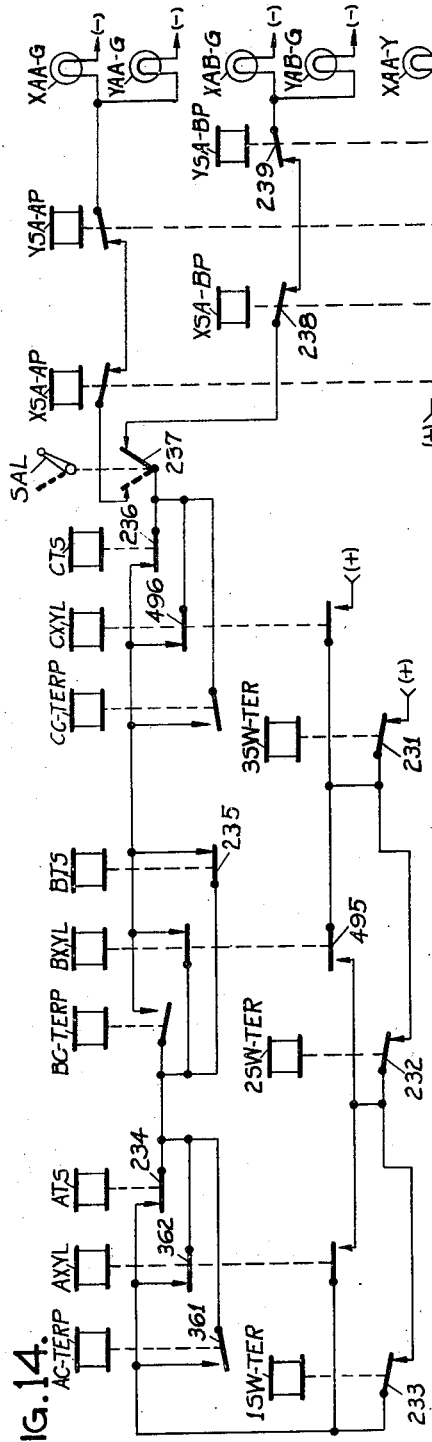
Fig. 14 illustrates the manner in which indicator lamps associated with straight-in approach maneuvers are controlled.

With reference to Fig. 14, straight-in green and yellow indicator lamps G and Y respectively are illustrated with their control circuits, a green and a yellow lamp being provided for each of the panels A¹ and B¹ (see Fig. 1) of the control boards X and Y. Thus in Fig. 14 the green lamps XAA—G and YAA—G are green indicator lamps provided for indicating that straight-in landing approach maneuvers can be made from the left-hand outer beacon RB1 as shown in Figs. 20 and 21, the green lamp XAA—G being provided on the board X and the green lamp YAA—G being provided on the board Y. Similarly the yellow lamps XAA—Y and YAA—Y are associated with indicating when these straight-in landing approaches have been designated. The lamps XAB—G and YAB—G and XAB—Y and YAB—Y are provided on the panels of the boards X and Y respectively for indicating when straight-in approaches may be made and when they have been initiated from the beacon RB4 at the right of the runway as viewed in Figs. 20 and 21.

An indicator lamp XZ—G is provided on board X and YZ—G is provided on board Y on the center panel C¹ just above the resequencing buttons. This lamp is subject to the control of the timer repeater relay SA—TERP as a means for indicating when the stepper can be resequenced and initiated for use in governing the separation of computed pattern approaches, after it has been used for governing separation between respective straight-in landing approaches.

Figure 13:
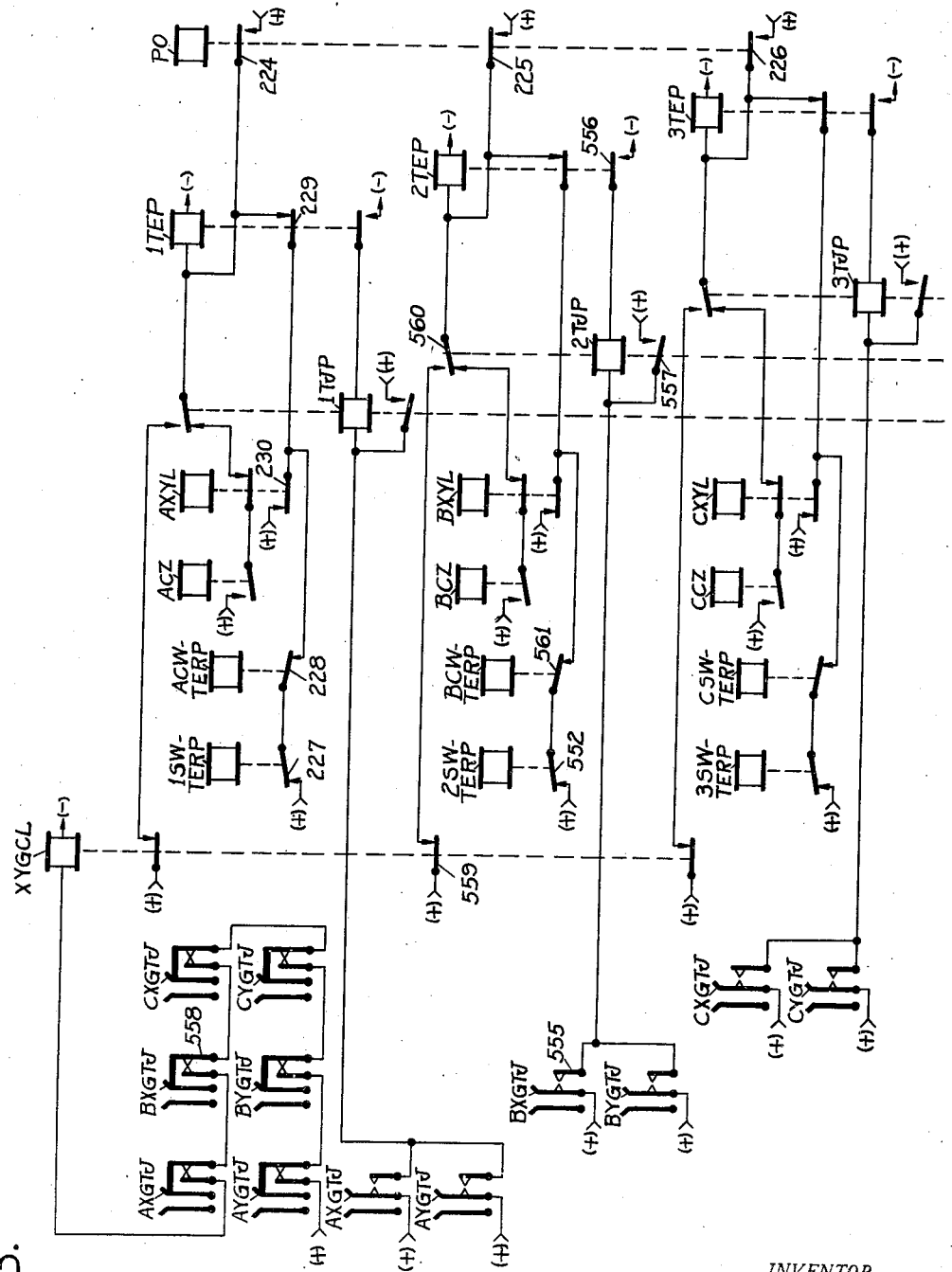
Fig. 13 illustrates a warning indication control relay organization that is rendered active in response to the expiration of time intervals measured by the warning timers.

With reference to Fig. 13 relays TJP and TEP are provided as warning indication control relays. The relays 1TEP, 2TEP and 3TEP are provided for the respective left-hand, center, and right-hand vertical rows of token jacks on the panels C¹ of the boards X and Y, and they are deenergized in response to the energization of one or the other of associated pattern or straight-in warning timer repeater relays. The deenergization of either of these relays TEP is effective to energize a warning indicator lamp WK (see Fig. 18).

As a means for restoring each of the relays TEP and extinguishing the warning lamp WK controlled thereby, a relay TJP is provided for each relay TEP and such relay is energized upon movement of a token to the token jack for a ground position in the associated vertical row of token jacks. This deenergizes the warning indicator lamp WK (see Fig. 18), and the subsequent removal of the token from that jack provides for the picking up of a ground clearance repeater relay XYGCL which in turn restores the relay TEP to its normally energized position.

Figure 15:
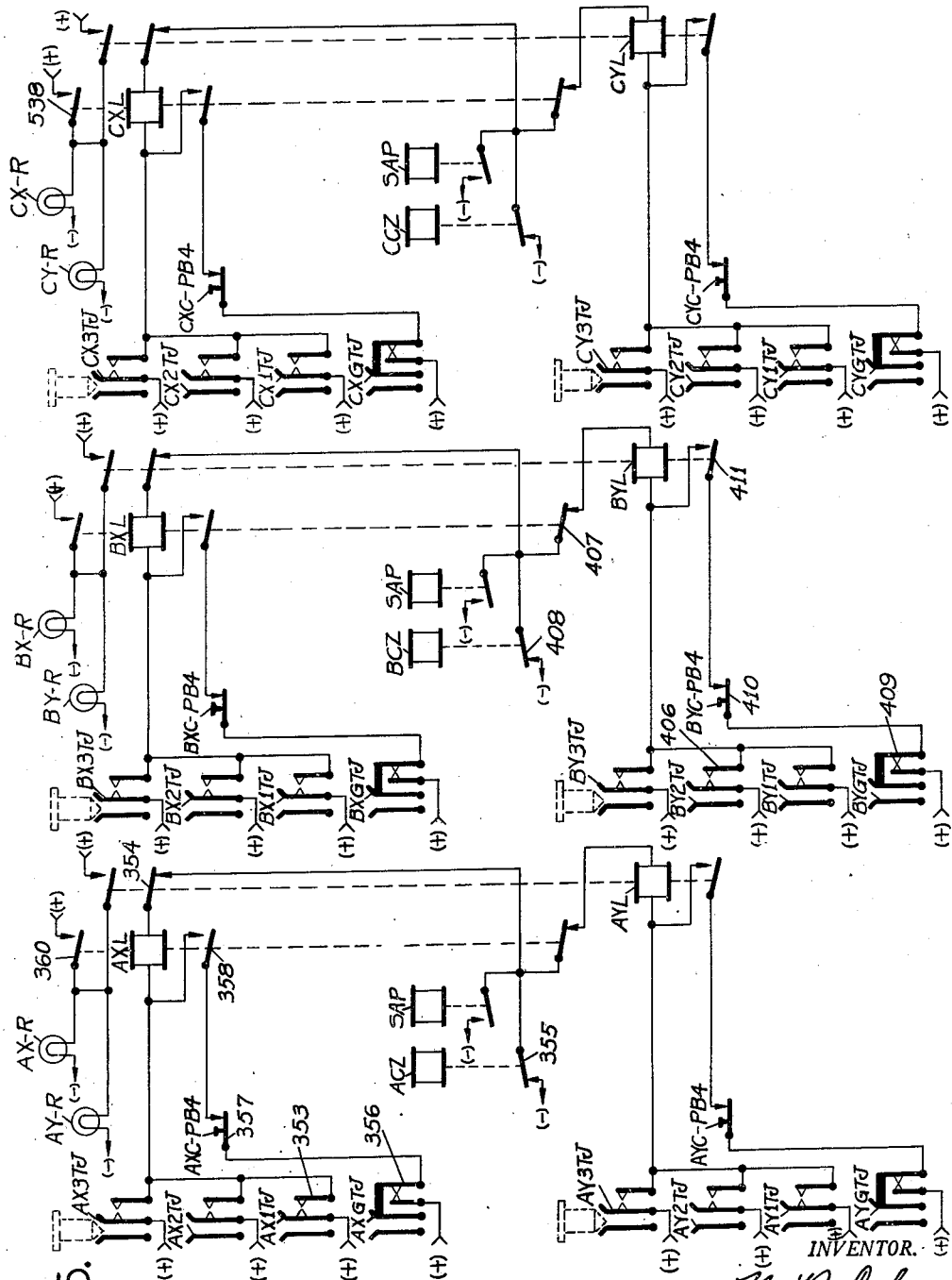
Fig. 15 illustrates a locking organization that is effective in response to the insertion of a token in respective token jacks.

With reference to Fig. 15, a lock relay L is provided for each vertical row of token jacks on the center panel C¹ of each of the boards, such lock relay being picked up in response to the insertion of a token into a token jack of the associated row for any one of the lower three flight altitudes. Thus the relays AXL and AYL are provided for the left-hand vertical row of token jacks for the boards X and Y respectively, and similarly the relays BXL and BYL are associated with the center row of token jacks, and the relays CXL and CYL are associated with the right-hand row of token jacks.

With reference to Fig. 16, repeater relays XYL are provided for the respective pairs of relays XL and YL that are associated with each step of the stepper, and more directly with a particular vertical row of token jacks in the center panel C¹ of boards X and Y. Thus the relay AXYL is a relay which is picked up when the relays AXL and AYL are both deenergized, and similarly the relay BXYL is associated with the relays BXL and BYL, and the relay CXYL is energized through back contacts of relays CXL and CYL when these relays are both in their dropped away, or retracted, positions. Clearance lock relays XCL and YCL (see Fig. 16) are used in permitting resequencing under certain conditions provided that the particular flight altitude involved in requiring the resequencing operation has been vacated and the token for the flight removed. Although the control circuits of these clearance lock relays have not been shown, it is to be understood that these relays can be controlled by the use of a circuit organization such as is employed and specifically shown and described in my above mentioned co-pending application Ser. No. 34,961, filed June 24, 1948.

A power off relay PO (see Fig. 7) is provided as a means for checking that the computer start key switch KS is properly actuated to insure the restoration of the respective computer units prior to their initiation subsequent to the application of power to the system. The relay PO is also effective to apply energy to relay control circuits upon application of the power to the system so as to properly condition certain relays that are normally held up by their stick circuits. By this specific arrangement for application of power to the system, it is provided that the system can be readily cleared out in case there has been improper manipulation of the control buttons. Thus the system can be readily cleared out and started over again, the relay PO being effective to pick up certain stick relays under these conditions and the key switch KS being effective to resequence the computer units.

Having thus considered the structure and general organization of the system, consideration will be hereinafter given as to the specific circuit organization upon consideration of certain typical operating conditions to be encountered in practice.

OPERATION

General

Before considering the mode of operation specifically under various typical operating conditions, it is believed expedient to first consider the general mode of operation and then to hereinafter point out specifically how such general mode of operation is accomplished.

To condition the system for operation, the operator first closes the power switch PS (see Fig. 1) on the panel of the computer, and then actuates the computer start key switch KS, first to its left-hand position and then to its right-hand position and then to the center position. This conditions the computer for operation by restoring all of the computer units so as to condition them for initiation in computing respective patterns for landing approach maneuvers.

After this has been accomplished, the stepper is automatically set into operation, and the computer unit A is initiated for timing stack-loss time in computing the first landing approach maneuver. At the same time a green lamp G for that computer unit is illuminated on the panels $C^1$ of both boards X and Y to indicate to the controllers of these boards that the computer unit A is available for use and has been initiated for computing a pattern approach, and that one or the other of the controllers should call an airplane for a landing maneuver if there is an airplane to be landed at this time.

Although the actual time of operation of the computer units in computing patterns for respective airplanes ordinarily varies as the ratio of stack-loss time to loop-loss time varies for the respective flights, the actual flight time from the time of initiation of a computer unit until an airplane having its pattern computed by that unit completes its holding loop is a fixed interval determined by the computer structure. The length of this time interval is not of material importance as it is necessarily determined by the requirements of practice and governed to a considerable extent by the size of the holding loop of the inner stack as determined by the spacing of the marker beacons.

The important consideration with respect to this fixed time interval is, however, that a fixed separation time interval may always be obtained for airplanes upon the completion of their respective holding loops by merely governing the initiation of the respective computer units A, B, and C to be accomplished successively at a rate determined by the desired separation time for the airplanes. Thus at the time the computer unit A is initiated, the separation timer TE (see Fig. 5) is also initiated to determine when the computer unit B can be initiated in accordance with the desired separation time. Similarly the initiation of computer unit B reinitiates the separation timer TE so as to determine when the computer unit C may be initiated. In this manner, the respective computer units A, B, and C are sequenced at a fixed rate corresponding to the desired separation between airplanes as long as airplanes are available to initiate their respective approaches when respective computer units are made available for computing the approaches.

The order of initiation of the respective computer units A, B, and C, and the control of the separation timer TE to govern such initiation is accomplished by the stepper organization (see Fig. 6). If a computer unit reaches its limit of operation for timing stack-loss time prior to an airplane governed by that unit leaving the holding stack, all computer units that have been subsequently initiated, together with the separation timer TE, are stopped in order that the additional separation time that is provided under these conditions may correspondingly delay subsequently initiated computer units in order to maintain the desired separation time when the system is subsequently rendered active again.

A special pattern separation timer such as the timer AC—TER (see Figs. 4 and 12) which is associated with the computer unit A, is initiated upon the initiation of each computer unit, and if the computer unit which has initiated that timer is used in computing an airplane pattern approach, such timer prevents the energization of the green straight-in indicator lamp for initiating clearance for a straight-in approach until such time as when a straight-in approach if initiated would follow the particular computed landing approach by a predetermined separation time governed by such timer. It is therefore provided that a straight-in indication is provided on the respective boards X and Y whenever a straight-in landing maneuver can be made and as soon subsequent to a computed pattern landing approach as has been predetermined to be desirable in accordance with the setting of this special pattern separation timer. In case a straight-in landing approach maneuver is to be made under these conditions, the actuation of the straight-in button designating such approach is effective to restore all computer units and the separation timer TE, and to resequence the stepper so that the same separation timer TE that is used for governing separation of the successive computed pattern landing approach maneuvers is used in combination with the stepper for providing separation between indications that can be given indicative of when successive straight-in landing approach maneuvers can be initiated.

The initiation of a straight-in landing approach maneuver is effective as has been described for the initiation of a special straight-in timer SA—TER that determines when a subsequent pattern approach can be initiated in order that such approach may follow the straight-in approach by a predetermined separation time.

Power on

Although the system may be in constant operation most of the time, there may be conditions where it is desirable to shut the system down for maintenance purposes or for other reasons, and thus the direct current energy applied for the control of the relays and indicator lamps is broken by the power switch PS as shown in Fig. 19, such power switch being shown in Fig. 1 as being located on the panel 102 of the computer 101. Another condition under which it may be desirable to remove the power from the boards by the power switch PS is a condition where there has been a mismanipulation and it is desirable that conditions which have thus been improperly set up be canceled. For the purpose of facilitating an understanding of the present invention, the relays that are normally energized when the power switch PS is closed have been shown with their front contacts closed.

With reference to Fig. 19, the closing of the contacts 190 and 191 by the actuation of the power switch PS connects the control battery CB to respective (+) and (—) designated terminals in the circuits throughout the drawings. It is to be understood that these circuits are not necessarily required to be all controlled by this single source of direct current, and that other batteries or other sources of direct current can be used in accordance with the requirements of practice, such other sources being of course necessary broken through contacts of the power switch PS or through the contacts of a relay controlled by the power switch PS.

With reference to the sequence chart, of Fig. 22A, it will be noted that a number of relays are picked up in response to the closure of the power switch PS, and that the green straight-in approach indicator lamps XAB—G and YAB—G on the respective boards become energized. These relays that are picked up in response to the closure of the switch PS are relays that have been illustrated as being normally energized prior to their use in making either straight-in or computed pattern approaches.

With reference to Fig. 6, the relay VP is picked up in response to the application of power to its circuit because of the stepping relays IVA, 2VA, and 3VA being deenergized at that time. The circuit by which the relay VP is picked up under these conditions extends from (+) including back contact 192 of the relay IVA, back contact 193 of relay 2VA, back contact 194 of relay 3VA and winding of relay VP, to (—). The circuit organization for the control of the relay VP is such that it is energized dependent upon a relay VA being deenergized for any step of the stepper, or the relay VB for that step being energized. Thus this relay VP in its normal operation is dropped away by the picking up of a relay VA for any step of the stepper and is restored to its picked up position by the subsequent energization of the relay VB for that step.

With reference to Fig. 16, the relays AXYL, BXYL, and CXYL are picked up in response to closure of the power switch PS in accordance with there being no tokens inserted in the respective vertical rows of token jacks on the panel C¹ of the control boards with which these relays are associated. The relay AXYL, for example, is energized by a circuit extending from (+) including the winding of that relay, back contact 195 of relay AXL, and back contact 196 of relay AYL, to (—). These relays AXL and AYL are relays that are responsive to the insertion of a token in the left-hand row of the three vertical rows of token jacks (see Fig. 1) in the panel C¹, for the respective boards X and Y. It is therefore provided that the relay AXYL is picked up only when there has been no token inserted in this particular vertical row of token jacks on either board X or board Y. Similarly the relays BXYL and CXYL are energized in accordance with there being no token in the center and right-hand vertical rows of token jacks for the lower three flight altitudes on panel C¹ of both boards X and Y.

Also in Fig. 16, the relays CZ for the respective computer units and flight altitudes are picked up in response to the closing of the power switch PS. The relay AC3Z is picked up in accordance with there being no token inserted in the token jacks AX3TJ and AY3TJ for the third flight altitude of the respective boards X and Y which has been designated on the panels as the altitude 20 (see Fig. 1). The circuit by which the relay AC3Z is picked up under these conditions extends from (+), including normally closed contact 197 of token jack AX3TJ, normally closed contact 198 of token jack AY3TJ, winding of relay AC3Z, and back contact 199 of relay AC2Z, to (—). The picking up of relay AC3Z, by the closure of its front contact 200 establishes a stick circuit to shunt back contact 199 of relay AC2Z out of the circuit just described.

Upon the picking up of relay AC3Z, a circuit is closed for the picking up of relay AC2Z extending from (+), including normally closed contact 201 of token jack AX2TJ, normally closed contact 202 of token jack AY2TJ, winding of relay AC2Z, front contact 203 of relay AC3Z, and back contact 204 of relay AC1Z, to (—). The picking up of relay AC2Z, by the closure of its front contact 205 shunts the contacts 203 and 204 out of the circuit just described.

In response to the picking up of relay AC2Z, a circuit is closed for the picking up of relay AC1Z extending from (+), including normally closed contact 206 of the token jack AX1TJ, normally closed contact 207 of the token jack AY1TJ, winding of relay AC1Z, front contact 208 of relay AC3Z, front contact 209 of relay AC2Z, back contact 210 of relay APC, back contact 195 of relay AXL and back contact 196 of relay AYL, to (—). Upon the picking up of this relay, the closure of its front contact 211 makes the energization of this relay dependent entirely upon the token jack contacts 206 and 207 of token jacks AX1TJ and AY1TJ respectively.

Similarly the relays BC3Z, BC2Z, and BC1Z are picked up respectively by the energization of circuits similar to those that have been described for corresponding relays provided for computer unit A in accordance with there being no tokens inserted in the center row of token jacks on the panel C¹ of both boards X and Y for the lower three flight altitudes. Relays CC3Z, CC2Z, and CC1Z, are energized by similar circuits to those that have been described for the energization of relays associated with computer A, these relays being provided for the computer unit C, and being associated with the right-hand row of token jacks for the three lower altitudes on the panel C¹ of the boards X and Y.

The relays ATS, BTS, and CTS (see Fig. 12) which are provided for governing the timers that are initiated by computer units A, B, and C respectively are picked up in response to the application of power to the system because of the relay PO being dropped away at that time. This relay PO becomes steadily energized in response to the initiation of the computer units subsequent to the application of power, and is maintained steadily picked up as will be hereinafter considered until such time as the power switch PS is again opened. Thus under the conditions being considered where the power switch PS has just been actuated, the relay PO is in its deenergized position, and, in accordance with the closure of its back contacts 212, 213, and 214, the relays ATS, BTS, and CTS are picked up by the energization of obvious circuits. When the relay ATS has been picked up, its stick circuit is established to maintain that relay energized subsequent to the picking up of the relay PO. Such stick circuit extends from (+), including front contact 215 of relay ATS, back contact 216 of relay AYF, back contact 217 of relay AG, and winding of relay ATS, to (—). Similarly the relay BTS is maintained picked up by a stick circuit extending from (+), including front contact 218 of relay BTS, back contact 219 of relay BYF, back contact 220 of relay BG, and winding of relay BTS, to (—). The stick circuit for the relay CTS which is established at this time extends from (+), including front contact 221 of relay CTS, back contact 222 of relay CYF, back contact 223 of relay CG, and winding of relay CTS, to (—).

With reference to Fig. 13, the power off relay PO is also effective subsequent to the actuation of power switch PS to pick up the warning indication control relays 1TEP, 2TEP, and 3TEP, by the closure of back contacts 224, 225, and 226 of the relay PO respectively. The relay 1TEP when picked up is maintained picked up by its stick circuit irrespective of its relay PO, such stick circuit extending from (+), including back contact 227 of relay 1SW—TERP, back contact 228 of relay ACW—TERP, front contact 229 of relay 1TEP, and winding of relay 1TEP, to (—). An auxiliary stick circuit is provided by the closure of front contact 230 of relay AXYL whereby the back contacts 227 and 228 of relays 1SW—TERP and ACW—TERP are shunted out of the stick circuit just described. It is by this stick circuit organization that the relay 1TEP is dropped away in response to the completion of the operation of a warning timer initiated by either a straight-in or a pattern landing approach, such warning being associated with the computer unit A for the pattern approach and with the first step of the stepper for a straight-in approach in a manner to be more readily apparent as the description progresses. Similarly the relays 2TEP and 3TEP are maintained picked up by stick circuits governed by relays associated with computers B and C respectively for pattern landing approaches and steps 2 and 3 of the stepper for straight-in landing approaches.

Straight-in indication lamps G are energized subsequent to closure of the power switch PS on the panels of the boards X and Y corresponding to the panels selected by the straight-in approach lever SAL on the panel 102 of the computer 101 (see Fig. 1). Thus, in accordance with this lever being in its right-hand position as shown, the lamp XAB—G on the panel B¹ of the board X is energized, and similarly the lamp YAB—G on the panel B¹ of the board Y is energized. The circuits by which these lamps are energized are shown in Fig. 14. The circuit for these lamps extend from (+), including back contact 231 of relay 3SW—TER, back contact 232 of relay 2SW—TER, back contact 233 of relay 1SW—TER, front contact 234 of relay ATS, front contact 235 of relay BTS, front contact 236 of relay CTS, contact 237 of the straight-in lever SAL in its right-hand position, back contact 238 of relay XSA—BP, back contact 239 of relay YSA—BP, and lamps XAB—G and YAB—G connected in multiple, to (—).

*Computer start*

Having thus considered the conditions of the apparatus under normal conditions immediately subsequent to the closure of the power switch PS, it will be assumed that a controller proceeds to initiate the computer into operation by actuation of the key switch KS. One purpose of requiring actuation of the key switch KS is to insure that the respective computer units are all restored prior to their being initiated for computing pattern approaches. It is thus desirable, with reference to Fig. 5, that the spiders of the respective units be actuated in a counter-clockwise direction by the energization of the magnets OMA, OMB, and OMC to condition the time shafts of the respective computer units so that upon the subsequent momentary energization of the restoration magnets NMA, NMB, and NMC, the coil springs associated with the respective units, such as the spring 137 of unit A, are effective to restore the time and heading shafts of those units to their initial positions.

The restoration is accomplished by first actuating the key switch KS to its left-hand position for shifting the spiders to their clockwise rotating positions and then actuating the key switch KS to its right-hand position for restoring the spiders by clockwise rotation and thus permitting the restoration by the springs associated therewith. Upon restoration of the key switch KS to its center position subsequent to this manipulation, the power off relay PO is picked up to permit the initiation of the stepper. This mode of operation is in accordance with the sequence of operations diagrammatically illustrated in Fig. 22A.

To consider the specific circuit organization providing the above described mode of operation, it will be assumed that the key switch KS is actuated to the left. In accordance therewith, energy is applied to the wires 250, 251, and 252 which are connected to the computer high speed magnets OMA, OMB, and OMC respectively (see Figs. 5 and 7.) The circuits energizing these magnets include respective back contacts 253, 254, and 255 of the power-off relay PO, contact 256 of the key switch KS in its left-hand position, and back contacts 257, 258, and 259 of relays 2VA, 3VA, and 1VB connected in series. It will be noted that the inclusion of the back contacts 253, 254, and 255 of the power-off relay PO in this circuit provides that the picking up of this relay as will be hereinafter considered prevents further energization of these magnets of the respective computer units in case the key switch KS should be inadvertently actuated to its left-hand position at some subsequent time during operation of the system.

Also with the key switch KS actuated to its left-hand position, the stepper relay 1VA for the first step of the stepper is picked up, and the picking up of this relay causes the release of the half-step relay VP. The circuit for the energization of the relay 1VA under these conditions is illustrated in Fig. 6 wherein the actuation of the lever KS to its left-hand position applies energy to the relay 1VA through contact 260 of the lever KS in its left-hand position and back contact 261 of the power-off relay PO. Upon the picking up of the relay 1VA, a stick circuit is established for that relay to maintain it picked up until the relay 2VB is picked up at the end of the second step. Such stick circuit extends from (+), including back contacts 262, 263, 264, and 265 of relays 3CR, 2CR, 1CR, and 2VB respectively, front contact 266 of relay 1VA, and winding of relay 1VA, to (—). The actuation of the switch KS to its right-hand position opens the pick up circuit that has just been described, and the subsequent picking up of the relay PO is effective to prevent the relay 1VA from being picked up should the switch KS be inadvertently actuated to its right-hand position during operation of the system. Upon the picking up of relay IVA, the opening of its back contact 192, is effective to deenergize the relay VP because of the relay IVB being deenergized at that time.

Considering now the actuation of the key switch KS to its right-hand position for restoration of the respective computer units, energy is applied to the restoration magnets NMA, NMB, and NMC by the wires 267, 268, and 269 (see Figs. 5, 7, and 8) through the respective contacts 256, 270, and 271 of the key switch KS in its right-hand position, energy to these contacts being provided through the back contacts 257, 258, and 259 of relays 2VA, 3VA, and IVB connected in series.

It is thus provided by the computer control organization that has been described, that the energization of the restoration magnet of each computer unit is effective to actuate the spider of each computer unit, such as the spider 134, of the computer unit A, to its center position in which it is locked by a rod such as the rod 144 of computer unit A, so as to permit the restoration of the time and heading shafts by the associated coil springs of the respective computer units, such as the restoration of the shafts 112 and 141 by the spring 137.

Also in accordance with the actuation of the switch KS to its right-hand position a circuit is closed to cause the picking up of the relay AG, which in sequence of operation is the first of the computer initiating relay G, to initiate the motor MA (see Fig. 5) of computer unit A for measuring stack-loss time for this computer unit. The circuit for energization of the relay AG (see Fig. 7) under these conditions extends from (+), including contact 272 of switch KS in its right-hand position, back contact 273 of relay PO, back contact 274 of relay AC—TER, back contact 275 of relay ACW—TER, front contact 276 of relay IVA, back contact 277 of relay IVB, winding of relay AG, back contact 278 of relay ACZ, and back contact 279 of relay SAPP, to (—). The picking up of this relay establishes a stick circuit to maintain the relay AG picked up subsequent to the restoraton of the key switch KS center position and to the picking up of the power-off relay PO. This circuit extends from (+), including back contact 280 of relay AYF, front contact 281 of relay AG, winding of relay AG, back contact 278 of relay ACZ, and back contact 279 of relay SAPP, to (—). Energy is also applied to the stick circuit of the relay AG through back contacts 282 and 283 of push buttons AYC—PB2 and AXC—PB2 respectively. these buttons being the No. 2 push buttons associated with the computer unit A as disposed at the bottom of the panels C¹ of the boards X and Y as being associated with this computer unit. Energy is also applied to the stick circuit of the relay AG through back contacts 284 and 285 of the relays AYL and AXL which are connected to respectively by-pass the above mentioned contacts 282 and 283 of the push buttons AYC—PB2 and AXC—PB2.

In accordance with the picking up of relay AG, the closure of its front contact provides alternating current energization for the motor MA (see Fig. 5) of the computer unit A by a circuit extending from (BX) including, front contact 286 of relay AG, wire 287, motor MA, contact points 121 and 122 of computer unit A, contact points 288 and 289 of computer unit B, and contact points 290 and 291 of computer unit C, to (CX). Thus the energization of the motor MA through suitable reduction gearing, drives the pinion 113 for the operation of the time and heading shafts 112 and 141 to contemporaneously measure the stack-loss time and compute the heading for an airplane to fly in leaving the holding stack and initiating flight into the holding loop. It will be noted that under the assumed conditions, the time and heading shafts 112 and 141 are not actually driven until the key switch KS has been restored to its center position so as to deenergize the restoration magnet NMA and thus permit the toggle spring 146 to actuate the spider 134 clockwise to its fully actuated stack-loss timing position wherein its gear 114 is driven by the pinion 113.

In response to the picking up of relay AG (see Fig. 7) the associated repeater relay AGP is picked up by the energization of an obvious circuit closed at front contact 292. The relay AG in picking up is also effective to provide for the steady energization of the green lamps AXC—G, and AYC—G (see Fig. 9) for indicating on the board X and Y respectively that the computer unit A is in condition to be started for computing a pattern landing approach, and that subsequent to the restoration of the key switch KS to its center position, an airplane can be called and the pilot instructed to initiate a pattern landing approach. The lamp AXC—G is steadily energized by a circuit extending from (+), including back contact 293 of relay AXL, back contact 294 of relay AYL, back contact 295 of relay AYF, front contact 296 of relay AG, back contact 297 of relay AYL, and lamp AXC—G, to (—). The circuit for the lamp AYC—G extends from (+), including back contact 293 of relay AXL, back contact 294 of relay AYL, back contact 295 of relay AYF, front contact 296 of relay AG, back contact 298 of relay AXL, and lamp AYC—G, to (—).

Assuming now that the controller restores the computer start switch KS to its center position, such actuation deenergizes all of the restoration magnets NMA, NMB, NMC by opening their circuits at contacts 256, 270 and 271, or the respective computer units A, B, and C, and the deenergization of these magnets permits the actuation of the spiders of the respective computer units A, B, and C to their fully actuated clockwise positions wherein their gears mesh with the low speed pinion gears that are driven by the respective timer motors MA, MB, and MC which are used for timing stack-loss time. Thus, for example, for unit A, the deenergization of the magnet NMA by the opening of its circuit at contact 271 of the switch KS (see Fig. 2) permits the rod 144 to be disengaged by its biasing spring 145 from the detent 299 of the spider 134, permitting the toggle spring 146 to actuate the spider 134 clockwise from its mid-position to mesh its gear 114, with the pinion gear 113 that is driven by the motor MA. Inasmuch as it has been pointed out that the motor MA has been initiated, this computer unit A now becomes effective to start measuring stack-loss time.

Also in accordance with the restoration of the key switch KS to its center position, the power-off relay PO (see Fig. 7) is picked up. The pick up circuit for the relay PO extends from (+), including contact 272 of the switch KS in its center position, front contact 300 of relay AG, and winding of relay PO, to (—). Upon the picking up of this relay, by the closure of its front contact 301, a stick circuit is established to maintain this relay picked up as long as power is applied to the system by the power switch PS, irrespective of the key switch KS and of the relay AG. The computer units are thus conditioned for operation in computing pattern approaches, and indications have been displayed on the respective boards X and Y indicating that the system is in condition for initiation of either straight-in or pattern approaches. Although the straight-in indicator lamps XAB—G and YAB—G have been described as becoming energized in response to the picking up of the relays ATS, BTS, and CTS, it is to be understood that the key switch KS must be actuated as has been described to fully condition the system for use, even if straight-in landing approach maneuvers are to be made rather than computed pattern landing approaches. In other words, irrespective of the straight-in lamps being energized in response to the closure of the power switch PS, the key switch KS should be actuated as above described before the initiation of a straight-in landing approach as well as before the initiation of a computed pattern approach.

*Stepper operation*

The stepper as illustrated in Fig. 6 is adapted for use in sequencing the respective computer units through successive cycles as long as the units are employed in computing approach patterns for respective airplanes, and this stepper is also effective when successive straight-in landing approaches are made to determine the minimum separation time between such straight-in approaches. As to whether the stepper is effective or not to initiate the respective computer units is determined by whether or not the computer control relays AG, BG, and CG, (see Fig. 7) are rendered responsive to the stepper in a manner to be hereinafter more specifically considered. If straight-in approaches are to have their separations determined by the separation timer TE which governs the rate of the stepper, the straight-in repeater relay SAPP (see Figs. 7 and 10) is picked up to render the computer control relays AG, BG, and CG nonresponsive to the stepper.

To consider the mode of operation of the stepper, it will be assumed that the system has been conditioned for operation as has been described wherein the relay 1VA for the first step has been picked up and the relay VP has been dropped away. Because of the relay VP being dropped away, the opening of its front contact 302 has prevented the initiation of the separation timer TE, and thus the back contact 303 of the timer TE (see Fig. 6) is closed corresponding to the circuit being closed between the contact strips 152 and 153 in the somewhat schematic showing of the timer TE in Fig. 5 by the contact bar 154.

In response to the picking up of the relay PO upon restoration of the switch KS to its center position, the relay 1VB is picked up as a means for causing the picking up of the relay VP to thereby initiate the operation of the separation timer TE. The circuit by which the relay 1VB is picked up under such conditions extends from (+), through the back contact 303 of the separation timer TE, front contact 304 of relay 1VA, back contact 305 of relay 2VA, front contact 306 of relay AG, front contact 307 of relay 1VA, front contact 308 of relay PO, and winding of relay 1VB, to (—). Upon the picking up of this relay a stick circuit is established to maintain the relay 1VB picked up until such time as the first step relay 1VA is dropped away. This stick circuit extends from (+), including front contact 309 of relay 1VA, front contact 310 of relay 1VB, and winding of relay 1VB, to (—).

In response to the picking up of the relay 1VB, a pick up circuit is closed for the relay VP extending from (+), including front contact 311 of relay 1VB, back contact 193 of relay 2VA, back contact 194 of relay 3VA, and winding of relay VP, to (—). When the relay VP is picked up, in accordance with the power-off relay PO having been picked up energy is applied to the motor M of the timer TE by a circuit extending from (BX), including front contact 312 of relay PO, front contact 302 of relay VP, wire 313, and magnet EM, (see Fig. 5), to (CX).

The motor M of the separation timer TE has been energized in accordance with the picking up of the power off relay PO with alternating current by a circuit extending from (BX) including front contact 314 of relay PO, motor M, contact points 121 and 122 of computer unit A, contact points 288 and 289 of computer unit B, and contact points 290 and 291 of computer unit C, to (CX). By this organization, the motor for driving the timer TE is steadily energized as long as the respective computer units are successively employed in computed pattern approaches so that none of these computer units reaches its maximum stack-loss time prior to the actuation of the associated computer control button No. 2 so as to interrupt the common connection just described for the stack-loss timer motors as well as for the motor M of the separation timer TE.

Also in response to the picking up of the relay 1VB under conditions of initiation of the stepper, the slow dropping away relay VBP (see Fig. 6) is picked up and maintained picked up as long as the stepper continues to step. This relay is dropped away under conditions of resequencing of the stepper in a manner to be hereinafter considered. The pick up circuit for the relay VBP extends from (+), including back contact 315 of relay 3CR, back contact 316 of relay 2CR, back contact 317 of relay 1CR, front contact 318 of relay 1VB, and winding of relay VBP, to (—). A stick circuit is provided for this relay extending through its front contact 319 to maintain this relay picked up whenever either of the front contacts 320, 321, or 322 of relays 1VB, 2VB, or 3VB respectively is closed.

This completes the operation of the stepper for its first step, but it is necessary to wait until the completion of operation of the separation timer TE before the second step is initiated. Thus as illustrated diagrammatically in Fig. 22A, the second step relay 2VA is picked up only in response to the completion of the timing operation of the separation timer. With reference to Fig. 5, after the timer motor M has driven the contact bar 154 to a point of making electrical contact between the contact strips 157 and 158, the timing operation is complete, and the front contact 303 of the timer TE (see Fig. 6) is closed, the back contact 303 having been opened when the separation timer TE was initiated.

The second step relay 2VA is now picked up by a circuit extending from (+), including front contact 303 of separation timer TE, back contact 323 of relay 3VB, back contact 324 of relay 2VB, front contact 325 of relay 1VB, and winding of relay 2VA, to (—). A stick circuit is closed for this relay extending from (+), including back contact 326 of relay 3CR, back contact 327 of relay 2CR, back contact 328 of relay 1CR, back contact 329 of relay 3VB, front contact 330 of relay 2VA, and winding of relay 2VA, to (—).

Upon the picking up of the second step relay 2VA, the relay VP is dropped away because of the opening of its circuit at back contact 193. The relay VP in turn is effective to restore the separation timer TE by opening the circuit for the timer electromagnet EM at front contact 302. Thus the contact 303 of the separation timer TE is shifted to its lower position so as to effect the picking up of the relay 2VB. If the stepper is used in governing separation time between respective computed pattern approaches, the relay BG is picked up in a manner to be hereinafter considered, and thus a circuit is closed for the relay 2VB through front contact 331 of relay BG. If, however, the stepper is used for governing separation between respective straight-in approaches, the relay 2VB is picked up through a front contact 332, 333, 334, or 335 of a respective straight-in control relay XSA—A, YSA—A, XSA—B, or YSA—B. It will therefore be readily apparent that the picking up of the relays VB for the respective steps is rendered effective in accordance with the stepper organization being used for either the separation of successive computed pattern approaches or successive straight-in approaches.

The circuit by which the relay 2VB is picked up during the second step for computed pattern approaches extends from (+), including back contact 303 of the separation timer TE, front contact 304 of relay 1VA, front contact 305 of relay 2VA, front contact 331 of relay BG, and winding of relay 2VB, to (—). The picking up of this relay 2VB under either of these conditions of pattern or straight-in approaches establishes a stick circuit by closure of its front contact 336 which is governed by the application of energy at front contact 337 of the relay 2VA.

The relay 1VA is restored in accordance with the opening of its stick circuit at back contact 265 of relay 2VB when relay 2VB is picked up. Upon the dropping away of relay 1VA, the stick circuit for relay 1VB is opened at front contact 309, and this relay is dropped away because its pick up circuit is open at that time at front contact 307 of relay 1VA. Thus it follows that the stepper relays VA and VB for each step are restored by the picking up of the relay VB for the next following step.

The relay VP is again picked up to initiate the separation timer in accordance with the closure of front contact 338 of the relay 2VB, the closure of front contact 302 of relay VP being effective to apply energy to the separation timer magnet EM (see Fig. 5) to initiate the separation timer in a manner that has been heretofore described.

After the separation timer TE has completed its operation subsequent to its having been initiated during the second step, the closure of front contact 303 of this timer (see Fig. 6) provides for the picking up of the third step relay 3VA. The circuit by which the relay 3VA is energized extends from (+), including front contact 303 of the separation timer TE, back contact 323 of relay 3VD, front contact 324 of relay 2VD, and winding of relay 3VA, to (—). Relay 3VA is maintained picked up by a stick circuit extending from (+), including back contact 315 of relay 3CR, back contact 316 of relay 2CR, back contact 317 of relay 1CR, back contact 318 of relay 1VD, front contact 339 of relay 3VA, and winding of relay 3VA, to (—).

Relay VP is dropped away in response to the relay 3VA being picked up by the opening of its circuit at back contact 194, and thus the separation timer TE is restored by the opening of the circuit for its magnet EM at front contact 302 of relay VP.

By the closure of back contact 303 of the separation timer TE, a circuit is closed for the picking up of relay 3VD (assuming the stepper to be used for computed pattern approaches) extending from (+), including back contact 303 of the separation timer TE, back contact 304 of relay 1VA, front contact 340 of relay 3VA, front contact 341 of relay CG, and winding of relay 3VD, to (—). Relay 3VD is maintained picked up by its stick circuit including its front contact 342 of relay 3VA and front contact 343 of relay 3VA. If successive straight-in approaches are being made, the picking up of the relay 3VD is effective in accordance with the closure of one of the contacts 344, 345, 346, or 347 of relays XSA—A, YSA—A, XSA—B, or YSA—B.

The stick circuit for the relay 2VA is opened upon the picking up of relay 3VB at back contact 329, and the relay 2VA is dropped away because of its pick up circuit having been opened previously at back contact 324 of relay 2VB. The dropping away of relay 2VB, by opening its stick circuit at front contact 337 is effective because the pick up circuit for relay 2VB has been opened by the dropping away of relay 2VA at front contact 305.

The picking up of relay 3VB during the third step is effective by the closure of its front contact 348, to pick up the relay VP so as to initiate the separation timer TE by the closure of front contact 302 so as to time the interval required prior to the picking up of the relay 1VA for initiating another cycle of operation of the stepper.

In response to the separation timer TE having completed its timing operatin subsequent to being initiated by the picking up of relay 3VB, the relay 1VA is picked up by a circuit extending from (+), including front contact 303 of the separation timer TE, front contact 323 of relay 3VB, and winding of relay 1VA, to (—). Relay 1VA when picked up is maintained ipcked up by a stick circuit that has been described when considering the initial operation of the stepper.

In response to the picking up of relay 1VA, relay VP is dropped away by the opening of its circuit at back contact 192, and thus the separation timer TE is again restored so as to pick up the relay 1VB by the energization of a circuit that has been described, the circuit for the picking up of relay 1VB being closed in accordance with the closure of one of contacts 349, 350, 351, or 352 of relays XSA—A, YSA—A, XSA—B, or YSA—B if straight-in rather than pattern approaches are being made.

The relays 3VA and 3VB are successively restored in response to the picking up of relay 1VB, relay 3VA being dropped away because of the opening of its stick circuit at back contact 318 of relay 1VD, and the relay 3VB being dropped away because of the opening of its stick circuit at front contact 343 of relay 3VA. The pick up circuit for relay 3VA is open at this time at front contact 324 of relay 2VB, and the pick up circuit for relay 3VB is open in response to the dropping away of relay 3VA at front contact 340.

Having thus described a complete cycle of operation of the stepper through its three steps respectively, and how the stepper is reinitiated after the third step, it will be readily apparent that the stepper continues to operate step-by-step at intervals governed by the separation timer TE as long as landing approaches are to be ini-

Computed pattern approach

When a computer unit A, B, or C is conditioned to initiate the computation of a pattern approach, a green lamp G associated with that computer unit is steadily energized on each of the boards X and Y, and the steady energization of such a lamp on both the boards X and Y is an indication to the respective controllers of these boards that the associated computer unit is available for use and has been initiated for measuring stack-loss time. Thus upon observing this steady green lamp, one or the other of the controllers can designate the associated computer unit for his use in computing a pattern approach by the insertion of a token in the corresponding vertical row of token jacks on his center panel $C^1$. This token is of course indicative of a particular airplane flight and is inserted into one of the jacks of this row subsequent to obtaining clearance for entrance of the airplane identified by the markings on the token to the inner stack from one or the other of the outer stacks $a$ or $b$. The specific means for obtaining clearances in the laddering down and movement of airplanes from one stack to another to accomplish this maneuver can be accomplished, for example, in the manner and by use of organizations specifically described in my above mentioned co-pending application.

Assuming that an airplane is properly moved into the stack at the lower flight altitude, indicated as the 1000 foot altitude on the panel $C^1$, it will be further assumed that the operator of the board X assumes control of the flight in governing the landing approach.

In response to the controller of board X inserting a token in the jack AX1TJ (see Fig. 1), the green lamp G for the computer unit A is flashed to indicate to the controller that he has reserved the use of this computer unit and that it is up to him to call the airplane identified by the token and instruct the pilot to report over the beacon RB5 (see Figs. 20 and 21), it being assumed that the right-hand end of the runway is used as an approach for landing maneuvers.

In accordance with the confirmation of the instructions by the pilot of the airplane, the controller of board X then actuates his push button No. 1 for the computer unit A at the bottom of the panel $C^1$, and the actuation of this button changes the green lamp G for computer unit A from flashing to steady energization.

Upon the airplane reporting over the beacon RB5, the controller of board X actuates his push button No. 2 for computer unit A and in accordance with the actuation of this button, the green lamp G is extinguished and the yellow lamp Y becomes energized with flashing energy for the computer unit A to indicate that the approach controller of board X must call the airplane and instruct him as to the heading indicated by the dial (see Fig. 1) that has been determined by the computer unit A in accordance with the time that has been consumed from the time of initiation of that computer unit, other factors such as drift angle and windage being taken into consideration as is fully described in the prior application of Field et al., Ser. No. 573,876, filed January 22, 1945.

Upon the approach controller receiving confirmation of the heading from the pilot of the airplane, he actuates push button No. 3 that is associated with computer unit A at the bottom of panel $C^1$ of the board X, and the actuation of this button changes the energization of the associated yellow lamp Y from flashing to steady.

It is thus provided that the computer unit A has computed the heading the airplane must take in flying a loop-loss pattern in accordance with the stack-loss time that has been consumed, and when the push button No. 2 for computer unit A has been actuated for defining the presence of an airplane over the beacon RB5, the computer unit shifts in the speed of driving for its time shaft from low speed to high speed for timing the out-time flight of the airplane in flying the heading which has been computed.

When the out-timer of computer unit A approaches the end of its timing operation, the red lamp R that is disposed directly above the push buttons for the computer unit A on the panel $C^1$ of the board X becomes steadily energized and the yellow lamp Y associated therewith is extinguished. The steady energization of this red lamp R is a warning to the approach controller of board X that the out-timer is reaching the end of its timing operation and that he should be prepared to call the airplane to tell the pilot to initiate his procedure right-hand turn within a matter of a few seconds.

When the timing of the out-time has been completed by this computer unit A, the red lamp R associated therewith is changed from steady to flashing energization, and this flashing of the red lamp is an indication to the approach controller on board X that he should call the airplane and instruct the pilot to make his procedure turn and proceed in direct approach of the runway as defined by the alignment of the airplane with the beacons RB5 and RB6.

After the controller of board X receives confirmation from the pilot of the airplane of the instructions to initiate the procedure turn, the restoration button No. 4 for computer unit A at the bottom of the panel $C^1$ of the board X is actuated, and in accordance with its actuation, the red indicator lamp R that has been energized is extinguished, and the mechanism of the computer unit A is restored to condition that computer unit for initiation in computing another landing approach.

Having thus considered in a general manner the procedure and mode of operation in making a computed pattern landing approach, consideration will now be given as to the specific circuit organization involved in this maneuver, it being assumed that the system has been conditioned as heretofore described by the closure of the power switch PS and by the actuation of the computer conditioning key switch KS so as to initiate the computer unit A.

Upon insertion of the token identifying the airplane for which the approach pattern is to be computed in the jack AX1TJ, the lock relay AXL (see Fig. 15) is picked up as a means for locking out the board Y by indicating on that board that the computer unit A is in use, and for other purposes in the circuit organization which will be more readily apparent as the description progresses. The pick up circuit for relay AXL under these conditions extends from (+), including contact 353 of token jack AX1TJ which is closed by insertion by the token, winding of relay AXL, back contact 354 of relay AYL, and back contact 355 of relay ACZ, to (−). The relay AXL is maintained picked up by its stick circuit which extends from (+), including normally closed contact 356 of the ground token jack AXGTJ, normally closed contact 357 of restoration button AXC—PB4, front contact 358 of relay AXL, winding of relay AXL, back contact 354 of relay AYL, and back contact 355 of relay ACZ, to (—).

Also in response to the insertion of the token into the jack AXITJ, the relay ACIZ is dropped away because of the opening of its circuit at normally closed contact 206 of the token jack AXITJ (see Fig. 16). By the dropping away of relay ACIZ, the common connections in the pick up circuits of the other relays AC2Z and AC3Z of the group associated with computer unit A are opened at front contacts 204 and 359 respectively. Upon the dropping away of the relay ACIZ, the relay AXYL is dropped away because its circuit is open at back contact 195 of relay AXL and also at front contact 211 of relay ACIZ. It will be noted that relay AXYL cannot obtain energization through the stick circuits of relays AC2Z and AC3Z because of the contacts 204 and 359 being opened respectively by the dropping away of the relay ACIZ.

With reference to Fig. 15, the picking up of relay AXL, by the closure of its front contact 360, provides for the steady energization of the red lamps AX—R and AY—R which are provided on boards X and Y respectively as being associated with the computer unit A, the energization of these lamps being effective to indicate to the respective controllers that the computer unit A is in use for computing a pattern approach, provided that the system is set up as is now assumed for making pattern approaches rather than straight-in approaches. However, as the description progresses, it will be readily apparent that these red lamps are also used as being indicative of the use of the particular vertical row of token jacks and a corresponding step of the stepper with which their control relays are associated for a straight-in approach.

With reference to Fig. 9, the picking up of relay AXL as has been described changes the energization of the green lamp AXC—G from steady to flashing by the shifting of contact 293, and the opening of back contact 298 is effective to extinguish the green lamp AYC—G which is associated with the computer unit A on the board Y. This is of course in accordance with the approach controller of the board X having taken control of the computer unit A for computing a pattern approach.

Because of the initiation of a pattern approach having been designated as has been described, a straight-in approach cannot be made until after a predetermined time interval has elapsed, and therefore the straight-in approach lamps XAB—G and YAB—G on the panels B¹ of boards X and Y respectively are extinguished in accordance with the dropping away of the relay AXYL. The circuits for these lamps are illustrated in Fig. 14 wherein the front contacts 361, 362, and 234 of relays AC—TERP, AXYL, and ATS are all open to provide for the deenergization of these lamps. The relay ATS is dropped away at the beginning of the first step in a manner to be hereinafter more specifically considered when considering the mode of operation of the warning and special separation timers.

When the airplane is called for initiating its landing approach, the approach controller actuates his push button No. 1 for computer unit A (button AXC—PB1 of Fig. 8) after the airplane pilot has acknowledged the call, and in accordance with the actuation of this button the indication control relay AYF is picked up. The pick up circuit for relay AYF extends from (+), including front contact 363 of relay AXL, contact 364 of button AXC—PB1 in its depressed position, front contact 365 of relay AGP, and winding of relay AYF, to (—). A stick circuit is established for relay AYF upon its picking up extending from (+), including front contact 366 of relay AXL, back contact 367 of relay ARS, front contact 368 of relay AYF, and winding of relay AYF, to (—).

With reference to Fig. 9, the picking up of relay AYF interrupts the circuit by which the green lamp AXC—G has been flashed at back contact 295, and the closure of front contact 295 provides for the steady energization of this lamp.

When the airplane pilot reports that he is over the beacon RB5, the second button AXC—PB2 associated with the computer unit A is actuated, and in response to actuation of this button (see Fig. 7) the relay AG is dropped away by the opening of its stick circuit at normally closed contact 283 of the button AXC—PB2. The stick circuit including the back contact 280 of relay AYF is open at this time as is the stick circuit including back contact 285 of relay AXL.

Upon the dropping away of the relay AG, the opening of its front contact 292 causes the dropping away of its repeater relay AGP, but because of the relay AGP having slow drop away characteristics, a momentary energization is provided with the relay AG dropped away and the relay AGP picked up for the out-time magnet OMA of computer unit A. This circuit extends from (+), including back contact 292 of relay AG, front contact 375 of relay AGP, wire 250, and windings of magnet OMA, (see Fig. 5), to (—). The energization of this magnet actuates the spider 134 in a counterclockwise direction to disengage the gear 114 from the stack-loss time pinion 113 and engage this gear 114 in mesh with the out-time pinion gear 135 which is driven through a suitable friction clutch 136 by the out-time motor MN which is provided according to the above mentioned Field et al. application, Ser. No. 573,876 as an out-time drive motor common to all computer units. The dotted line connection of the out-time shaft 376 of the gear reduction of the motor MN is to be understood as to include the apparatus or its equivalent disclosed in the Field et al. application as being involved in the connection of this motor MN to the out-time shaft 376 which is common to the out-time drive for all computer units.

In shifting the spider 134 from one drive to the other, the gear 117 is locked by the tooth 138 to prevent restoration of the time shaft 112 by the restoration spring 137. This is accomplished because the tooth 138 is held in engagement with the gear 117 during hte time when the magnet OMA shifts the gear 114 from the drive pinion 113 to the drive pinion 135. Upon deenergization of the magnet OMA when the dropping away of the relay AGP becomes effective, the compression spring 377 disengages the tooth 138 from the gear 117 and permits the time shaft 112 to be driven by the out-time motor MM'.

Because of the actuation of the number 2 button for the computer unit A being effective to designate that the airplane is over the beacon RB5, the shifting of the spider 134 is also effective to apply the brake 139 to the heading gear 140 of the heading shaft 141 so as to maintain the heading indication on the dial 103 in accordance with its indication at the time of actuation of this button.

Also by the shifting of the spider 134 the contact points 165 and 166 actuated thereby are closed, and because of these contact points 165 and 166 being connected in multiple with the contact points 121 and 122, it is provided that even after these contact points are opened by the rotation of the cam 118 as the operation of the time shaft 112 continues, alternating current energy from the terminal CX is maintained applied to the wire 378 which is common to all stack-loss timer motors MA, MB, and MC and to the separation timer motor M so that operation of these motors is not interrupted. The utility of this circuit organization will be better understood when considering the mode of operation in case extra separation time is required because of failure of an airplane to report over the beacon RB5 prior to the expiration of the maximum stack-loss time that can be measured by a computer unit.

A change in the indications on the board X is effected in response to the dropping away of the relay AG by extinguishing the lamp AXC—G (see Fig. 9) upon the opening of front contact 296 of relay AG. The closure of back contact 379 of relay AG, with the relay AYF picked up, is effective to cause the energization of the yellow lamp AXC—Y, which is associated with the computer unit A, with flashing energy. The circuit for this lamp extends from (F+), including back contact 380 of relay AYS, front contact 381 of relay AYF, back contact 379 of relay AG, front contact 382 of relay AXL, and lamp AXC—Y, to (—).

When the pilot reports having received the heading instruction from the approach controller, the approach controller actuates the third push button AXC—PB3 associated with the computer unit A, and in accordance with actuation of this button, the relay AYS (see Fig. 8) is picked up as a means for shifting the energization of the yellow lamp AXC—Y from flashing to steady. The pick up circuit for the relay AYS extends from (+), including front contact 363 of relay AXL, contact 383 of button AXC—PB3 in its depressed position, back contact 384 of relay AGP, front contact 385 of relay AYF, and winding of relay AYS, to (—). This relay is maintained picked up by a stick circuit extending from (+), including front contact 366 of relay AXL, back contact 367 of relay ARS, front contact 386 of relay AYS, and winding of relay AYS, to (—). With reference to Fig. 9, the shifting of contact 380 of relay AYS is effective to change the energization of the yellow lamp AXC—Y from flashing to steady energization.

As the time shaft 112 (see Fig. 5) of computer unit A approaches the end of its cycle of operation, the cam 119 on such shaft permits the spring biased pusher 127 to drop into the recess 119a in the cam surface and thereby close the contact points 129 and 130 and provide for the steady energization of the red lamp AXC—R (see Fig. 9). Thus under these conditions the lamp AXC—R is steadily energized by a circuit extending from (+), including front contact 387 of relay AXL, contact points 129 and 130 of computer unit A, wire 391, front contact 388 of relay AXL, and lamp AXC—R, to (—). The closure of the contact points 129 and 130 under this condition also is effective to pick up the restoration relay ARS (see Fig. 8). This relay is picked up by a circuit extending from (+), including front contact 387 of relay AXL (see Fig. 5), contact points 129 and 130 of computer unit A, wire 391, front contact 389 of relay AYS, and winding of relay ARS, to (—). The picking up of this relay, by the closure of its front contact 390 shunts contact 389 of relay AYS out of the circuit just described.

The picking up of relay ARS by opening its back contact 367 opens the stick circuits for the relays AYF and AYS and because of the pick up circuits for these relays being closed only during actuation of their associated push buttons, these relays become dropped away when the relay ARS is picked up. When the relay AYF is dropped away, the yellow lamp AXC—Y (see Fig. 9) is extinguished by the opening of its front contact 381. It will be noted with reference to Fig. 8 that although the pick up for the restoration relay ARS includes front contact 389 of relay AYS, the relay ARS is maintained energized by its stick circuit irrespective of the opening of this contact 389, as well as by its slow drop away characteristics as a means to insure the dropping away of the relays AYF and AYS irrespective of any difference in the operating characteristics of these relays. The relay ARS is dropped away when the computer unit A completes its cycle of operation and opens the contact points 129 and 130. Although energy is applied to the stick circuit of the relay ARS under these conditions intermittently for flashing the red lamp AXC—R (see Fig. 9), this intermittent energization is not sufficient to maintain the relay ARS picked up.

As the operation of the computer unit A progresses further so as to complete its operating cycle, the pusher 127 (see Fig. 5) is actuated to the right by the raised portion 119b of the cam 119 and thus opens the contact points 129 and 130 and closes contact points 131 and 132 so as to shift the energization of the lamp AXC—R (see Fig. 9) from steady to flashing. The circuit by which this lamp is energized with flashing energy under these conditions extends from (F+), including contact points 131 and 132 of computer unit A, wire 391, front contact 388 of relay AXL, and lamp AXC—R, to (—).

Upon observing the flashing red lamp AXC—R, the approach controller immediately calls the airplane and instructs the pilot to make a procedure right-hand turn and proceed in approach of the runway in alignment with the beacons RB5 and RB6. After the acknowledgement of these instructions by the pilot of the airplane, the approach controller actuates the fourth push button AXC—PB4 for the computer unit A which is effective to restore that computer unit, to extinguish the red lamp AXC—R.

With reference to Figs. 8 and 5, the actuation of the push button AXC—PB4 applies energy to the restoration magnet NMA by a circuit extending from (+), including front contact 363 of relay AXL, contact 394 of button AXC—PB4 in its depressed position, wire 269, and magnet NMA, to (—). The energization of this magnet by attracting its armature 142 actuates the spider 134 to a position slightly beyond center in which further clockwise rotation is prevented by the engagement of the rod 144 behind the detent 299 of the spider 134, this rod 144 being actuated in accordance with the energization of the magnet NMA. In this position the spider 134 is disengaged from both pinions 113 and 135, and the brake 139 is released from the heading drive gear 140 by the biasing spring 395 so that both time and heading shafts 112 and 141 are restored by the restoration spring 137. When the spring biased restoration button AXC—PB4 is restored to its normal position, the restoration magnet NMA is deenergized. The restoration spring 145 then disengages the rod 144 from the detent 299 of the spider 134 to permit the spider 134 to be actuated to its clockwise operated position by the toggle spring 146 with its gear 114 in mesh with the low speed pinion 113 which is driven by the motor MA. The motor MA is inactive at this time, however, because the control circuit for the motor MA has been opened when the relay AG has been dropped away at the time of designation that the airplane reported over the beacon RB5 when initiating the holding loop. The dropping away of the relay AG (see Fig. 7) has thus been effective by the opening of its front contact 285 to open the circuit that has been described by which the motor MA was initially energized. The relay AG can again be picked up for initiation of the operation of this motor MA only when the relay 1VA is picked up for the first step of the stepper at the beginning of a second cycle of operation of the stepper.

*Successive pattern approaches*

For a consideration of successive pattern approaches, it will be assumed that a sufficient number of airplanes is held in the holding stacks as to permit successive landings spaced at separation times determined by the time setting of the separation timer TE. The actuation of the stepper step-by-step at a rate determined by this separation timer has been specifically considered as well as the computation of a pattern approach rendered effective in response to the first step of the stepper. Thus, for a consideration of successive pattern approaches, it will be assumed that the approach of a first airplane is made as has been described and as diagrammatically illustrated by the sequence chart of Figs. 22A and 22B.

Upon the initiation of the first computer unit A at the beginning of the first step of the stepper, the separation timer TE is initiated, and the picking up of the second step relay 2VA subsequent to the completion of the separation timing conditions a circuit for the picking up of the relay BG (see Fig. 7) for initiating computer unit B. Similarly when the third step is initiated, the relay CG of Fig. 7 is picked up for initiating the computer unit C, and as the stepper initiates another cycle of operation, the picking up of the first step relay 1VA, after separation time has elapsed since the picking up of the relay 3VA for the third step, conditions the relay AG so that it is again picked up to initiate the computer unit A.

Considering this mode of operation more specifically with reference to Fig. 7, the picking up of relay 2VA during the second step of the stepper establishes a circuit for the picking up of the relay BG extending from (+), including back contact 396 of relay BC—TER, back contact 397 of relay BCW—TER, front contact 398 of relay 2VA, back contact 399 of relay 2VB, winding of relay BG, back contact 400 of relay BCZ, and back contact 279 of relay SAPP, to (—). The stick circuit including front contact 401 of relay BG and normally closed contacts 402 and 403 of buttons BXC—PB2 and BYC—PB2 provides for the restoration of the relay BG upon actuation of the No. 2 push button (see Fig. 1) for the computer unit B during the pattern approach computed by the computer unit B.

The picking up of relay BG, by the closure of its front contact 404, applies energy through the wire 405 to the stack-loss timer motor MB (see Fig. 5) of the computer unit B, thus initiating the timing of the stack-loss time. At the time when this motor is initiated, the green lamps G for computer unit B on the respective boards X and Y are steadily energized, indicating that the computer unit B has been started and is available for use in computing a pattern approach. From there on throughout the procedure in making the pattern approach, the same mode of operation is followed that has been described specifically with respect to a pattern approach computed by the computer unit A. With reference to the chart of Figs. 22A and 22B, this operation of the computer unit B has been illustrated as being employed by the approach controller of board Y for computing a pattern approach that is assumed to be under his supervision, thus indicating the manner in which the supervision of landing approaches can be divided between the approach controllers of the respective boards X and Y so that, if desired, the approach controllers can govern respective alternate landing approaches. Upon insert of a token for the airplane making the pattern approach in the board Y by the controller of that board, it has been assumed that the token is inserted in the jack BY2TJ because it is assumed that the next lower altitude is still occupied by the first airplane in making its landing approach. Therefore the 1500 foot altitude for which this token jack is provided, is the next highest altitude available for use. Upon the insertion of the token in this jack, the lock relay BYL (see Fig. 15) is picked up by a circuit extending from (+), including contact 406 of token jack BY2TJ, winding of relay BYL, back contact 407 of relay BXL, and back contact 408 of relay BCZ, to (—). This relay is maintained energized by its stick circuit until the token is moved to the ground position in the vertical row of token jacks associated with the computer unit B as the airplane is laddered down to an actual landing. This stick circuit extends from (+), including normally closed contact 409 of token jack BYGTJ, normally closed contact 410 of the button BYC—PB4, front contact 411 of relay BYL, winding of relay BYL, back contact 407 of relay BXL, and back contact 408 of relay BCZ, to (—).

With reference to Fig. 9, the green lamps BXC—G and BYC—G are steadily energized upon the picking up of the relay BG for initiation of the computer unit B by the energization of circuits that have been heretofore described for the energization of the lamps AXC—G and AYC—G associated with computer unit A, and upon the picking up of relay BYL, the lamp BXC—G is extinguished by the opening of back contact 412 of this relay because the control is to be made from the board Y under the assumed conditions. The flashing of the green lamp BYC—G is rendered effective by the shifting of contact 413 of relay BYL to remind the controller that he should call the airplane as soon as possible and instruct the pilot to report over the beacon RB5 for initiating a holding loop.

Assuming that the pilot reports as being over the beacon RB5, the controller of board Y then actuates his second push button BYC—BP2 for computer unit B and thus effects the restoration of the relay BG (see Fig. 7) and the momentary energization of the magnet OMB (see Fig. 5) through the wire 251 to shift the spider of computer unit B as a means for changing the speed of drive of that computer unit to initiate timing of the out-time, and as a means to lock the drive of the heading indicator dial for that computer unit. The actuation of button No. 2 extinguishes the green lamp BYC—G for computer unit B which has been changed from flashing to steady by the actuation of the first push button associated with that computer unit by a circuit organization illustrated in Figs. 8 and 9 which will be readily recognized as corresponding to the circuit organizations employed under similar conditions with respect to a pattern approach computed by the computer unit A. The lamp BYC—Y (see Fig. 9) is energized with flashing energy upon the dropping away of the relay BG when the second button is actuated, and the flashing of this lamp continues until the actuation of button No. 3 for computer unit B has been rendered effective to designate that the pilot of the airplane has received his heading instructions. The actuation of this button No. 3 is effective to pick up the relay BYS by the energization of a circuit which is similar to the circuit which has been specifically described for the picking up of relay AXS, and in accordance with the picking up of this relay BYS, the energization of the yellow lamp BYC—Y is changed from flashing to steady by the shifting of contact 314.

The operation of the computer unit B has thus been initiated for timing the out-time, and at the end of this time a red indicator lamp BYC—R (see Fig. 9) is energized by a mode of operation and circuit organization comparable to that which was described for the energization of the lamp AXC—R when considering specifically the mode of operation in making a pattern approach computed by computer unit A. It will be noted that the energization of the lamp BYC—R is selected in preference to lamp BXC—R by the closure of front contact 415 because of the control of the pattern approach assumed to be governed by the controller of board Y rather than the controller of board X.

After the pilot of the airplane having its pattern approach computed by the computer unit B has received instructions to make the right-hand procedure turn at the end of the out-time, the approach controller of the board Y actuates his No. 4 computer control button to restore the computer unit so as to condition that unit for subsequent initiation in response to the second step of the stepper for use in computing the pattern approach for another airplane. This restoration designation is accomplished in a manner corresponding to that which has been specifically described for the computer unit A. In accordance with the actuation of the restoration push button BYC—PB4 (see Fig. 8) energy is applied to the wire 268 which extends to the restoration magnet NMB of computer unit B (see Fig. 5), and by the momentary energization of this magnet, the computer unit B is restored by a mode of operation corresponding to that which has been specifically described with respect to the restoration of the mechanism of computer unit A in accordance with the momentary energization of the restoration magnet NMA of that computer unit.

Upon the picking up of the relay 3VA for the third step of the stepper, the relay CG (see Fig. 7) is picked up to initiate the stack-loss timer of computer unit C. The relay CG is picked up under such conditions by energization of a circuit extending from (+), including back contact 416 of relay CC—TER, back contact 417 of relay CCW—TER, front contact 418 of relay 3VA, back contact 419 of relay 3VB, winding of relay CG, back contact 420 of relay CCZ, and back contact 279 of relay SAPP, to (—). The picking up of this relay closes a stick circuit including front contact 421 of relay CG and normally closed contacts 422 and 423 of buttons CXC—PB2 and CYC—PB2 which are associated with computer unit C on the boards X and Y respectively. Relay CG when picked up applies energy to the stack-loss timer motor MC (see Fig. 5) of computer unit C through front contact 424 of relay CG and wire 425. Thus the computer unit C is initiated as is illustrated by the chart of Figs. 22A and 22B, and the computer unit is indicated as being available for use on both boards X and Y by the steady energization of the green lamp G associated therewith. The red lamps XC—R and YC—R (see Fig. 15) which are also associated with the computer unit C are deenergized to indicate to the respective controllers that the computer unit C has not been designated for use.

It has been indicated in the chart of Figs. 22A and 22B that the controller of board X takes over the use of the computer unit C by insertion of a token in the token jack CX3TJ. With reference to Fig. 1, this is the token jack for the 2000 foot flight altitude in the right-hand vertical row of jacks on the panel C¹ of board X. This flight altitude is assumed under the conditions which are being considered, as it may or may not have been possible to ladder down the first two airplanes that have been assumed as being respectively assigned to the lower two flight altitudes. In any event, it would be desirable to bring the airplane into the next highest flight altitude that is available within the inner stack.

In accordance with having designated the computer unit C as being in use by the controller of board X, indications are displayed on the respective boards in accordance with this condition, and the same procedure is followed in making a pattern approach governed by the computer unit C as has been more or less specifically described in respect to the pattern approaches governed by the respective computer units A and B. Thus a third airplane is called and is instructed to report over the beacon RB5, and in accordance with his reporting over this beacon, the actuation of the second push button for the computer unit C is effective to restore the relay CG (see Fig. 7) and in accordance with such restoration to apply energy momentarily to the wire 252 for the energization of the out-time magnet OMC of computer unit C so as to shift the spider (not shown) of this computer unit counter clockwise so as to drive the cams 426, and 427 on the time shaft 428 by the out-timer MM.

Upon instructing the pilot of fly the heading indicated by the dial of the computer unit C, and receiving confirmation of such instructions, the controller of board X then actuates his button No. 3 associated with computer unit C and thus effects the picking up of the relay CYS (see Fig. 8) by the energization of a circuit including the front contact 429 of the lock relay CXL, contact 430 of button CXC—PB3 in its depressed position, back contact 431 of relay CGP, and front contact 432 of relay CYF. With reference to Fig. 9, the picking up of relay CYS shifts the energization of the yellow lamp CXC—Y from flashing to steady in accordance with a circuit organization for the control of this lamp comparable to the circuit organization that has been more specifically described for the yellow lamp AXC—Y which is associated with the computer unit A.

Upon expiration of the out-time, the cam 427 of the computer unit C (see Fig. 5) is effective to cause first a steady energization and then a flashing energization of the red lamp CXC—R (see Fig. 9), the flashing red lamp being an indication that it is time to call the pilot of the airplane and instruct him to start his right-hand procedure turn.

After the pilot has acknowledged these instructions, the controller of board X then depresses his button No. 4 for the computer unit C, and in accordance with the actuation of this button, energy is momentarily applied by wire 267 to the restoration magnet NMC of computer unit C to effect the restoration of that computer unit. This mode of operation is provided by a circuit organization corresponding to that which has been more specifically described with respect to the restoration of the computer unit A in response to the actuation of the computer restoration button No. 4 that is associated with that computer unit.

With reference to Fig. 22B, it will be noted that the stack-loss timer OMA for the computer unit A is initiated in response to step No. 1 subsequent to the timing operation of separation timer TE after the stepper has completed one cycle of operation by stepping through its three respective steps. Thus, under these conditions, the first step relay IVA is again picked up in a manner which has been described when considering specifically the mode of operation of the stepper, and in accordance with the picking up of this relay the relay AG (see Fig. 7) is picked up for initiating the computer unit A. The pick up circuit for relay AG under these conditions extends from (+), including front contact 273 of relay PO, back contact 274 of relay AC—TER, back contact 275 of relay ACW—TER, front contact 276 of relay IVA, back contact 277 of relay IVB, winding of relay AG, back contact 278 of relay ACZ, and back contact 279 of relay SAPP, to (—). Subsequent to the picking up of the relay AG, further progress in the conditioning and use of the computer unit A for computing a pattern approach for an airplane corresponds to the mode of operation that has been heretofore described with respect to the use of the computer unit A.

*Additional separation time between pattern approaches*

Under the conditions that have been assumed for making successive computed pattern approaches, it has been assumed that there were always airplanes available to make the respective approaches at a predetermined separation time, which is the condition that exists under heavy traffic conditions. If, on the other hand, traffic is light, and an airplane cannot be called so as to report over the beacon RB5 within a predetermined maximum stack-loss time interval the particular computer unit that has been initiated and is available for the next computed approach reaches a maximum stack-loss position in which it is effective to open the circuit for its own stack-loss timer motor, and also to open the circuits for the stack-loss timer motors of the other computer units as well as to open the circuit of the drive motor M of the separation timer TE. This is done so that any additional delay that is encountered in the first maneuver subsequent to the expiration of the maximum stack-loss time is correspondingly applied to all subsequently initiated computer units and also to the separation timer TE. Thus when an airplane does report over the beacon RB5, the actuation of the push button No. 2 for the computer unit that has been stopped because of having maximum stack-loss time, automatically permits the driving of the subsequently initiated computer units to be resumed as well as the driving of the separation timer TE, the prior determined relative timing of these devices being maintained.

To consider an example of this mode of operation, if it is assumed that the computer units A, B, and C are all in operation, it may be assumed that the computer unit B has been driven to its maximum stack-loss position which is defined by the opening of the contact points 288 and 289 (see Fig. 5) by the cam 147 on the time shaft. The opening of these contact points disconnects the common control wire 378 for the stack-loss timer motors MA, MB, and MC and also for the separation timer motor M of the separation timer TE from the alternating current source of energy (CX). Although these contact points 288 and 289 are opened every time that the completer unit B is used, the designation by the actuation of the No. 2 push button associated with the computer unit B of an airplane reporting over beacon RB5 prior to the maximum stack-loss time is effective to close the contact points 433 and 434 in a manner which has been described more specifically with reference to similar contact points of the computer unit A. The closing of these contact points 433 and 434 which are connected in multiple with the contact points 288 and 289 that are actuated by the maximum stack-loss cam 147 prevents the opening of the motor control common circuit, and permits the stack-loss timers to continue their operation according to the mode of operation that has been heretofore described.

If it is assumed that maximum stack-loss time is reached by the computer unit B, the computer unit A may be timing the out-time of a prior initiated landing approach as governed by the motor MM so the operation of this computer unit is not affected by the interruption in the common connection for the stack-loss timer motors. The computer unit C, however, which would have been initiated subsequent to the initiation of the computer unit B is interrupted in its operation as this computer unit must have additional delay inserted to correspond with the additional delay required for the computer unit B.

In accordance with the actuation of the pusher 435 by the maximum stack-loss cam 147 of computer unit B, a circuit is closed for the steady energization of one or the other of the yellow lamps BXC—Y or BYC—Y (see Fig. 9), dependent upon whether a token is inserted in the board X or the board Y for the computer unit B. Thus, if the token is inserted in the board X under these conditions, the lamp BXC—Y for computer unit B on board X is energized by a circuit extending from (+), including contact points 436 and 437 of computer unit B, wire 438, front contact 439 of relay BG, front contact 439 of relay BG, front contact 440 of relay BXL, and lamp BXC—Y, to (—). If the computer unit B is used by the controller of board Y rather than by the controller of board X the lamp BYC—Y is energized instead of the lamp BXC—Y in accordance with the closure of front contact 441 of relay BYL.

In addition to the energization of the yellow lamp to indicate that maximum stack-loss time has been consumed by the computer unit B, a relay BML (see Fig. 9) is picked up at this time as a means for stopping the operation of the warning timer motors that are used for governing the energization of the warning lamp WK for computed pattern approaches, and also for stopping the operation of the special pattern separation timers that govern as to when a subsequent straight-in approach can be initiated, the circuits for these timer motors being illustrated in Fig. 12.

Thus the relay BML (see Fig. 9) is energized when the computer unit B has reached its maximum stack-loss time position by a circuit extending from (+), including contact points 436 and 437 of the computer unit B (see Fig. 5), wire 438, front contact 442 of relay BGP, and winding of relay BML, to (—). By reason of the inclusion of front contact 442 of the relay BGP in this circuit for the relay BML, it is provided that the relay BML is only picked up under maximum stack-loss time conditions, as the actuation of the No. 2 push button for the computer unit B prior to maximum stack-loss time is effective to cause the dropping away of relay BGP and thus open the circuit for relay BML at front contact 442.

With reference to Fig. 12, energy is fed to the circuit network governing the energization of the motors of timers AC—TER, ACW—TER, BC—TER, BCW—TER, CC—TER and CCW—TER through back contacts 443, 444 and 445 of the relays AML, BML and CML for the respective computer units A, B and C, so that the driving of these motors is interrupted by any one of these computer units reaching its maximum stack-loss position without an airplane having its pattern computed by that computer unit having been designated as leaving the stack by actuation of the No. 2 computer push button. It will be noted that the picking up of relay AML, BML or CML does not interrupt any timer that is for a preceding airplane as the relay AGP, BGP or CGP that is associated with that timer is deenergized at that time to apply energy to the timer magnets irrespective of the above described circuit network. It is therefore provided that the interruption of the drive of these timer motors is effected when maximum stack-loss position is reached where it is necessary to insert extra separation time between any two computed pattern approaches.

It will be noted that in any case where the interruption of the circuit of a motor for a timer or a computer unit is rendered effective under the conditions that have just been described, the particular timer or computer unit is not restored so as to reinitiate its timing but is merely stopped for an interval equal to the extra separation time required. Thus in Fig. 12, the energization of the magnets governing the drive of the respective timers by their associated motors is not interrupted, and thus the timers are maintained in a mid-point, if they have been previously initiated, so that the time of operation which they have consumed is effectively stored and these timers merely resumed their operation at such time as the computer units are again initiated by actuation of the No. 2 push button for the computer unit that has reached its maximum stack-loss time position prior to the actuation of this button.

Straight-in approach following a computed pattern approach

For a consideration of the system organization governing a clearance for initiating a straight-in approach following a computed pattern approach, it may be assumed, for purposes of illustration, that a first airplane is making a computed pattern approach as has been described and as is indicated in the chart in Figs. 22A and 22B, this computed pattern approach being governed by the computer unit A. Upon initiation of this computer unit, a special timer AC—TER is initiated for the purpose of determining when a straight-in approach can be made from the outer beacon RB4 in order that the desired separation may be provided between the respective pattern and straight-in approaches involved. The timer AC—TER is set in accordance with desired separation between these particular approaches and other considerations in a manner to be hereinafter considered when considering specifically the computation of timer settings, but relatively speaking, the setting of the timer AC—TER is for a time interval greater than the time required for the completion of the operation of the computer unit A through its operating cycle so that this computer unit has completed its computation of the pattern for its associated airplane, including the timing of the out-time for that airplane, prior to an indication being provided on the boards X and Y permitting the initiation of a straight-in approach.

Upon the initiation of the computer unit A, the timer control relay ATS is dropped away to initiate the associated timers AC—TER and ACW—TER. If it is assumed that the system has just been initiated as is shown in the sequence chart of Figs. 22A and 22B, the relay ATS is dropped away in response to the picking up of the power off relay PO by the opening of its circuit at back contact 212 (see Fig. 12), the relay AG being picked up at that time to open back contact 217. According to the normal operation of the system wherein the system has completed one or more cycles of operation of the respective computer units, the relay ATS is dropped away as a result of the opening of its stick circuit at back contact 217 by the picking up of relay AG. When relay ATS is dropped away, a circuit is closed for the timer motors AC—TER and ACW—TER extending from (BX), including back contacts 443, 444, and 445 of relays AML, BML, and CML respectively, front contact 446 of relay AGP, back contact 447 of relay ATS, and the motors M of the timers AC—TER and ACW—TER connected in multiple, to (CX). The closure of back contact 448 of relay ATS energizes the magnets of the timers AC—TER and ACW—TER to cause the timing mechanisms of these timers to be initiated.

The sequence of operation of parts of the system involved in a straight-in approach under these conditions is illustrated by the sequence chart of Figs. 23A and 23B. With reference to Fig. 23A, the computed pattern approach of the first airplane is indicated in block form as having been completed prior to the expiration of the time of the timer AC—TER. When this timer has completed its operation, the associated repeater relay AC—TERP is picked up (see Fig. 12) by the closure of front contact 449. The picking up of this relay is effective to energize the green straight-in clearance lamps XAB—G and YAB—G on the panels B¹ of the boards X and Y respectively, the panel B¹ being selected in accordance with the straight approach switch SAL being in its right-hand position to designate that it is the right-hand end of the runway that is being approached for the landing maneuvers. With reference to Fig. 14, these lamps are energized under this condition by a circuit extending from (+), including back contact 231 of relay 3SW—TER, back contact 232 of relay 2SW—TER, back contact 233 of relay ISW—TER, front contact 361 of relay AC—TERP, front contact 235 of relay BTS, front contact 236 of relay CTS, contact 237 of switch SAL in its right-hand position, back contact 238 of relay XSA—BP, back contact 239 of relay YSA—BP, and lamps XAB—G and YAB—G connected in multiple, to (—). It will be noted that it is the closure of front contact 361 of the relay AC—TERP in this circuit that governs the energization of the lamps because the contacts 362 and 234 of relays AXYL and ATS are both open at this time (see Fig. 22A).

Thus upon observing the illumination of the green straight-in lamps XAB—G and YAB—G on the panels B¹ on the boards X and Y, clearance is given to the respective controllers of these boards for calling an airplane to initiate a straight-in landing approach. According to the sequence chart of Figs. 23A, and 23B, it is assumed that a second airplane is called for making a landing approach to follow the first airplane which it is assumed has had its pattern computed by the computer unit A. It is assumed that the second airplane makes a straight-in approach, and that such airplane has its approach governed by the controller of board X. Thus the airplane to make the straight-in landing is called by the controller of board X and instructed to report over the outer beacon R4 which for this embodiment of the present invention, is used to mark the beginning of a straight-in approach.

When the airplane making the straight-in approach reports over the outer beacon R4, the controller of board X actuates his straight-in button XBS—PB on the panel B¹ of board X for designating that the straight-in approach is initiated and thus initiating warning and separation timers and resequencing the stepper. The stepper is resequenced so that the separation timer TE may be used for measuring the separation time for successive straight-in approaches in a manner to be hereinafter considered.

The actuation of the button XBS—PB (see Fig. 10) is effective to pick up the relay XSA—B. The pick up circuit for this relay extends from (+), including front contact 450 of relay AC—TERP (see Fig. 11), front contact 451 of relay BXYL, front contact 452 of relay CXYL, wire 453, contact 454 of switch SAL in its right-hand position (see Fig. 10), contact 455 of button YBS—PB in its normal position, contact 456 of button XBS—PB in its actuated position, back contact 457 of relay XSA—BP, back contact 458 of relay YSA—BP, winding of relay XSA—B, and back contact 459 of relay YSA—B, to (—). The picking up of this relay closes a stick circuit at front contact 460 to shunt back contact 457 of relay XSA—BP out of the circuit just described. The repeater relay XSA—BP is picked up in response to the picking up of the relay XSA—B upon the closure of front contact 461, and it is maintained picked up by a stick circuit extending from (+) including front contact 462 of relay VP, front contact 463 of relay XSA—BP, and winding of relay XSA—BP, to (—). Thus the repeater relay XSA—BP is picked up in response to the actuation of the straight-in button XBS—PB, through the medium of the relay XSA—B, and is maintained picked up throughout the first step of the stepper in a manner to be more readily apparent as the description progresses.

The straight-in approach repeater relay SAP is picked up in response to the picking up of relay XSA—B by the energization of a pick up circuit closed at front contact 464 of relay XSA—B. It will be noted that the relay SAP is picked up in response to the picking up of any of the straight-in control relays XSA—A, YSA—A, XSA—B or YSA—B because of the respective contacts 465, 466, 464, and 467 of these relays being included in multiple in the pick up circuit for the relay SAP. Relay SAP when picked up is maintained picked up through its stick circuit extending from (+), including back contact 468 of relay SAPP, front contact 469 of relay SAP, and winding of relay SAP, to (—). This stick circuit provides that the relay SAP is maintained picked up until the relay SAPP is picked up subsequent to the restoration of the straight-in push button that has been actuated. Relay SAPP is maintained picked up as long as successive straight-in approaches are made.

In response to the picking up of the repeater relay XSA—BP, the computer resequencing relay ICR (see Fig. 17) is picked up to initiate the resequencing of the stepper and the restoration of the computer units. The pick up circuit for the relay ICR extends from (+), including back contact 470 of relay SAPP, front contact 471 of relay XSA—BP, front contact 472 of relay XSA—B, and winding of relay ICR, to (—). It will be readily apparent that this relay ICR can also be picked up by a similar circuit organization upon designation of a straight-in approach by the controller of board Y by the actuatoin of his straight-in button YBS—PB on the panel B¹ of his board Y. Also the circuit for relay ICR is so organized that this relay is picked up in response to the designation of a straight-in approach as being initiated in approach of the left-hand end of the runway from the outer left-hand beacon RB1 (see Fig. 20). The inclusion of back contact 470 of relay SAPP in the circuit for the relay ICR provides that such relay is picked up for only the first of a series of straight-in approaches, this is because resequencing of the stepper is required only for the first straight-in approach to follow a computed pattern approach.

The resequencing relays ACZ, BCZ, and CCZ are picked up in response to the closure of their respective pick up circuits by the picking up of relay ICR at front contacts 473, 474, and 475. The relays ACZ, BCZ, and CCZ in picking up are effective to restore whichever of the respective computer units A, B, or C that has had its relay G picked up. The picking up of relay BCZ in response to the energization of relay ICR provides for the deenergization of the relay BG (see Fig. 7), which is assumed to be picked up at this time, by the opening of back contact 400. Relay BG in dropping away opens the circuit for its repeater relay BGP at front contact 476 and prior to the dropping away of relay BGP, the out-time magnet OMB (see Fig. 5) is energized by a mode of operation that has been described for shifting the spider (not shown) of computer unit B to its out-time driving position. When relay BGP becomes dropped away, with reference to Fig. 8, a circuit is closed for energization of the restoration magnet NMB of computer unit B extending from (+), including front contact 477 of relay BCZ back contact 478 of relay BGP, wire 268, and magnet NMB, to (—). This remains energized only until the relay BCZ is dropped away upon the restoration of the straight-in push button XBS—PB to its normal spring biased position.

By a similar mode of operation any other computer unit that has its control relay G picked up is restored. Under the conditions assumed, the computer A has just been restored manually and the relay CG may or may not be picked up, dependent upon the time settings.

The picking up of the resequencing relays ACZ, BCZ, and CCZ is also effective to permit restoration of whatever stepper relays 1VA, 2VA, 3VA, and 1VB, 2VB, and 3VB may be picked up at the time when the straight-in approach is designated. It will be noted that the relays VB are dropped away in response to the relays VA for the corresponding steps and that the relays VA have stick circuits dependent in one branch upon contacts of the relays CR, and dependent in another branch upon contacts of the relays CZ for the computer units with which these respective steps are associated. Inasmuch as the relay 1CR is picked up at this time, it opens the stick circuit for the relays 1VA, 2VA, and 3VA at back contacts 264, 326, and 317 respectively, and the other source of stick circuit energy for these respective relays is removed at back contacts 478, 479, and 480 of the relays ACZ, BCZ, and CCZ.

Because of the relays VB being all dropped away in response to the dropping away of their associated relays VA, the stick circuit for the repeater relay VBP is opened at front contacts 320, 321, and 322 of the relays 1VB, 2VB, and 3VB respectively so that this relay is dropped away after the stepper relays have been restored. It is preferable that this relay VBP be made slightly slow acting in order to insure the complete restoration of the stepper relays prior to the closing of its back contact 481 which is effective under the assumed conditions to reinitiate the stepper by the picking up of the stepper relay 1VA. Thus after restoration of the stepper relays, the closure of back contact 481 of the relay VBP, under the assumed operating conditions, is effective to pick up the stepper relay 1VA to reinitiate the stepper operation.

If it is assumed that the first airplane which was assumed to make a pattern approach is still at the 1000 foot altitude, and the token for this airplane is still in the token jack AX1TJ (see Fig. 1), the relay AC1Z (see Fig. 16) for that altitude and that computer unit is deenergized as has been described, and thus because of this relay being deenergized, it is selected that the first step relay 1VA is picked up during the resequencing of the stepper unit. Thus with reference to Fig. 6, the relay 1VA is picked up upon the dropping away of relay VBP subsequent to the restoration of the stepper by a circuit extending from (+), including back contact 481 of relay VBP, front contact 482 of relay 1CR, back contact 483 of relay AC1Z, and winding of relay 1VA, to (−).

It will be noted that if there were no airplane at the 1000 foot altitude, the relays AC1Z, BC1Z, and CC1Z would all be picked up, and thus the relay 1VA would be picked up through the respective front contacts 483, 484, and 485 of these relays. If, on the other hand, a token is in the center of the vertical rows of token jacks of the panel C¹ for the 1000 foot altitude, the closure of back contact 484 provides for the picking up of the second step relay 2VA when initiating straight-in approaches, and similarly a token in the jack for the 1000 foot altitude of the right-hand vertical row of token jacks of the panel C¹ would be effective to cause the picking up of the relay 3VA by the closure of back contact 485 of relay CC1Z under the conditions for initiation of straight-in approaches. Thus it is found that the resequencing of the stepper for straight-in approaches is primarily effected so as to restore the separation timer TE, and thus insure that full separation time is provided between the first of the straight-in approaches and a subsequent straight-in approach, the particular step at which the stepper is reinitiated being relatively unimportant. It will be more apparent that as the description progresses that the circuit organization that is provided for the reinitiation of the stepper is particularly organized to satisfy other conditions where resequencing operations are involved.

The picking up of relay 1VA, by the opening of its back contact 192, provides for the dropping away of the relay VP, which in turn effects the restoration of the separation timer TE by the general mode of operation that has been heretofore described when considering the mode of operation of the stepper specifically. Thus, according to the normal mode of operation of the stepper, the restoration of the separation timer TE effects the picking up of the relay 1VB, and the picking up of that relay in turn causes the picking up of the relay VP to reinitiate the separation timer TE so as to determine when the next step, and thus the next straight-in approach can be initiated.

Although the above described mode of operation involves several relay operations in sequence as shown diagrammatically in the chart of Figs. 23A, and 23B, and because of these relays being relatively quick acting, these operations are completed within a very short time, and thus although the actuation of the straight-in buttons must be sustained for this period of time, the time involved is very short and unobjectionable from an operating standpoint. Thus the push button XBS—PB is restored subsequent to the stepper having been resequenced, and in accordance with such restoration, the button repeater relay (see Fig. 10) XSA—B is restored because of the opening of its circuit at the contact 456 of the button XBS—PB. Upon the restoration of the relay XSA—B, the circuit that has been described for the relay 1CR (see Fig. 17) is opened at front contact 472, and thus the relay 1CR is dropped away, and it in turn effects the deenergization of the relays ACZ, BCZ, and CCZ by opening their circuits at front contacts 473, 474, and 475.

The dropping away of relay 1CR (see Fig. 6) is effective to establish a stick circuit which has been described for maintaining the relay 1VA picked up at back contact 264, and the relay VBP is picked up in accordance with the closure of back contact 317 of relay 1CR through front contact 318 of relay 1VB. Thus the circuit that has been described for the reinitiation of the stepper has been opened at back contact 481 of relay VBP, as well as at front contact 482 of relay 1CR. The stepper relays VA are sufficiently slow acting to be maintained picked up during the shifting of the contacts of the relay 1CR to close their respective stick circuits.

The relay 1CR in dropping away provides for the picking up of the straight approach repeater relay SAPP (see Fig. 10), such relay being used particularly to render the relays AG, BG, and CG, and the associated relays AGP, BGP, and CGP (see Fig. 7), inactive as long as straight-in approaches are being made. This is accomplished by the opening of back contact 279 of the relay SAPP which is common to the pick-up circuits of relays AG, BG, and CG. The pick up circuit for the relay SAPP (see Fig. 10) extends from (+), including back contacts 486, 487, and 488 of relays ICR, 2CR, and 3CR, respectively, back contacts 489, 490, 491, and 492 of relays YSA—B, XSA—B, YSA—A and XSA—A respectively, front contact 493 of relay SAP, and winding of relay SAPP, to (—). The closure of front contact 494 of relay SAPP maintains that relay energized, dependent directly upon the three resequencing relays ICR, 2CR, and 3CR being dropped away. Thus the relay SAPP is maintained picked up until such time as the resequencing of the stepper is rendered effective when the system is conditioned in a manner to be hereinafter considered for a subsequent pattern approach. The picking up of the relay SAPP opens the stick circuit for relay SAP at back contact 468 to effect the restoration of that relay, the relay SAP being picked up for each straight-in approach that is to be made for the purpose of initiating warning and special separation timers in a manner to be hereinafter considered.

If it is assumed that the airplane making the prior pattern approach is at the 1000 foot altitude, it can be assumed that the airplane making the straight-in approach is instructed to fly at the 1500 foot altitude when called, and thus the token for this airplane making the straight-in approach is inserted by the controller in the center vertical row of token jacks on his panel $C^1$, at the 1500 foot altitude position, in the jack BX2TJ. This vertical row of token jacks is chosen because it is the next available row as indicated by the red availability lamps which are disposed beneath these respective vertical rows of token jacks. The red lamp AX—R which is associated with the left-hand vertical row of token jacks on the panel $C^1$ is illuminated at this time because of the presence of a token in the token jack AX1TJ for the first airplane which is assumed to be making a computed pattern approach. In accordance with the insertion of the token for the airplane making the straight-in approach in the token jack BX2TJ, the lock relay BXL is picked up, and the relay BC2Z is dropped away by a mode of operation which has been considered when considering specifically the mode of operation of the system involving pattern approaches. The red lamps BX—R and BY—R (see Figs. 1 and 15) are illuminated on the boards X and Y to indicate that the center vertical row of token jacks is in use, these lamps being energized in accordance with the licking up of the lock relay BXL.

The laddering down of the airplane in making its straight-in approach is accomplished by a suitable mode of operation for obtaining clearances such, for example, as is fully disclosed in my copending application Ser. No. 34,961, filed June 24, 1948, and when the airplane reports leaving the lowest flight altitude in its approach, the token for that airplane is moved to the token jack BXGTJ for the ground position, such operation being effective to restore the relay BXL and extinguish the lamps BX—R and BY—R.

*Successive straight-in approaches*

Assuming that a first straight-in approach has been initiated as has been described, the system is conditioned for successive straight-in approaches in that the stepper, subsequent to its having been resequenced, is conditioned to step at a rate determined by the separation timer and to govern the energization of the green straight-in indicator lamps on the respective boards X and Y so as to indicate the times at which successive straight-in approaches can be initiated. The manner in which the stepper is actuated step-by-step under these conditions has been heretofore described when considering more specifically the stepper circuit organization and its mode of operation.

With reference to the charts of Figs. 23A and 23B, the separation timer TE is illustrated as being initiated by the picking up of the relay VP on the first step of the stepper, and the completion of the operation of the separation timer TE is effective to cause the energization of the green straight-in lamps XAB—G and YAB—G on the panels $B^1$ of the respective boards X and Y. Thus according to the mode of operation of the stepper as it has been described, the completion of the timing of the separation timer TE effects the picking up of the relay 2VA and the dropping away of the relay VP. Upon the dropping away of the relay VP, the stick circuit for the relay XSA—BP (see Fig. 10) is opened at front contact 462, thus providing that this relay is dropped away to close a circuit for the green straight-in indicator lamps XAB—G and YAB—G as illustrated in Fig. 14. Assuming that the first airplane which was considered as making a pattern approach has been landed, and the token associated with that airplane has been moved to the ground position, or removed entirely from the left-hand vertical row of token jacks, the relay AXYL is picked up at the time the circuit is closed for these green indicator lamps, and thus the circuit for these lamps extends from (+), including back contact 231 of relay 3SW—TER, back contact 495 of relay BXYL, back contact 233 of relay ISW—TER, front contact 362 of relay AXYL, front contact 235 of relay BTS, front contact 496 of relay CXYL, contact 237 of switch SAL in its right-hand position, back contact 238 of relay XSA—BP, back contact 239 of relay YSA—BP, and lamps XAB—G and YAB—G, to (—). It will be noted that the dropping away of the relay XSA—BP is also effective to extinguish the yellow lamp XAB—Y by the opening of its circuit at front contact 497.

Thus upon observing the illumination of the green straight-in lamps XAB—G and YAB—G, it is indicated to the respective controllers that one or the other of them can initiate another straight-in approach by first calling an airplane and then actuating his straight-in button when that airplane reports over the outer beacon RB4. Inasmuch as it has been assumed that the first straight-in approach has been governed by the controller of board X, it can be assumed that the controller of board Y assumes supervision of the next straight-in approach, and that he calls the third airplane for an approach (according to the sequence chart of Figs. 23A and 23B).

When this airplane reports as being over the outer beacon RB4, the controller of board Y actuates his straight-in push button YBS—PB, and in accordance with the actuation of this button, the straight-in relay YSA—B (see Fig. 10) is picked up and is maintained energized only during the time interval during which that straight-in button is maintained in its actuated position. The pick up circuit by which the relay YSA—B is energized extends from (+), including front contact 510 of relay ATS, front contact 511 of relay BTS, front contact 512 of relay CTS, wire 453, contact 454 of switch SAL in its right-hand position, contact 455 of straight-in button YBS—PB in its actuated position, contact 513 of straight-in button XBS—PB in its normal position, back contact 514 of relay XSA—BP, back contact 515 of relay YSA—BP, back contact 516 of relay XSA—B, and winding of relay YSA—B, to (—). The closure of front contact 517 of relay YSA—B upon the picking up of that relay shunts back contact 515 of relay YSA—BP out of the circuit just described. In response to the picking up of relay YSA—B, the relay YSA—BP is picked up upon the closure of front contact 518, and is maintained energized by a stick circuit including its front contact 519 and the front contact 462 of relay VP so as to cause that relay to be maintained steadily picked up until the initiation of the next step of the stepper.

There is no resequencing operation initiated by the straight-in designation under the conditions that have just been described, as the resequencing is automatically rendered effective only for the first straight-in approach following a computed pattern approach. This mode of operation is provided by the relay SAPP (see Fig. 10) which is picked up by the first straight-in approach and is maintained picked up for successive straight-in approaches. This relay SAPP (see Fig. 17) when picked up opens back contact 470 and thus prevents the picking up of the relay ICR in response to successive straight-in designations, and the resequencing operations which are dependent upon the picking up of relay ICR as has been described. It will be noted with reference to Fig. 7, that the relay SAPP, in being held up throughout successive straight-in approaches, maintains the circuits open at back contact 279 for the relays AG, BG, and CG and thus provides that no computer units can be initiated in response to the operation of the stepper.

With reference to Fig. 14, the picking up of relay YSA—BP extinguishes the green lamps XAB—G and YAB—G by opening back contact 239, and closes an obvious circuit at front contact 520 for the energization of the yellow lamp YAB—Y which is energized as a reminder to the controller of board Y that he has a straight-in approach under his supervision.

In accordance with the designation of this straight-in approach the stepper relay 2VB (see Fig. 6) for the second step is energized, and the energization of this relay in turn causes the picking up of the relay VP and thus the initiation of the separation timer in a manner that has been specifically described when considering the mode of operation of the stepper.

It will be noted that the relay SAP (see Fig. 10) is picked up in response to the straight-in designation, but is maintained picked up only during the time when the straight-in button is held in its actuated position, the principal function of this relay being to initiate warning and special separation timers in a manner to be hereinafter considered. Thus upon restoration of the push button YBS—PB, the relays YSA—B and SAP are dropped away successively.

After having designated the straight-in approach by the actuation of the button YBS—PB on the board Y, the controller of this board then inserts a token for the airplane making the straight-in approach under his supervision into the next available vertical row of token jacks on his panel C¹ as defined by the energization of the red indicator lamps which are provided for indicating which of these respective vertical rows of token jacks is in use.

The controller inserts the token in the jack corresponding to the flight altitude of the airplane making the straight-in approach, preferably using the means provided as illustrated in my co-pending application Ser. No. 34,961, filed June 24, 1948, for obtaining a clearance for the approach at the desired altitude. It has been illustrated in the sequence chart of Figs. 23A and 23B that the airplane is approaching at the 2000 foot altitude, and thus the token is inserted in the jack CY3TJ, it being assumed that the left-hand and center vertical rows of token jacks are indicated as being in use by the illumination of red lamps as has been described. According to the usual procedure, the airplane will be laddered down as the lower flight altitudes become vacated during the progress of its approach, moving the token down in correspondence with the descent of the airplane in its particular vertical row of token jacks. When the airplane reports leaving the lowest flight altitude, the token is moved to the jack CYGTJ for the ground position, and in accordance therewith the lock relays CYL and CXYL are restored to their normal positions according to a mode of operation which has been specifically considered with respect to making a pattern approach.

Thus it has been specifically considered as to the mode of operation involved wherein a second straight-in approach is made, following a first straight-in approach, and it should be readily apparent that subsequent successive straight-in approaches can be made as required, one approach for each step of the stepper, as the stepper progresses step-by-step according to a mode of operation during each step similar to that which has just been described as being associated with a straight-in approach made during the second step of the stepper.

*Computed pattern approach following a straight-in approach*

The separation time between the initiation of a straight-in approach and the subsequent initiation of a computed pattern approach is determined by the straight-in separation timer SA—TER (see Figs. 4 and 11). This timer is initiated by the designation of the straight-in approach upon the actuation of a straight-in button, and upon completion of the timer operation, the resequencing lamps XZ—G and YZ—G (see Figs. 1 and 14) which are disposed above the vertical rows of resequencing buttons on the center panel C¹ of the boards X and Y respectively are illuminated. The energization of this lamp is an indication to the controllers that the separation time has elapsed according to the setting of the timer SA—TER, and that the resequencing buttons should be actuated for resequencing the stepper and starting the computer prior to the initiation of a computed pattern approach.

Prior to the actuation of the resequencing buttons, the controllers must agree upon which one is to be the first to use a computer unit for a pattern approach, and the controller that is to use the first computer unit to be initiated under these conditions then proceeds to insert a token for the flight that is to be under his control. The token is inserted under these conditions in the next available vertical row of token jacks from the left on the panel C¹ as indicated by the first row from the left that has its red availability lamp deenergized. It will be assumed that at this time there are tokens inserted for the respective 1000 foot and 1500 foot altitudes in the left-hand and center vertical rows of token jacks respectively, thus leaving the right-hand vertical row available for the 2000 foot flight altitude. This is the condition that is assumed in the sequence chart of Fig. 24 wherein it is indicated that the pattern approach is to follow a straight-in approach that has been previously designated corresponding to the second airplane approach under the conditions illustrated in the chart of Figs. 23A and 23B.

It will be assumed that the controller of board X, upon observing the illumination of the resequencing lamp XZ—G on his board, inserts a token in the token jack CX3TJ on the panel C¹ of board X (see Fig. 1). The next step in the general mode of operation is for both controllers to simultaneously actuate their resequencing buttons for the flight altitude that has been designated by the insertion of the token as a means for causing the resequencing of the stepper and insuring that the respective units of the computer are restored to their initial positions so that full timing operations of the respective computer units as they are used for computing pattern approaches is assured. It will be readily apparent that other means can be used for governing the resequencing operation, but it is believed desirable that both controllers be required to actuate their resequencing buttons under this condition in order to be assured that both controllers are aware of the fact that the organization has been again conditioned for pattern approaches.

To consider the above described general mode of operation more specifically, with reference to the sequence chart of Figs. 23A and 23B, it is indicated that the separation timer SA—TER has been initiated in response to the dropping away of the relay XSA—B upon restoration of the spring biased straight-in push button XBS—PB in designating the initiation of a straight-in approach for an airplane having reported over the outer beacon RB4 (see Figs. 20 and 21). The circuit by which the timer SA—TER is initiated under these conditions is illustrated in Fig. 11 wherein the magnet for initiating the drive of the timer becomes energized in response to the closure of back contact 521 of relay XSA—B. This timer SA—TER can be of the structure illustrated for the center of the three timer units of Fig. 3, only one such timer being provided according to this embodiment of the present invention because its timing intervals are short, and thus the time measured by this timer has expired with respect to one straight-in approach before a second straight-in approach can be initiated to again require initiation of the timer SA—TER.

With reference to Fig. 11, the timer control relays 1S—TS, 2S—TS, and 3S—TS are provided for governing the operation of the warning timers 1SW—TER, 2SW—TER, and 3SW—TER in a manner to be more specifically considered hereinafter when considering the provision of warning indications. These relays 1S—TS, 2S—TS, and 3S—TS are also used in initiation of the straight-in separation timer SA—TER, such timer being initiated by one or the other of these relays in response to the designation of the initiation of each straght-in approach. Thus the timer motor M of the timer SA—TER is energized in response to the designation of each straight-in approach by the closure of one or the other of the front contacts 522, 523, and 524 of the relays 1S—TS, 2S—TS, and 3S—TS respectively. The actual initiation of the operation of the timer SA—TER is rendered effective in response to the dropping away of whichever straight-in control relay XSA—A, YSA—A, XSA—B, or YSA—B has been picked up in response to the designation of a straight-in approach.

For the specific condition under consideration, the relay SAP (see Figs. 10 and 11) is picked up in response to the straight-in designation as has been described, and a circuit is closed upon the picking up of that relay for the energization of the timer control relay 2S—TS. This circuit extends from (+), including front contact 525 of relay SAP, back contact 526 of relay AXYL, front contact 527 of relay BXYL, back contact 528 of relay 2SW—TERP, and winding of relay 2S—TS, to (—). The picking up of this relay, by the closure of front contact 529 establishes a stick circuit to maintain this relay picked up until the associated warning timer 2SW—TER has completed its operation. The closure of front contact 523 applies energy to the motor M of the separation timer SA—TER, and the restoration of the button used for designation of the straight-in approach permits the back contacts 530, 531, 521, and 532 of the straight-in relays XSA—A, YSA—A, XSA—B and YSA—B to be closed so as to energize the magnet of the timer SA—TER and thus render initiation of that timer effective. The circuit for energization of the timer magnet under these conditions extends from (+), including front contact 510 of relay ATS, front contact 511 of relay BTS, front contact 512 of relay CTS, front contact 533 of relay 2S—TS, back contacts 530, 531, 521, 532 of relays XSA—A, YSA—A, XSA—B, and YSA—B respectively, and winding of the magnet of timer SA—TER, to (—).

The completion of operation of the straight-in timer SA—TER closes the front contact 534 of that timer so as to pick up the associated repeater relay SA—TERP, and the picking up of that relay, by the closure of its front contact 535, provides that the timer SA—TER is maintained in its operated position, irrespective of the restoration of the timer control relay 2S—TS at a subsequent time when the warning timer 2SW—TER completes its operation. Therefore the timer SA—TER effectively has stick circuit means by which it is maintained in its actuated position until such time as when either a subsequent straight-in approach, or a subsequent computed pattern approach, is designated as being initiated.

In response to the picking up of relay SA—TERP the indicator lamps XZ—G and YZ—G above the resequencing buttons on the boards X and Y respectively (see Figs. 1 and 14) are energized. With reference to Fig. 14, these lamps become energized in accordance with the closure of front contact 536 of the relay SA—TERP.

Upon insertion of a token in the token jack CX3TJ of the board X, the relay CXL (see Fig. 15) is picked up by a mode of operation which has been heretofore considered, and the picking up of this relay effects the dropping away of relay CXYL (see Fig. 16), the relay CC3Z being dropped away upon the opening of its circuit at contact 537 upon insertion of the token in the token jack CX3TJ. In accordance with the insertion of the token into the token jack CX3TJ, the red availability lamps CX—R and CY—R (see Fig. 15) are energized by the closure of front contact 538 to indicate that the right-hand vertical row of token jacks is in use.

The next step in the operation is the actuation of the resequencing buttons for the altitude for which the token has been inserted, and thus the buttons 3XPBZ AND 3YPBZ (see Fig. 1) on the boards X and Y respectively, are simultaneously actuated and their actuation causes the picking up of the relay 3CR (see Fig. 17) to initiate the resequencing operation. The circuit by which the relay 3CR is energized under these conditions extends through back contact 539 of relay 3XCL, contacts 540 and 541 of buttons of 3XPBZ and 3YPBZ in their actuated positions, and winding of relay 3CR, to (—).

In accordance with the picking up of relay 3CR, stick circuits are opened for the respective stepper relays (see Fig. 6) at back contacts 326, 315, and 262 and thus all stepper relays that are picked up at this time are restored. Under the assumed conditions the relays ATS, CTS, and BTS are all picked up because of no pattern approaches being computed, and thus the auxiliary stick circuits for the stepper relays VA are held open at back contacts 540, 542, 541 of relays ATS, BTS, and CTS respectively.

Under the conditions that have been assumed, the first step relay 1VA is in its energized position at the time when the resequencing buttons are actuated, and thus the picking up of relay 3CR causes the droping away of relay 1VA, and the dropping away of relay 1VA, by opening the stick circuit for relay 1VB at front contact 309, causes the dropping away of that relay. Inasmuch as the relay 1VB is the only relay VB that has been assumed to be picked up at this time, the dropping away of that relay, by the opening of its front contact 320, effects the dropping away of the relay VBP. If the resequencing buttons are actuated prior to the completion of operation of the separation timer TE, it is the stepper relays 3VA and 3VB that are restored in a similar manner.

Upon the dropping away of relay VBP, with the relay 3CR energized and a token in jack CX3TJ, the relay 3VA is picked up to correspond with the vertical row of jacks in which the token has been inserted, and thus to subsequently effect the initiation of the computer unit C which is associated with that step and with that vertical row of token jacks. The pick up circuit for relay 3VA under these conditions extends from (+), including back contact 481 of relay VBP, front contact 543 of relay 3CR, front contact 544 of relay AC3Z, front contact 545 of relay BC3Z, back contact 546 of relay CC3Z, and winding of relay 3VA, to (—). A stick circuit is established for relay 3VA as has been described when considering the mode of operation of the stepper when relay 3CR is dropped away upon restoration of the resequencing buttons.

Upon the picking up of relay 3VA, the relay VP is deenergized, and the dropping away of that relay restores the separation timer TE. With reference to Fig. 7 the picking up of relay 3VA closes a pick up circuit for the relay CG at front contact 418, such circuit including back contact 279 of the straight approach repeater relay SAPP which has been deenergized in response to the picking up of the relay 3CR to open its stick circuit at back contact 488 (see Fig. 10).

The picking up of relay CG initiates the operation of the computer unit C in a manner which has been described when considering pattern approaches and permits the stepper to resume its normal mode of operation wherein the relay 3VB is picked up in response to the picking up of the relay CG. Because of the token already having been inserted in the token jack CX3TJ, the green lamp CXC—G becomes energized with flashing energy (see Fig. 9) upon the closure of front contact 547 of relay CG, the flashing energy being applied by front contact 548 of relay CXL. Thus it is indicated to the controller of board X that he can call an airplane for initiating a pattern approach, and subsequently follow the general procedure heretofore described in governing the pattern approach of the airplane.

The picking up of the relay CG is effective to open the stick circuit for the relay CTS (see Fig. 12) at back contact 223, and the dropping away of this relay (see Fig. 11) causes the restoration of the timer SA—TER (see Fig. 11) and its repeater relay SA—TER by the opening of front contact 512. With reference to Fig. 14, the dropping away of relay SA—TERP extinguishes the resequencing indicator lamps XZ—G and YZ—G by opening their circuits at front contact 536.

With reference to Fig. 14, the dropping away of the relay CTS is also effective to extinguish the straight-in lamps that have been energized by the opening of front contact 236, the extinguishing of these lamps being in order in accordance with the initiation of the computer unit C. Thus to make a subsequent straight-in approach, the energization of the green lamps associated therewith can be effected only subsequent to another timer operation such as has been heretofore described when considering the mode of operation for the initiation of a straight-in approach following a computed pattern approach.

It is believed that it should be readily apparent from the description as it has been set forth that the condition of the organization has been restored by the mode of operation herein described to a condition for successive computed pattern approaches. It is therefore provided that the picking up of relay 3VB in response to the relay CG energizes the relay VP, which in turn initiates the separation timer TE so as to determine when the next computer unit (computer unit A) can be initiated.

*Warning indication*

It is desirable, particularly where take-offs are made from the same runway that is used for landing operations, that the controllers be warned as to when each airplane making a landing approach is within a predetermined time of the end of the runway, thus determining that the runway must be cleared within such predetermined time subsequent to such a warning indication. It is therefore provided that a warning lamp WK (see Fig. 1), which is illustrated as being located on the panel of the computer, is energized whenever an airplane is within a predetermined distance of the end of the runway in making a landing approach, irrespective of whether it is a straight-in approach or a pattern approach that is being made.

For governing the warning indicator lamp WK for straight-in approaches, a timer is initiated upon actuation of the straight-in button when the airplane reports over the outer beacons RB4 (see Fig. 20), the timers involved in this operation (see Fig. 4) being the timers 1SW—TER, 2SW—TER, and 3SW—TER which have their settings determined by the pointer 181 which is common to these three timers in adjusting their settings.

The time settings for these warning timers must necessarily take into consideration the speed of the airplanes, effective windage, distance from the outer beacon to the end of the runway, and the desired warning time. Thus the time setting in minutes for the timers can be determined by the formula:

$$T = \frac{60d}{S \pm W} - t$$

in which:

T=time setting in minutes for timer units 1SW—TER, 2SW—TER, and 3SW—TER.
d=distance in miles from the start of a straight-in approach (RB4) to the end of the runway.
S=speed of airplane in miles per hour.
W=effective wind in miles per hour.
t=desired warning time in minutes from the end of the runway.

The effective windage is indicated in this formula as being added or subtracted in accordance with whether it is positive or negative in effect. Although it would appear that the windage would be negative in effect for landing operations (head wind), it has been found that at times the wind direction near the ground may be negative while at a higher altitude there is a positive effective wind and thus an airplane approaching the runway could have a positive windage (tail wind) until such time as it had started its descent to the runway subsequent to the provision of the warning indication.

It will be readily apparent that the time settings T can be tabulated for convenient reference of a controller in setting the times without requiring computation each time that one of the variables of the formula changes. Thus a table of time settings can be made up for different values of windage and different desired warning times as ordinates, assuming the airplane speed to be the same for all airplanes.

With reference to the sequence chart of Figs. 23A and 23B, it will be noted that a straight-in warning timer SW—TER is initiated upon designation of each straight-in approach by actuation of the straight-in button, one warning timer SW—TER being provided for each step of the stepper for governing the energization of the warning indicator lamp WK.

More specifically, with reference to Fig. 23A, the picking up of relay SAP in response to actuation of the straight-in button XBS—PB in a manner which has been described is effective to cause the picking up of the timer control relay 2S—TS, which in turn is effective to initiate the warning timer 2SW—TER.

Figure 18:
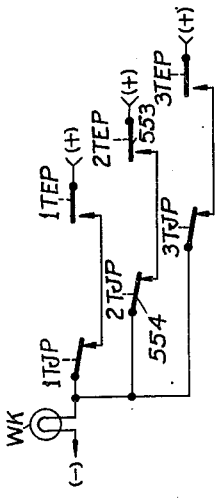
Fig. 18 illustrates the manner in which a warning indicator lamp can be controlled in response to the expiration of time measured by the warning timers.

With reference to Fig. 11, the timer control relay 2S—TS is picked up under these conditions by the energization of a circuit which has been described, and in accordance with the closure of its front contacts 549 and 550, the separation timer 2SW—TER is initiated. Upon completion of the operation of the separation timer 2SW—TER, the repeater relay 2SW—TERP is picked up upon the closure of front contact 551, and the picking up of that relay causes the energization of the warning indicator lamp WK by the opening of the stick circuit for relay 2TEP (see Fig. 13) at back contact 552. With reference to Fig. 18, the deenergization of relay 2TEP energizes the warning lamp WK through back contacts 553 and 554 of relays 2TEP and 2TJP respectively.

With reference to Fig. 11, upon the picking up of the timer repeater relay 2SW—TERP under the above described conditions, the stick circuit for the timer control relay 2S—TS is opened at back contact 528, thus effecting the restoration of this relay to its normally deenergized position, and the deenergization of the timer 2SW—TER by the opening of its circuits at front contact 549 and 550.

With reference to the sequence chart of Figs. 23A and 23B, the lamp WK is maintained energized until such time as the airplane pilot reports leaving the lowest flight altitude (1000 foot altitude). Upon reception of such report, the approach controller moves the token for the airplane to the ground token jack BXGTJ (see Fig. 1) and in accordance therewith the relay 2TJP is picked up to extinguish the warning lamp WK. The pick up circuit for the relay 2TJP under these conditions extends from (+), including contact 555 of the token jack BXGTJ, winding of relay 2TJP, and back contact 556 of relay 2TEP, to (−). The closure of front contact 557 of relay 2TJP establishes a stick circuit to maintain this relay picked up until the relay 2TEP is restored to its normal energized position. The relay XYGCL (see Fig. 13) is deenergized by the insertion of a token in the token jack BXGTJ by the opening of normally closed contact 558 for a ground position. With the relay 2TJP picked up, the relay 2TEP is conditioned so that it can be restored upon the removal of the token from the token jack after the airplane has landed. Such restoration is accomplished by the picking up of relay XYGCL upon removal of the token, and the closure of a pick up circuit including front contacts 559 and 560 of relays XYGCL and 2TJP respectively. The relay 2TEP when picked up is maintained picked up by its stick circuit extending through back contacts 552 and 561 of the warning timer repeater relays 2SW—TERP and BCW—TERP which checks that these timer repeater relays are properly restored fter their actuation. The relay 2TEP in picking up deenergizes the relay 2TJP by the opening of its circuit at back contact 556.

In a similar manner, the energization of the warning indicator lamp WK is rendered effective for each straight-in approach, the relays involved in its energization being those relays of the general character described above that are provided in association with the respective vertical rows of token jacks on the panels C¹.

With reference to Fig. 11 it will be noted that the circuit organization for the energization of the respective timer control relays 1S—TS, 2S—TS, and 3S—TS is such as to automatically select the energization of the timer control relay TS that is associated with the next consecutive vertical row of token jacks on the panel C¹ that is available for use for a straight-in approach. This selection is accomplished by so selecting the circuits by the normally energized lock relays AXYL, BXYL, and CXYL, that even though the timers are initiated upon designation of the respective straight-in approaches prior to the insertion of the tokens for the airplanes that are making such approaches, the timers are selected to correspond with the next available vertical row of token jacks.

It will be noted by this circuit organization that in case none of the vertical rows of token jacks are in use, only the relay 1S—TS can be picked up in response to the designation of a straight-in approach as this relay is the only one of the timer control relays TS that can be picked up when all three relays AXYL, BXYL, and CXYL are simultaneously energized. The pick up circuit of relay 1S—TS under such conditions includes front contacts 562, 563, and 564 of relays AXYL, BXYL, and CXYL respectively. It is also provided that if the third vertical row of token jacks is in use at the time when a straight-in approach is designated, and the first row is available the relay 1S—TS is picked up by the pick up circuit including front contact 562 of relay AXYL and back contact 565 of relay CXYL. The relay 3S—TS is picked up when a straight-in approach is designated, only provided that the second row of token jacks is in use and the third row is available, and thus the relay BXYL is in its deenergized position to close back contact 566 in the pick up circuit for this relay at this time.

A much similar mode of operation is involved in governing the warning indicator lamp WK in accordance with computed pattern approaches in that a warning timer is initiated upon the initiation of each computer unit, and its time setting is so adjusted as to cause the warning lamp WK to be illuminated when the airplane having its pattern computed by that computed unit is within a predetermined number of minutes from the end of the runway.

Because of the nature of the computer, as is specifically pointed out in the above mentioned prior Field et al. application, the computer unit is set for a particular flight time to elapse between the time of the initiation of any computer unit and the time when an airplane completes its holding loop as computed by that computer unit and thus passes over the outer beacon of the inner stack in approach of the runway.

Thus it can be said that the initiation of each computer unit is rendered effective a predetermined flight time, irrespective of windage, from the outer beacon of the inner stack under these conditions, and the energization of the warning lamp WK can be rendered effective by the timer at a time either plus or minus a computed time interval with respective to arrival of the airplane at this outer beacon in its approach to the runway.

It is therefore provided that the time setting for the warning timers ACW—TER, BCW—TER, and CCW—TER as adjusted by the pointer 164 (see Fig. 4) can be computed by the formula:

$$T = t_1 + \frac{60d}{S \pm W} - t_2$$

in which:

T=time setting in minutes for timers ACW—TER, BCW—TER, and CCW—TER.
d=distance in miles from the outer beacon of the inner stack (beacon RB5) to the end of the runway.
S=speed of airplane in miles per hour.
W=effective windage in miles per hour.
$t_1$=time in minutes of computer pattern approach from the time of initiation of a computer unit A, B, or C until an airplane flying the computed pattern completes its holding loop and reaches the outer beacon of the inner stack (beacon RB5) in its approach of the runway.
$t_2$=the desired warning time in minutes from the end of the runway.

With reference to the sequence charts of Figs. 22A and 22B, it will be noted that at the beginning of each step of the stepper that is used for computed pattern approaches, a normally energized timer control relay TS for the computer unit associated with that step is deenergized, and the deenergization of this relay is effective to initiate the warning timer CW—TER which is associated with that computer unit. Thus it will be noted that the picking up of relay 2VA at the beginning of the second step, for example, causes the picking up of relay BG in a manner which has been described, and the picking up of relay BG causes the deenergization of the timer control relay BTS, the dropping away of which in turn initiates the warning timer BCW—TER.

More specifically, with reference to Fig. 12, the picking up of relay BG deenergizes the relay BTS by opening its stick circuit at back contact 220. Upon deenergization of the relay BTS, the magnets of the timers BC—TER and BCW—TER are energized directly through back contact 567 so as to engage the drive of these timers. The operation of the drive motors of these timers is initiated by the dropping away of relay BTS by the closure of a circuit extending from (BX), including back contact 443 of relay AML, back contact 444 of relay BML, back contact 445 of relay CML, front contact 572 of relay BGP, back contact 573 of relay BTS, and motors of timers BC—TER and BCW—TER connected in multiple, to (CX).

The warning timer BCW—TER continues its operation for a time interval in accordance with its setting which in most cases is comparable to the time of the computed pattern flight of the airplane. When the time of operation has expired, the repeater relay BCW—TERP is picked up in response to the closure of front contact 568 of the warning timer BCW—TER, and the picking up of that relay deenergizes the warning indication control stick relay 2TEP for the associated step (see Fig. 13) by the opening of its circuit at back contact 561. The dropping away of relay 2TEP is effective as has been described when considering the dropping away of this relay for a straight-in warning to energize the warning lamp WK (see Fig. 18).

If it is assumed that the setting of the associated pattern separation timer BC—TER is less than the setting of the warning timer BCW—TER, the timer BC—TER will have completed its operation prior to the completion of operation of the warning timer BCW—TER, and thus will have picked up its associated repeater relay BC—TERP (see Fig. 12) by the closure of front contact 569. If this condition is assumed, the picking up of the warning timing relay BCW—TERP is effective to restore the timer control relay BTS to its normally energized position by the energization of a pick up circuit including front contacts 570 and 571 of relays BC—TERP and BCW—TERP respectively and back contacts 219 and 220 of relays BYF and BG. The relay BTS when picked up under these conditions is maintained picked up by its stick circuit which has been described. It will be noted that the time of operation of the timers is such that the relay BG has been restored according to the normal mode of operation in the progress of a pattern appoarch and the repeater relay BGP has been dropped away. The deenergization of the relay BGP occurs at the time when an airplane reports leaving the holding stack to fly the holding pattern, and the shifting of contact 572 of this relay applies alternating current to the timer motors, irrespective of the back contacts 443, 444, and 445 of the minimum loop relays AML, BML, and CML respectively.

The picking up of relay BTS opens the circuits for the motors of the timers BC—TER and BCW—TER at back contact 573, and also deenergizes the magnets for engaging the drives of such timers at back contact 567. Thus by the deenergization of the magnets of timers BCW—TER and BC—TER, the relays BCW—TERP and BC—TERP are restored to their normally deenergized positions by the opening of their circuits at front contacts 568 and 569 respectively.

The warning lamp WK is maintained energized until such time as the pilot of the airplane having its pattern computed by the computer unit B reports leaving the lowest flight altitude in making the landing approach to the runway. The controller of board Y who is assumed to be supervising the flight according to the sequence chart of Figs. 22A and 22B moves the token for the airplane to the token jack BYGTJ and by this operation causes the picking up of relay 2TJP which in picking up is effective to deenergize the warning lamp WK. With reference to Fig. 13, the insertion of the token in the jack BYGTJ, by the closure of contact 555 causes the picking up of relay 2TJP, and the picking up of that relay in turn deenergizes the warning lamp WK (see Fig. 18) by opening its circuit at back contact 554.

Because of the insertion of the token in the jack for the ground position, the relay XYGCL is deenergized so that the relay 2TEP is not picked up in response to the picking up of relay 2TJP, but is rather picked up by the removal of the token from the token jack for the ground position after the landing has actually been made. Under these conditions, the relay 2TEP is picked up by circuit including the front contacts 559 and 560 of relays XYGCL and 2TJP respectively. The relay 2TJP is maintained picked up until the energization of the relay 2TEP has become effective by its stick circuit closed at front contact 557, but the relay 2TJP is dropped away by the opening of back contact 556 of relay 2TEP to complete the restoration of normal conditions of these indication control relays.

Separation timer settings

Inasmuch as the separation timer TE is used only in separating approaches of like character, its setting can be made strictly on a true separation time basis, irrespective of windage and other conditions which have to be considered when governing separation settings for airplanes making approaches from different directions. For pattern approaches, for example, the adjustment of the separation timer TE to a particular desired separation time setting provides that each computer unit is initiated that predetermined time interval subsequent to the preceding computer unit, and thus because of the organization of the system as has been described the computer determines patterns for respective airplanes so that they arrive at the beacon RB5 (see Figs. 20 and 21) in their approach of the runway separated by time according to the setting of the separation timer TE, provided that the airplanes have followed precisely the patterns that have been computed, and provided that airplanes initiate respective approaches as the computer and stepping organization determines that successive approaches can be initiated.

Similarly for successive straight-in approaches, the setting of the separation timer TE can be made directly as to the desired separation time in minutes, and irrespective of the effects of windage, the separation between successive straight-in approaches will be directly in accordance with the setting except for what additional delay there may be in successive airplanes reaching the point of initiation of the separation timer at the time when the energization of the green straight-in indicator lamps is rendered effective to define when another straight-in approach can be initiated from the outer beacon RB4.

The setting of the separation timers that govern the time of initiation of a straight-in approach subsequent to a prior pattern approach, and vice versa, have to be made with other considerations, however, in that windage has to be taken into consideration and time of flight to the point where the particular predetermined separation time is to be effective. This point may be somewhat arbitrary, but for this embodiment of the present invention it is assumed that the airplanes are separated by the predetermined time intervals at the time when they pass over the beacon RB5, which is the outer beacon for the inner stack $c$ (see Figs. 20 and 21), in approach of the runway, this point being considered according to this embodiment of the present invention as being the point of intersection with the glide path 100 at the lowest flight altitude (1000 foot).

If it is assumed that a straight-in approach should have a particular separation time subsequent to a pattern approach, it can be said that the airplane making the straight-in approach should be that separation time from the outer beacon RB5 of the inner stack $c$ at the time when the airplane making the pattern approach is over this beacon in approach of the runway.

Considering the setting for the computer separation timers AC—TER, BC—TER, and CC—TER which is adjusted by the pointer 182 (see Fig. 4), these timers are initiated by the respective computer units A, B, and C when such computer units are initiated and thus they are in operation during a predetermined flight time as measured from the initiation of the associated computer unit until the airplane having its pattern determined by that computer unit arrives at the outer beacon RB5 of the inner stack $c$ in approach of the runway after having completed its holding loop pattern. It is therefore provided that the setting of the timers must take into consideration this predetermined time interval. Assuming that the airplane making a straight-in approach must arrive at the beacon RB5 at a predetermined time subsequent to the arrival of the airplane making the pattern approach, if the total flight time from the beacon RB4 to the beacon RB5 has subtracted therefrom the desired separation time, and the remainder is in turn subtracted from the above mentioned predetermined time of flight from initiation of each computer unit until the time of arrival at the beacon RB5, the setting in minutes for the separation timers AC—TER, BC—TER, and CC—TER is thus determined. Therefore the setting of the pointer 182 can be determined as follows:

$$T = t_1 - \left( \frac{60d}{S \pm W} - t_2 \right)$$

in which:

$T$ = time setting in minutes for timers AC—TER, BC—TER, and CC—TER.
$d$ = distance in miles from the outer beacon of the outer stack (beacon RB4) to the outer beacon of the inner stack (beacon RB5).
$S$ = speed of airplane in miles per hour.
$W$ = effective windage in miles per hour.
$t_1$ = time in minutes of computer pattern approach from the time of initiation of a computer unit A, B, or C until an airplane flying the computed pattern completes its holding loop and reaches the outer beacon of the inner stack (beacon RB5) in its approach of the runway.

$t_2$=the desired separation time in minutes between respective pattern and straight-in approaches.

If the separation timers AC—TER, BC—TER, and CC—TER are set in this manner, desired separation time is obtained between respective pattern and straight-in approaches so that an indication is provided as to when the straight-in approach can be initiated in order that the airplane making the straight-in approach may follow the airplane making the pattern approach upon passing over the outer beacon of the inner stack in approach of the runway by the desired separation time.

To consider the other condition of separation timing where a pattern approach is to follow a straight-in approach, the separation timing is determined by the timer SA—TER which has its setting determined by the pointer 185 (see Fig. 4). This timing has been described as being initiated upon the actuation of a straight-in button when a straight-in approach is initiated from the outer beacon of the outer stack (beacon RB4), and thus the problem here is to determine when subsequent to that time of initiation of the straight-in approach a pattern approach can be initiated simultaneously with the initiation of a computer unit. Thus the consideration here is that the straight-in airplane must arrive at the outer beacon of the inner stack (beacon RB5) a predetermined separation time prior to the arrival of a subsequent airplane making a pattern approach. Therefore the time setting of the timer SA—TER can be determined by obtaining the difference between the flight times of the respective airplanes from the initiation of their respective maneuvers until they arrive at the outer beacon of the inner stack (RB5) and adding or subtracting as the case may be the desired separation time. The separation time is added if the time of flight of the straight-in approach is greater, and is subtracted if the time of flight of the pattern approach is greater. Assuming that the time of flight of the pattern approach is greater, the time setting can be determined as follows:

$$T = t_2 - \left( t_1 - \frac{60d}{S \pm W} \right)$$

in which:

T=time setting in minutes for timer SA—TER.
$d$=distance in miles from the outer beacon of the outer stack (beacon RB5) to the outer beacon of the inner stack (beacon RB4).
S=speed of airplane in miles per hour.
W=effective windage in miles per hour.
$t_1$=the time in minutes of computed pattern approach from the time of initiation of a computer unit A, B, or C until an airplane flying the computer pattern completes its holding loop and reaches the outer beacon of the inner stack (RB5) in its approach of the runway.
$t_2$=the desired separation time in minutes between respective straight-in and computed pattern approaches.

*Abnormal conditions requiring resequencing*

If it is believed that some error has occurred in an airplane flying its computed pattern, such as the pilot believing that he has become confused and has followed the wrong course in the holding loop, the desired procedure may be either to permit the airplane to start his approach over again, or to require the airplane to leave the inner stack so as not to cause additional delay in the subsequent approaches that may have been initiated at that time. If the airplane is cleared out of the inner stack, operations have to be performed to provide for the proper restoration of the apparatus that has been partially used in computing the approach of that airplane, and if the airplane is to return to the inner stack, the computer unit that has been used for that approach must be reinitiated to start the computation of a new approach. Under these conditions where the airplane returns to the inner stack, because of the loss of time in restarting the approach, all subsequently initiated computer units must be restored so that these units will be reinitiated at subsequent intervals determined by the separation timer TE to provide the required delay in the approaches of airplanes that are to follow the airplane for which the resequencing operation is being performed.

If resequencing is in accordance with an airplane leaving the inner stack, and no other approaches are affected thereby, the mode of operation is for the controller governing the flight of that airplane to actuate the resequencing button after removing the token for the flight altitude involved on his board, and thus effect proper restoration of the control apparatus involving computing the flight of that airplane. If, on the other hand, the airplane under these conditions is to return to the inner stack so as to affect subsequently initiated approaches, inasmuch as some of these subsequently initiated approaches may be governed by the controller of the other board, it is required that both controllers actuate their resequencing buttons simultaneously in a manner similar to that which has been described when considering resequencing and shifting from straight-in approaches to pattern approaches.

To consider more specifically the mode of operation under these conditions, it will first be assumed that an airplane fails to complete its initiated pattern and is cleared out of the inner stack so as to require the actuation of a resequencing button for the altitude at which this airplane has been flying. It will be further assumed for consideration of this condition that traffic has been set up in a manner which has been described for successive pattern approaches and as is diagrammatically illustrated according to the sequence chart of Figs. 22A and 22B. It will also be assumed that the pilot of the second airplane has received instructions as to the heading he is to fly in initiating the holding loop and that for some reason subsequent to his start of flight of the holding loop, instructions are issued to clear that airplane out of the inner stack, and in accordance therewith the token for that airplane which has been assumed to be inserted in the jack BY2TJ is removed from this token jack.

The removal of the token from the token jack BY2TJ does not cause the immediate deenergization of the lock relay BYL, as such relay is maintained picked up by its stick circuit, but the removal of the token opens the pick up circuit for this relay so that it may be dropped away upon actuation of the resequencing button 2YPBZ. It will be noted that the resequencing buttons are provided for the respective lower three flight altitudes of the inner stack, and inasmuch as it is the second flight altitude, that is involved in cancellation under the above assumed conditions, the resequencing button 2YPBZ is actuated. In accordance with the actuation of this button, the relay BPC is picked up to define as to which of the computer units A, B, or C is required to be resequenced.

In accordance with the token for the airplane having been present previously in the jack BY2TJ, the relay BC2Z (see Fig. 16) is deenergized, and this relay cannot be picked up upon removal of the token from this token jack because its pick up circuit is open at this time at back contact of relay BYL. Thus it can be said that the relay BC2Z effectively stores an indication as to the particular flight altitude of the airplane leaving the inner stack together with the identity of the particular computer unit that was used in computing the approach of that airplane. This relay BC2Z conditions a circuit for the picking up of relay BPC to initiate the restoration of the computer unit B in response to the actuation of the resequencing button 2YPBZ. The circuit for the energization of the relay BPC extends from (+), including contact 574 of button 2YPBZ in its actuated position, front contact 575 of relay 2XCL, front contact 576 of relay 2YCL, back contact 577 of relay BC2Z, front contact 578 of relay BC1Z, and winding of relay BPC, to (—). The front contacts 575 and 576 of the relays 2XCL and 2YCL that are included in this circuit are front contacts of clearance relays for the respective boards for the second flight altitude of the inner stack. These relays are picked up only when there is not a token inserted for the corresponding flight altitude. Thus this circuit for the picking up of the relay BPC cannot be closed until the token for the airplane under consideration is removed from the board. Although the control circuits for the relays 2XCL and 2YCL have not been shown, it is to be understood that these relays can be controlled in a manner fully disclosed for corresponding relays in my above mentioned co-pending application.

Relay BPC in picking up, causes the picking up of relay BCZ (see Fig. 17) by the closure of front contact 579, and the picking up of relay BCZ in turn is effective to cause the restoration of the relay BG (see Fig. 7) in case this relay is not already restored at this time. The relay BG is dropped away by the opening of its circuit at back contact 400 of the relay BCZ, and the dropping away of that relay prior to the dropping away of relay BGP establishes a circuit through its back contact 476 and the front contact 580 of relay BGP for energization of the out-time magnet OMB of the computer unit B (see Fig. 5). The energization of this magnet shifts the computer unit B to its high speed drive and thus conditions this computer unit so that it can be restored upon the subsequent energization of the restoration magnet NMB.

With reference to Fig. 8, the dropping away of the relay BGP is effective by the closure of back contact 478 to establish a circuit by which the restoration magnet NMB (see Fig. 5) of the computed unit B is energized. This circuit is only momentarily energized as the relay BCZ is picked up to close front contact 477 in this restoration circuit only during the time of actuation of the resequencing button 2YPBZ. It is thus provided that the computer unit B is restored by first assuring that it is on a high speed drive and then energizing the restoration magnet NMB.

The picking up of relay BCZ is also effective to restore the lock relay BYL. With reference to Fig. 15, the relay BYL is dropped away upon the picking up of relay BCZ by the opening of its circuit at back contact 408. With reference to Fig. 16, the dropping away of relay BYL closes back contact 581 in the pick up circuit for the relay BC2Z, but this relay cannot be picked up until the resequencing button 2YPBZ is restored because its pick up circuit is held open at back contact 582 of relay BPC.

Upon restoration of the resequencing button 2YPBZ, the relay BPC is dropped away by the opening of its circuit at contact 574 of button 2YPBZ, and the dropping away of that relay is in turn effective to restore the relay BCZ to its normally deenergized condition by the opening of front contact 579 (see Fig. 17). Upon the closure of back contact 582 (see Fig. 16) of the relay BPC, a pick up circuit is closed for the relay BC2Z extending from (+), including normally closed contact 583 of token jack BX2TJ, normally closed contact 584 of token jack BY2TJ, winding of relay BC2Z, front contact 585 of relay BC3Z, front contact 586 of relay BC1Z, back contact 582 of relay BPC, and back contacts 587 and 581 of relays BXL and BYL respectively, to (—). The picking up of this relay establishes a stick circuit at front contact 588 to maintain this relay picked up until the insertion of a token in either the token jack BX2TJ or the token jack BY2TJ.

It will be noted that the circuit organization for the group of relays BC1Z, BC2Z, and BC3Z, for example, which are associated with the computer unit B for the respective first, second, and third flight altitudes, is such that in the process of laddering down an airplane wherein the token is moved from one jack to the next lower jack within the associated center vertical row of token jacks, one of these relays is always dropped to correspond with the last token jack in which the token has been inserted, the relay for the higher altitude being restored to its normally energized position in response to the dropping away of the relay for the lower altitude upon movement of the token to the lower token jack.

Thus, for example, as the airplane is subsequently laddered down from the 1500 foot altitude to the 1000 altitude, the movement of the token from the token jack BY2TJ to the token jack BY1TJ causes the dropping away of relay BC1Z by the opening of its circuit at contact 589 of the token jack BY1TJ. When the dropping away of relay BC1Z becomes effective, a pick up circuit is established for the relay BC2Z extending from (+), including normally closed contact 583 of token jack BX2TJ, normally closed contact 584 of token jack BY2TJ, winding of relay BC2Z, front contact 585 of relay BC3Z, and back contact 586 of relay BC1Z, to (—). In this manner, there is always a relay Z deenergized to correspond with the altitude and the computer unit that is designated by the insertion of a token in a token jack.

The deenergization of the restoration magnet NMB upon restoration of the resequencing button 2YPBZ permits the restoration of the computer unit B, and thus conditions this computer unit so that it can be reinitiated in turn during a subsequent cycle of operation of the stepper. Under the conditions that have been considered, there has been no necessity for resequencing the stepper as the primary object of the actuation of the resequencing button under the above assumed conditions is to restore the computer unit B and whatever timers have been initiated by that unit.

The warning and pattern separation timers BCW—TER and BC—TER respectively (see Fig. 12) which may have been in operation at the time when the button 2YPBZ was actuated are restored while this button is actuated because of the energization of a circuit for relay BTS (see Fig. 12) extending from (+), including front contact 590 of relay BCZ, front contact 591 of relay BXYL, back contact 219 of relay BYF, back contact 220 of relay BG, and winding of relay BTS, to (—). The front contact 591 of relay BXYL which is included in this circuit is closed when relay BXYL is picked up (see Fig. 16) in response to the dropping away of relay BYL to close its pick up circuit at back contact 581. The picking up of relay BTS establishes its stick circuit by which it is normally energized and opens the circuits for the motors and magnets respectively at back contacts 573 and 567 for the timers BCW—TER AND BC—TER.

With reference to Fig. 8, the dropping away of relay BYL during the actuation of the button 2YPBZ is effective to open the stick circuits at front contact 592 for the indication control relays BYF and BYS and thus cause the restoration of these relays if they are picked up at this time. The stick circuit for the energization of these relays is comparable to the stick circuit that has been specifically described for the relays AYF and AYS which are associated with the computer unit A. With reference to Fig. 9, it will be noted that the dropping away of relay BG, together with the dropping away of relays BYF, BYS, and BYL deenergizes whichever of the indicator lamps associated with the computer unit B that may be energized at the time when the button 2YPBZ is actuated, thus completing the restoration of the computer unit B and its association indication control relay and indicator lamps.

Having thus described means for restoration of a specific computer unit under a typical condition of operation, it is to be understood that by a similar mode of operation the other computer units may be restored, the relays CZ being effective to select which computer unit is to be restored in response to the particular resequencing button that is actuated.

Considering the other of the above mentioned special conditions where resequencing may be desired wherein it is required that an airplane restart its approach, it will be assumed that all three flight altitudes are occupied by respective airplanes and all three computer units are in use in computing their respective patterns. It will be thus assumed that the computer unit A is in use for computing the pattern of an airplane at the 1000 foot altitude, computer unit B is in use for computing the pattern of an airplane at the 1500 foot altitude, and the computer unit C is in use for computing the pattern of an airplane at the 2000 foot altitude. Accordingly the resequencing control relays (see Fig. 16) AC1Z, BC2Z, and CC3Z are all deenergized.

If it is now assumed that it is necessary to recompute the pattern for the airplane at the 1500 foot altitude having its pattern computed by computer unit B, the resequencing buttons 2XPBZ 2YPBZ on the respective boards X and Y for the 1500 foot altitude are simultaneously actuated by the controllers of these boards. In accordance with this operation it is desired that whatever computer units have been initiated subsequent to the computer unit B be restored, but it is not necessary that any preceding computer unit be reinitiated as the airplane approach computed by such unit should not be affected by the restart of the computer unit for which the resequencing operation is made. Thus, under the assumed conditions, the computer unit A is not restored by the resequencing operation as the pattern computed by that unit is not affected, but the computer unit C is restored because that unit has been initiated subsequent to the initiation of the computer unit B; and its initiation must be maintained at the particular predetermined separation time subsequent to the initiation of computer unit B. Thus it is provided that the resequencing relays BCZ and CCZ are picked up for the restoration of the computer units B and C respectively, but the relay ACZ is not picked up under these conditions because the computer unit A is not to be restored during the resequencing operations.

The simultaneous actuation of the resequencing buttons 2XPBZ, and 2YPBZ closes a pick up circuit for the relay 2CR (see Fig. 17), such circuit extending from (+), including back contact 593 of relay 2XCL or back contact 594 of relay 2YCL, dependent upon whether the controller of board X or board Y has supervision of the flight, contact 595 of button 2XPBZ in its actuated position, contact 596 of button 2YPBZ in its actuated position, and winding of relay 2CR, to (—). The closure of front contact 597 of relay 2CR cannot effect the picking up of relay ACZ, as the front contact 598 of relay AC1Z which is included in the circuit for relay ACZ is open at this time. The relay BCZ is picked up, however, by the energization of a circuit extending from (+), including front contact 599 of relay BC1Z, front contact 600 of relay 2CR, and winding of relay BCZ, to (—). Similarly the relay CCZ is picked up in accordance with the energization of relay 2CR by a circuit extending from (+), including front contact 601 of relay CC1Z, front contact 602 of relay 2CR, and winding of relay CCZ, to (—).

The mode of operation in response to the picking up of the relay BCZ is similar to that which has been heretofore described for the restoration of the computer unit B, the restoration of the indication control relays and the extinguishing of the indicator lamps. It will be noted that the mode of operation upon restoration under the conditions being considered wherein the token for the airplane is not removed from the board is not materially different from that which has been heretofore described when the removal of the token was assumed in that the picking up of the relay BCZ is effective to restore whichever of the lock relays BXL and BYL (see Fig. 15) that may be picked up because the front contact 498 of relay BCZ is included in both the pick up and the stick circuits of these relays.

Thus upon the picking up of the relay BCZ, the particular one of these relays BXL and BYL that has been picked up is momentarily dropped away during actuation of the resequencing button, and in response to its dropping away the lock repeater relay BXYL is momentarily picked up so as to establish a pick up circuit which has been described for the timer control relay BTS (see Fig. 12). This pick up circuit for relay BTS need be only momentarily closed as this relay is held up by its stick circuit which has been described when considering the normal conditions of the system. The picking up of relay BTS, by the opening of back contacts 573 and 567, restores the timers BCW—TER and BC—TER and deenergizes the timer motors. The indicator lamps associated with the computer unit B are momentarily extinguished upon actuation of the resequencing button, but, because of the token remaining in the token jack, the restoration of the lock relays to their former positions in accordance with the presence of the token is effective upon restoration of the resequencing button, and therefore the conditions of indication are reestablished subsequent to the resequencing of the stepper as will be hereinafter considered so as to display a flashing green aspect as an indication that the computer unit B has been restored and reinitiated so that the airplane should be instructed to start a new approach by preceding to the outer beacon RB5 of the inner stack for the purpose of reinitiating its pattern approach.

It is further required that in order to reinitiate the computer units B and C, the stepper must be resequenced so as to be effective to reinitiate the computer unit B immediately and to reinitiate the computer unit C after a time interval measured by the separation timer TE. With reference to Fig. 6, the stick circuits for the relays IVA, 2VA, and 3VA are opened at back contacts 263, 327, and 316 of the relay 2CR, and these relays together with their associated relays IVB, 2VB, and 3VB are all dropped away, except that the relay IVA would be held by its stick circuit including back contact 540 of relay ATS and back contact 478 of relay ACZ if this relay IVA were up at this time and the timing operation as initiated by the timer control relay ATS have been initiated. Under the assumed conditions, however, the stepper would have been required to have reached its third step to initiate the computer unit C, and thus it can be assumed that the picking up of relay 2CR under the assumed conditions restores all of the stepper relays, and thus the relay VBP is also dropped away because of the opening of its stick circuit at front contacts 320, 321, and 322 of relays IVB, 2VB, and 3VB respectively.

Upon the dropping away of relay VBP under the above described conditions, a pick up circuit is established for the relay 2VA so that the computer unit B can be reinitiated at the step for the computer unit for which the resequencing operation has been effected. The energization of this stepper relay is selected in accordance with the energization of the relay 2CR in combination with the relay BC2Z being deenergized at this time. Thus the pick up circuit for relay 2VA extends from (+), including back contact 481 of relay VBP, front contact 603 of relay 2CR, front contact 604 of relay AC2Z, back contact 605 of relay BC2Z, and winding of relay 2VA, to (−).

With reference to Fig. 7, the picking up of relay 2VA, by the closure of its front contact 398, conditions a pick up circuit for the relay BG so that such relay can be picked up upon the closure of back contact 400 of relay BCZ when the resequencing buttons are restored from their actuated positions. The relay BG when picked up applies energy to the motor of computer unit B upon closure of its front contact 494 through wire 405 so as to reinitiate the computer unit B immediately in response to the actuation of the resequencing button, rather than requiring an initial separation interval. The picking up of relay BG also causes energization of the green lamp associated with the computer unit B on the board from which the flight to be resequenced is governed.

Having thus pointed out specifically the mode of operation in resequencing under the assumed traffic conditions for the flight having its pattern computed by the computer unit B, it will be readily apparent that a similar mode of operation is effective in accordance with the picking up of the relay CCZ for the restoration of the computer unit C and of the timers which may have been initiated by that computer unit. The computer unit C, however, cannot be reinitiated until separation time as determined by the separation timer TE has elapsed so as to permit the picking up of the third step relay 3VA (see Fig. 6) to thereby condition a pick up circuit for the relay CG (see Fig. 7) which can in turn, by the closure of its front contact 424, apply energy to the motor of computer unit C for initiation of that computer unit. It is thus provided that even though additional delay has been inserted in the operation of the computer by the restart of the computer unit B, the proper separation time is provided to govern the time at which the next subsequent airplane can be called for a pattern approach, and the special pattern separation and warning timers for both computer units B and C are reinitiated by the reinitiation of their respective associated computer units so as to provide proper relative timing for governing the energization of the warning indicator lamp WK and for governing time at which clearance can be given by energization of the straight-in lamps for subsequent straight-in approaches.

Under the above assumed operating conditions, it has been shown that resequencing does not affect the out-timing of a prior initiated computer unit for an airplane at a lower flight altitude because of the circuit organization for the control of the relays ACZ, BCZ, and CCZ (see Fig. 17) as has been described. It is provided, however, that restoration is rendered effective for a prior initiated computer unit if that computer unit is not in use in computing a pattern approach. Thus, for example, if the lower flight altitude is unoccupied as indicated by the energization of the relay ACIZ which is associated with the computer unit A at the time when resequencing is rendered effective as has been heretofore described for the second flight altitude, the relay ACZ is picked up as well as the relays BCZ and CCZ so as to restore the computer unit A. The energization of relay ACZ under such conditions is by a circuit extending from (+), including front contact 598 of relay ACIZ, front contact 597 of relay 2CR, and winding of relay ACZ, to (−). By this mode of operation, the computer unit A would be restored as would be desirable if this unit were to have been skipped in the normal sequence of use of the respective units for computing pattern approaches.

The organization of the circuits involved in the resequencing operation is such as to prevent the shortening of separating time by actuation of the resequencing buttons. That is, if the computer unit B has just been initiated, the computer unit C cannot be initiated prior to expiration of the timing operation of the separation timer TE because of actuation of the resequencing button for the altitude with which that computer unit C would be used. This is true because the insertion of a token is required for either the second or third flight altitudes as illustrated in Fig. 17 in order that the actuation of the resequencing buttons can render effective the resequencing of the stepper. Thus the control relay 3CR could not be picked up by actuation of the resequencing buttons 3XPBZ and 3YPBZ unless there were a token in the corresponding vertical row of token jacks for the third flight altitude so as to cause either the relay 3XL or the relay 3YL to be deenergized. Inasmuch as a token should not be inserted until a green lamp is obtained indicating that the computer unit has been initiated at the end of the separation time measured by the separation timer TE, it would not be possible to condition the circuit for the relay 3CR so that it could be picked up in response to the actuation of the resequencing buttons except by violation of the rules governing the manipulation of the machines. If, however, this rule should be violated, and the token inserted before obtaining a green light, the actuation of the resequencing buttons cannot be effective to start the next computer unit until separation time has elapsed because a stick circuit is maintained for the stepper relays associated with the last initiated computer unit, thus preventing restoration and restarting of the stepper until the separation timer TE has completed the measuring of separation time and picked up the next stepper relay VB. For example, the relay 2VA is maintained picked up by its stick circuit including back contacts 479, 542, and 329 of relays BCZ, BTS, and 3VB irrespective of any attempt to resequence for computer unit C, until the timer TE completes its operation to pick up relay 3VB and thus open this stick circuit at back contact 329.

It is of course to be understood that the system comprises suitable radio communication equipment generally employed for radio telephone communication between the respective controllers and the airplanes, it being preferable that separate telephone communication channels be provided for the respective controllers for their communication with the airplanes. This radio communication apparatus is indicated in the drawings in that respective head phones and transmitter jacks 606 and 607 are shown in Fig. 1 in the table supporting the approach controllers' boards for convenience of the respective controllers in attaching their head phones and microphones.

Although the airplane landing approach control system that has been herein described as one embodiment of the present invention comprises a plurality of features cooperating to obtain a desired mode of operation, it is to be understood that these features may be used in many cases as subcombinations in other embodiments of landing approach control systems, and that the system may be employed without the use of some of these features and with a greater or lesser number of holding stacks of different sizes and configurations in accordance with the requirements of practice. It is to be understood that various modifications, adaptations, and alterations can be applied to the specific form shown to meet the requirements of practice, except as limited by the scope of the appending claims.

What I claim is:

1. An airplane approach control system for spacing airplanes as they approach a runway for landing comprising in combination, approach control apparatus including a computer for computing a pattern approach for an airplane so as to follow a preceding airplane making a pattern approach by a predetermined separation time, a timer initiated upon initiation of said computer for a pattern approach, and a straight-in indicator energized in response to the completion of operation of said timer for indicating when a straight-in approach can be made in order to maintain a desired separation time between successive airplanes making respective pattern and straight-in approaches as they approach a runway.

2. In an airplane landing approach control system for spacing a plurality of airplanes as they approach a runway for landing, straight-in and computed pattern approach control means comprising in combination; a separation timer, stepping means operated step-by-step at a rate determined by said separation timer, a computer having a unit for each step of said stepper for computing a landing approach pattern for an airplane, said unit being initiated by its associated step of said stepping means, a pattern approach timer for each step initiated during that step when that step is used for a pattern approach, and indication means for indicating that a straight-in landing approach can be initiated, said indication means being rendered active in response to the completion of the timing operation of said pattern timer for the last step that has been used for computing a pattern landing approach of an airplane.

3. An approach control system for spacing airplanes as they approach a runway for landing comprising in combination, a pattern approach indicator, a straight-in approach indicator, pattern approach control apparatus including a computer for energizing said pattern approach indicator at a time when a pattern approach can be initiated in order to obtain predetermined separation time from an airplane making a preceding pattern approach, said computer being effective to compute a flight pattern to gain or lose time as required within predetermined limits with respect to separation from the next preceding airplane making a pattern approach so as to maintain said predetermined time of separation upon approach of the runway, and a timer initiated by said pattern approach control apparatus when a pattern approach is made for measuring a time interval governing when a straight-in approach of the runway by an airplane can be initiated in order to approach the runway a predetermined separation time subsequent to an airplane making a preceding pattern approach.

4. An approach control system for spacing airplanes as they approach a runway in landing comprising in combination, a control board having respective pattern and straight-in approach control indicator lamps disposed thereon for indicating when energized when respective pattern and straight-in approaches can be initiated, pattern approach control apparatus including a computer for energizing said pattern indicator lamp a predetermined time subsequent to the initiation of a pattern approach of the next preceding airplane, said apparatus being effective to compute the flight pattern of an airplane so that it may gain or lose separation time as required within predetermined limits in order to follow the next preceding airplane by said predetermined time upon approach of the runway, a timer initiated by said pattern approach control apparatus when an airplane makes a pattern approach for measuring a time interval governing when a straight-in approach of the runway by an airplane can be initiated in order to approach the runway a predetermined separation time behind a preceding airplane making a pattern approach, and means for energizing said straight-in indicator lamp upon the completion of operation of said timer.

5. An approach control system for airplanes of the character described comprising in combination, a separation timer, pattern approach control apparatus including a computer having a plurality of computer units for computing flight patterns of respective airplanes in making landing approaches to govern the spacing of such airplanes as they approach a runway, sequencing means including said separation timer for governing the successive initiation of said computer units to render said computer units sequentially initiated at a rate according to a predetermined separation time, a pattern approach timer for each of said computer units initiated upon the initiation of that computer unit for determining when a subsequent straight-in approach can be initiated, a straight-in approach indicator lamp for indicating when a straight-in approach of an airplane can be initiated in order to follow an airplane making a pattern approach by a desired separation time, and circuit means for energizing said indicator in response to completion of operation of said pattern approach timer.

6. An approach control system for spacing the approach of airplanes to a runway comprising in combination, first and second markers in approach of the runway, a computer unit for computing the flight pattern of an airplane so that the airplane may gain or lose time separation with respect to a preceding airplane to obtain a predetermined separation time between airplanes as they reach said second marker in approach of the runway, a pattern approach timer initiated upon initiation of said computer unit for governing when a straight-in approach from said first marker may be initiated in order to obtain a predetermined time separation behind a preceding computed pattern approach of an airplane, and straight-in indication means rendered effective in response to completion of operation of said pattern approach timer to indicate that it is time to initiate a straight-in approach from said first marker in order to obtain said predetermined time separation behind a preceding airplane making a pattern approach at a time when the airplane making the pattern approach reaches said second marker in approach of the runway.

7. An approach control system for airplanes comprising in combination, first and second markers in approach of a runway, a computer unit for computing a pattern approach of an airplane, said computer unit being effective to compute a flight pattern for an airplane so that such airplane will arrive over said second marker in approach of the runway a predetermined time after initiation of said computer unit, a straight-in indicator for indicating when a straight-in approach may be initiated from said first marker, a pattern approach timer initiated upon initiation of said computer unit, said timer having a time setting equal to the desired separation time between respective successive pattern and straight-in approaches subtracted from the flight time from said first marker to said second marker and the remainder subtracted from said predetermined time, and means responsive to the completion of operation of said timer for energizing said straight-in indicator and thereby indicating the proper time to initiate a straight-in approach from said first marker in order that said desired separation time may be obtained between respective successive pattern and straight-in airplane approaches to the runway.

8. An airplane approach control system for spacing airplanes as they approach a runway for landing comprising in combination, manually operable means for designating the initiation of respective straight-in and computed pattern approaches to the runway, approach control apparatus including a computer for computing a pattern approach for an airplane so that it will arrive at a fixed point in approach of the runway a predetermined time from the time of initiation of said computer, a straight-in approach timer initiated upon actuation of said manually operable means for designating the initiation of a straight-in approach, and indication means rendered effective upon the completion of operation of said timer for indicating when said manually operable means should be actuated for designating initiation of a computed pattern approach of an airplane in order that the airplane making the computed pattern approach may follow an airplane making a straight-in approach by a desired separation time.

9. An airplane approach control system of the character described comprising in combination first and second markers in approach to a runway, manually operable means for designating respectively the initiation of a straight-in approach to the runway from said first marker and the initiation of a computed pattern approach, a computer unit effective when initiated to compute a pattern approach for an airplane, the pattern approach computed being such as to consume a predetermined time of flight from the time of initiation of said computer unit to the time of the arrival of an airplane flying the computed pattern at said second marker in approach of the runway, a straight-in separation timer initiated upon actuation of said manually operable means for designating initiation of a straight-in approach, said straight-in timer having its time setting equal to the time of flight from said first marker to said second marker subtracted from said predetermined time and the remainder subtracted from the desired separation time, and indication means rendered effective in response to the completion of operation of said timer to indicate when said manually operable means should be actuated for initiation of a pattern approach in order that said separation time may be obtained between airplanes making respective straight-in and computed pattern approaches.

10. In an airplane landing approach control system, the combination with a stepper operable step-by-step at a predetermined rate, of manually operable means for designating respective computed pattern and straight-in landing approaches, a computer having a plurality of computer units, pattern indication means rendered active by each step of said stepper for indicating that a particular computer unit has been initiated and is available for use in computing a pattern landing approach, straight-in indication means rendered active by each step of said stepper when successive straight-in approaches are being made to indicate when such approaches can be initiated, and indication control means responsive to the designation of a computed pattern approach to be computed by any one of said computer units for rendering said straight-in indication means inactive until a given time after that computed pattern approach has been initiated.

11. An approach control system for airplanes approaching a runway for landing comprising in combination, a pattern approach indicator lamp for when energized indicating when a pattern approach should be initiated, a straight-in approach indicator lamp for when energized indicating when a straight-in approach should be initiated, a separation timer, a stepper actuated step-by-step at a rate determined by said separation timer; manually operable means for designating the use of any step as a time period in which a pattern approach is initiated or as a time period in which a straight-in approach is initiated, and circuit means for selectively energizing said pattern approach indicator lamp or said straight-in approach indicator lamp upon initiation of each step of said stepper, the lamp selected for energization being determined by whether the preceding step has been designated as being used for a pattern or a straight-in approach.

12. An approach control system for airplanes comprising in combination, approach control apparatus including a computer having a plurality of computer units, each of said computer units being operable when initiated to compute a flight pattern for an airplane to gain or lose separation time within predetermined limits with respect to a preceding airplane, a separation timer, a stepper operable step-by-step at a predetermined rate determined by said separation timer, a straight-in indicator, manually operable means for designating respective pattern and straight-in approaches, and circuit means for rendering said stepper selectively effective to initiate one of said computer units on each of its steps or to energize said straight-in indicator on each of its steps in accordance with whether said manually operable means has been initially actuated for designating a pattern or a straight-in approach.

13. In an airplane landing approach control system for spacing a plurality of airplanes as they approach a runway for landing, the combination with a stepper operable step-by-step through a plurality of steps, of manually operable means for designating straight-in and computed pattern landing approaches, a computer having a computer unit for each of said steps, each unit being effective in response to manual designation of a computed pattern approach during its associated step to compute a flight pattern for an airplane of a character to space that airplane a predetermined distance behind an airplane making a preceding landing approach, a computed pattern separation timer for each step of said stepper, means effective upon initiation of each of said computer units for initiating said computed pattern timer for that step, indication means for indicating that a straight-in landing approach can be initiated upon actuation of said manually operable means, said indication means being rendered active in response to the completion of the timing of said computed pattern separation timer for the last step that has been used for computing a pattern approach of an airplane, and means responsive to the designation of a straight-in landing approach by said manually operable means for rendering said computer inactive and rendering said indication means active in response to each step of said stepper for indicating when successive straight-in approaches can be initiated.

14. An airplane landing approach control system of the character described comprising in combination a stepper operable step-by-step through a plurality of steps, manually operable means for designating straight-in and computed pattern landing approaches, a computer unit for each of said steps, each computer unit being effective in response to manual designation of a computed pattern approach during its associated step to compute a flight pattern for an airplane of a character to gain or lose separation time from an airplane in advance as required to provide a predetermined separation time spacing of airplanes as they successively approach the runway, said computer unit for each step being automatically initiated at the beginning of that step, provided that the preceding step has been used for a computed pattern approach, a pattern timer for each step of said stepper initiated upon initiation of the computer unit for that step, straight-in indication means rendered active in response to the completion of operation of said pattern timer to indicate when a straight-in approach may be initiated, and computer lock-out means including a stick relay energized in response to the designation of a first of a series of straight-in approaches for preventing operation of said computer unit for any step as long as successive straight-in approaches are made.

15. In an approach control system for airplanes, in combination, a computer having a plurality of computer units, each of said computer units being operable when initiated to gain or lose separation time as required with respect to a preceding airplane to obtain a predetermined desired separation timing, manually operable means for each of said computer units for designating the presence of an airplane having its pattern computed by that computer unit at any one of a plurality of flight altitudes, a stepper operable step-by-step at a predetermined rate wherein the duration of each step is less than the time required by said computer to compute a flight pattern, said stepper being operable to initiate said computer units, one for each step, in a predetermined sequence for computing the approach patterns of respective successive airplanes in approaching a runway thereby rendering a plurality of computer units contemporaneously active even though they have been initiated one at a time during respective steps, and resequencing means comprising manual resequence initiating means for each of said flight altitudes for initiating a resequencing operation, said resequencing means being effective when initiated to restore the particular computer unit that is designated by said manually operable means as being used for computing the pattern of an airplane at the flight altitude for which said resequencing means is actuated, and said resequencing means being effective when initiated to restore each of the other computer units that has been subsequently initiated for airplanes at higher flight altitudes, but being ineffective to restore any prior initiated computer unit for an airplane at a lower altitude that may be in use for computing the pattern of a preceding airplane.

16. An approach control system for airplanes in approach of a runway comprising in combination, a computer having a plurality of computer units, each of said computer units being operable when initiated to compute a flight pattern for an airplane so as to gain or lose separation time as required with respect to a preceding airplane to obtain a predetermined desired separation timing, manually operable means for each of said computer units for designating the presence of an airplane at a selected one of a plurality of flight altitudes as having its pattern computed by that computer unit, stepping means operable step-by-step at a rate wherein the duration of each step is less than the time required by one of said computer units to compute the flight pattern of an airplane, said stepper being effective to initiate said computer units on successive steps in a predetermined sequence, one computer unit for each step, whereby a plurality of computer units can be contemporaneously active even though they are initiated only one at a time, and resequencing means comprising manually operable contact means for each of said flight altitudes and for two boards for initiating a resequencing operation of said computer units and said stepper, said resequencing means being effective when said contact means is simultaneously actuated for both control boards for a particular flight altitude to restore the particular computer unit that is in use for computing the flight pattern of an airplane at that altitude, and said resequencing means being effective to restore each of the other computer units that has been initiated for computing the pattern of an airplane at a higher flight altitude than the flight altitude for which the resequencing operation has been designated, and said resequencing means being ineffective to restore any computer unit that may be in use for computing the pattern of an airplane at a lower flight altitude.

17. In an approach control system of the character described for governing the approach of airplanes to a runway, in combination, a computer having a plurality of computer units, each of said computer units being operable when initiated to compute a flight pattern for an airplane so as to obtain a predetermined desired separation time from a preceding airplane, manually operable means for each of said computer units for designating the presence of an airplane having its pattern computed by that computer unit at any one of a plurality of flight altitudes, stepping means operable step-by-step at time intervals less than the time required by each of said computer units to compute a flight pattern, said stepping means being effective to initiate said computer units in a predetermined sequence, one computer unit for each step, for computing the approach patterns for flights of respective airplanes in approaching the runway thereby rendering a plurality of computer units contemporaneously active even though they have been initiated one for each step, and resequencing means comprising manual resequence initiating means for each of said flight altitudes for initiating a resequencing operation for the reinitiation of said computer units, said resequencing means being effective when initiated for a particular flight altitude to restore the particular computer unit that is designated by said manually operable means as being used in computing the flight pattern for an airplane at that flight altitude, said resequencing means being effective to restore each of the other computer units that has been initiated for computing the pattern of an airplane at a higher altitude, said resequencing means being ineffective to restore any other computer unit that has been initiated for computing the pattern approach of an airplane at a lower flight altitude, and said resequencing means being effective to resequence said stepper so as to restart with the step associated with the computer unit that has been in use for the flight altitude for which said resequencing means is initiated.

18. An approach control system of the character described for spacing the landing of airplanes comprising in combination, a control board having a plurality of groups of manually operable contact means, each of said groups being provided for designation of the presence of a single airplane at a selected flight altitude, means for distinctively designating the initiation of respective selected pattern or straight-in approaches for airplanes, a pattern approach warning timer and a straight-in approach warning timer for each of said groups of manually operable contact means, means for initiating said pattern approach warning timer upon the initiation of a pattern approach for an airplane having its presence designated by said manually operable means of the associated group, means for initiating said straight-in approach warning timer in response to designation of initiation of a straight-in approach for the first group of said contact means in a predetermined order that has none of its contact means actuated for designating the presence of an airplane, and indication means distinctively conditioned in response to the completion of operation of either of said timers.

19. In an approach control system for spacing airplanes in approach to a runway when landing, a control board having a plurality of groups of manually operable contact means, each of said contact means being operable to define the presence of an airplane at a particular altitude in approach of the runway, means for distinctively designating the initiation of respective selected pattern or straight-in approaches for airplanes having their presence defined at respective altitudes by said contact means on said control board, a warning indicator, pattern and straight-in warning timers for the respective groups of manually operable contact means for governing the energization of said indicator, means for initiating said pattern and straight-in timers upon designation of initiation of respective pattern and straight-in approaches to the runway, and indication control means effective in response to the completion of operation of either of said timers for energizing said warning indicator, whereby said warning indicator is energized each time that there is an airplane a predetermined flight time from the end of the runway.

20. An airplane approach control system for spacing airplanes as they approach a runway comprising in combination, means for distinctively designating the initiation of respective straight-in and computed pattern airplane landing approaches to the runway, a pattern approach warning timer initiated upon initiation of a pattern approach, a straight-in warning timer initiated upon initiation of a straight-in approach, and warning indication means distinctively conditioned in response to the completion of operation of either said pattern approach warning timer or said straight-in approach warning timer.

21. In an approach control system for airplanes wherein straight-in approaches are made to a runway from an outer marker, a straight-in warning timer, said timer having its time setting equal to the total flight time from said outer marker to the end of the runway less a predetermined warning time, circuit means responsive to the designation of the initiation of a straight-in approach for initiating said timer, and warning indication means distinctively conditioned in response to completion of operation of said timer subsequent to its initiation upon initiation of a straight-in approach.

NELSON B. COLEY.

No references cited.